United States Patent [19]

Hayashi

[11] Patent Number: 5,381,523
[45] Date of Patent: Jan. 10, 1995

[54] DOCUMENT PROCESSING DEVICE USING PARTIAL LAYOUT TEMPLATES

[75] Inventor: Koichi Hayashi, Kanagawa, Japan
[73] Assignee: Fuji Xerox Co., Ltd., Tokyo, Japan
[21] Appl. No.: 43,202
[22] Filed: Apr. 5, 1993
[30] Foreign Application Priority Data Apr. 6, 1992 [JP] Japan .................................. 4-084225

[51] Int. Cl.6 ...................... G06F 15/20; G06F 15/04
[52] U.S. Cl. ....................................... 395/145; 395/148
[58] Field of Search ................ 395/145, 146, 148, 149, 395/161

[56] References Cited

U.S. PATENT DOCUMENTS

| | | | |
|---|---|---|---|
| 4,951,233 | 8/1990 | Fujiwara et al. | 395/147 X |
| 5,140,676 | 8/1992 | Langelaan | 395/148 X |
| 5,173,853 | 12/1992 | Kelly et al. | 395/148 X |
| 5,208,905 | 5/1993 | Takakura et al. | 395/148 |
| 5,265,242 | 11/1993 | Fujisawa et al. | 395/145 X |
| 5,278,952 | 1/1994 | Kira et al. | 395/145 |
| 5,299,305 | 3/1994 | Oomae et al. | 395/145 X |

OTHER PUBLICATIONS

Document Interchange Standard "Interscript", Introduction to Interscript, Roy Pierce, Jan. 11, 1985, pp. 1-127.
Annex B, Examples of Document Structures, ISO 8613-2; 1989 (E), pp. 130-173.
Streams and the Layout Process for Formatted-processable Documents, Canadian Member Body, Aug. 3, 1989, pp. 1-37.
An Extended Interpretation of the ODA Processing Model for Formatted-processable Documents, Paul Pederson, Jan. 1990, pp. 1-49.
An "Extentions" Approach to Document WG3 N1408, Paul Pederson, Jan. 1990, pp. 1-13, Annex A and B.
Formatter Heirarchy for Structured Documents, Makoto Murata and Koichi Hayashi, System Technology Research Lab, Japan, pp. 1-18.
ODA Extensions of a Structured Document Model ODA, Makoto Murata and Koichi Hayashi, System Technology Research Lab, No. 7, pp. 1-20, F1-F7.

Primary Examiner—Heather R. Herndon
Assistant Examiner—Cliff Nguyen Vo
Attorney, Agent, or Firm—Finnegan, Henderson Farabow, Garrett & Dunner

[57] ABSTRACT

Partial layout templates are prepared for respective partial logical structures of a hierarchical logical structure of a document. Each partial layout template expresses rules for producing a layout of the corresponding partial logical structure. A partial layout generator produces a partial layout structure by recursively calling itself or by calling a content layout system while referring to the partial layout template, and pours the generated partial layout structure into a lowest-rank frame. A layout of the entire logical structure is produced by sequentially performing the partial layout operations.

11 Claims, 54 Drawing Sheets

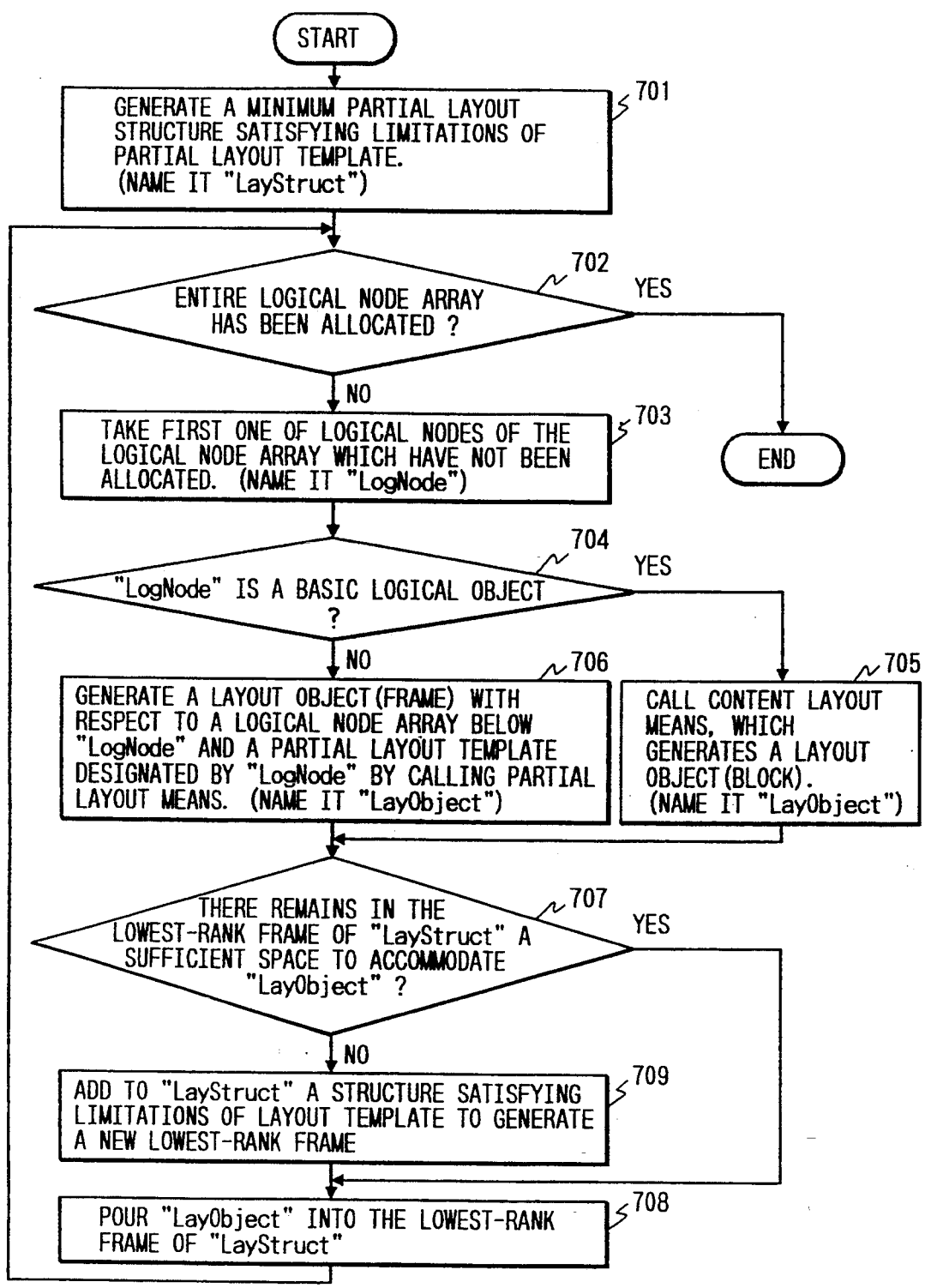

FIG. 15(a)
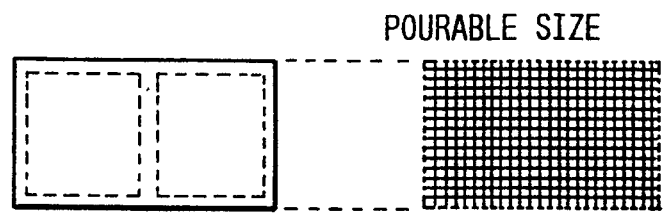
FIG. 15(b)
FIG. 15(c)
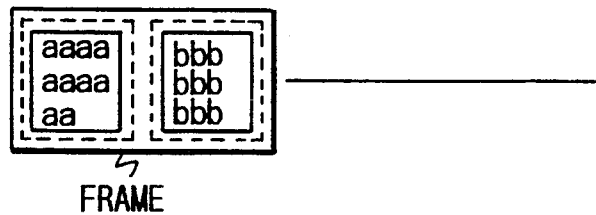
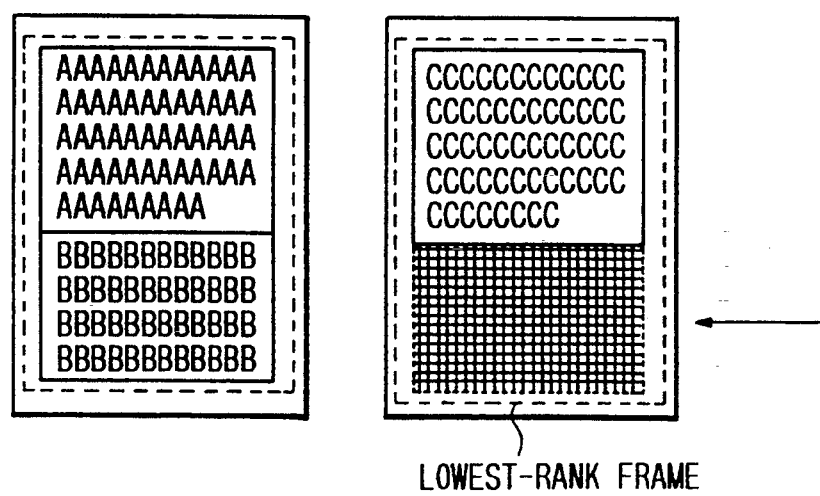

FIG. 16(a)
POURABLE SIZE
FIG. 16(b)
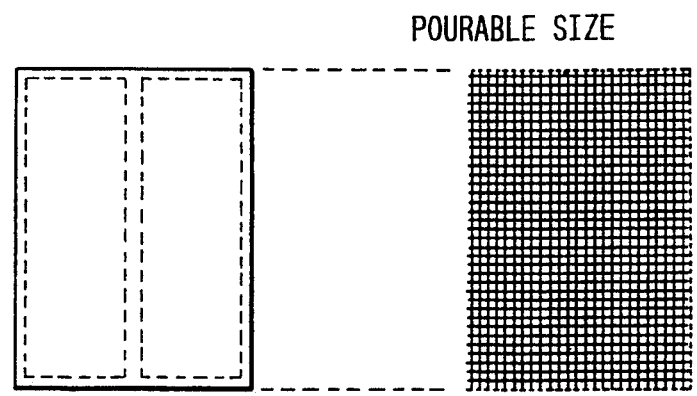
FIG. 16(c)
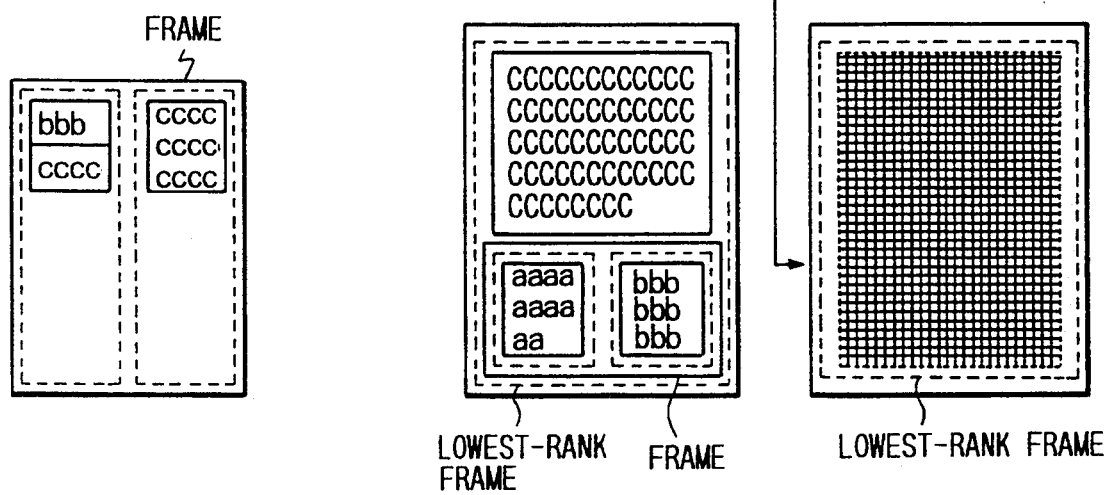

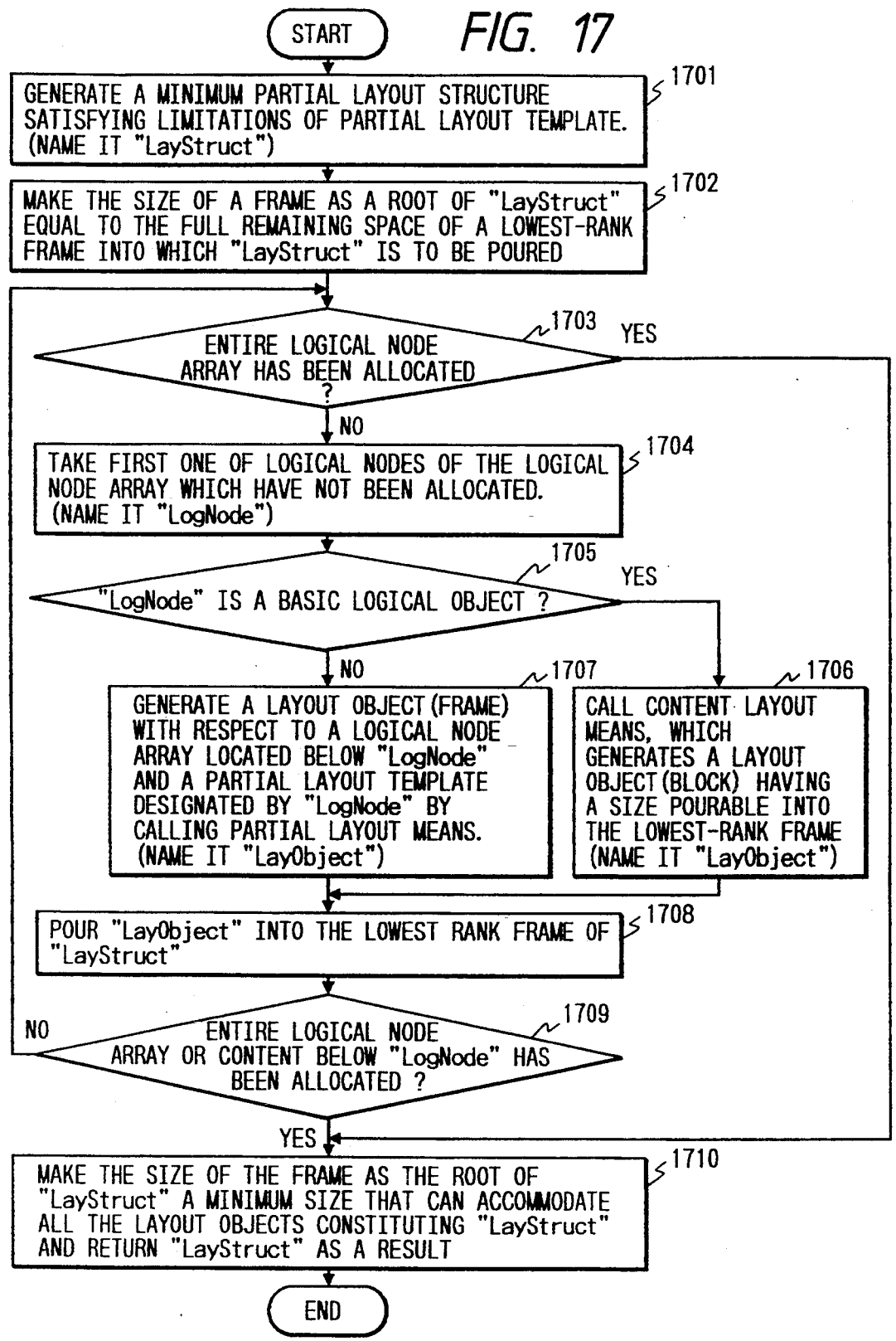

DOCUMENT PROCESSING DEVICE USING PARTIAL LAYOUT TEMPLATES

BACKGROUND OF THE INVENTION

The present invention relates to a document processing device which can generate a layout structure of a document by applying a template (i.e., rules for layout) to a logical structure of the document.

In general, both of the logical development and the layout of an actual output document are important factors of the document. However, the layout is not necessarily important in the process of producing a document. For example, although the layout is necessary once the contents of a document are determined, in some cases the layout is not important in an initial stage of document production where the logical development is not clear yet. Further, different layouts may be required for one logical development in some cases; for instance, when the same document needs to be distributed to a plurality of persons or sections.

Recognizing the above, there have been proposed techniques of generating a layout representing structure called "layout structure" from a structure called "logical structure" which represents the chapter construction of a document. The process of generating a layout structure from a logical structure is called a layout process, and is performed by a program (layout processing program) that is incorporated in a document processing system.

In order to generate various forms of layout structures from the same logical structure, the operation of a layout processing program needs to be modified. However, in general, a program itself cannot be modified properly by ordinary users because the modification needs expert knowledge. For this reason, there has been employed a technique of altering a program by using parameters such as "page size is A4" and "double column setting."

However, according to this technique, the kinds of specifiable parameters are limited to ones that are preset in the program. Further, to control the operation of a layout processing program having many functions, it is necessary to specify a large number of parameters, which precludes ordinary users from using such a program.

To solve the above problems, there were proposed techniques of controlling a layout processing program by using, rather than simple parameters, a data structure representing a layout template. One of those techniques is a "generic layout structure" prescribed in the international standards "ODA" (ISO8613, Information Processing-Text and Office Systems-Office Document Architecture (ODA) and Interchange Format (1989)).

The ODA only sets forth data structures for representing document structures and guidelines for their use, and does not describe actual layout processes. However, it is apparent that the following functions are needed to perform layout operations according to the ODA. The layout process having the following functions is hereinafter referred to as "ODA layout process."

(1) Layout processing function based on a layout template (generic layout structure)
(2) Layout process selecting function (top-down or bottom-up)
(3) Reuse of a layout result
(4) Category-based layout processing function The functions (mechanisms) (1)-(4) are not necessarily effected individually, but may be combined when desired. The combining of the functions will improve the efficiency of the layout process.

The above functions (mechanisms) are described below one by one using a specific example.

Layout Processing Function Based on a Layout Template (Generic Layout Structure)

FIG. 38 shows a logical structure and a layout template (generic layout structure) according to the ODA.

In FIG. 38, respective elements constituting a logical structure 3810 of a document are called "logical objects." That is, "logical root," chapter 1," "related articles," "chapter 2" and eight oblique-lines-applied rectangles are logical objects. Contents "A," "B," "C," "a," "b," "c," "D" and "E" are connected to the eight respective oblique-lines-applied rectangles (in the order of left to right). Each element constituting the contents of a document is called a "content portion," and a logical object having a content portion is called a "basic logical object."

On the other hand, each element constituting a layout template (corresponding to the generic layout structure in the ODA terminology) 3820 is called a "layout object class." "Document template," "page" and "text frame" are layout object classes. Each layout object class has a structure expression (i.e., subordinate generator) in an attribute "generator for subordinates." A structure expression represents limitations on structures that are allowed to exist immediately below a layout object that belongs to a layout object class having the structure expression, and is a combination of structure generators such as item SEQ, item CHO, item REP, item OPT, item OPTREP and item AGG and a class ID ("object class identifier"). In FIG. 38, "rep" means the structure generator. The layout template 3820 expresses a layout image 3820a, in which a solid line frame and a dashed line frame indicate a page and a text frame, respectively.

The logical object "logical root" of the logical structure 3810 designates the layout object class "document template" (this is a layout root) of the layout template 3820. This designation allows a layout operation to be performed on the logical structure 3810 using the layout template 3820.

A layout operation on the logical structure 3810 based on the layout template 3820 will produce, for instance, a layout result shown in FIG. 39(a). In FIG. 39(a), respective elements constituting a layout structure 3900 are called layout objects. That is, "layout root," three elements of "page," three elements of "text frame" and eight inclined-lattice-applied rectangles are layout objects. The content portions "A," "B," "C," "a," "b," "c," "D" and "E" are connected to the eight respective inclined-lattice-applied rectangles (in the order of left to right). The layout object having a content portion is called a "block."

FIG. 39(b) shows a layout image expressed by the layout result of FIG. 39(a). In this image, pages P1-P3 correspond to subordinate structures (layout structures) of the layout objects "page" P1-P3 of the layout structure 3900 of FIG. 39(a), respectively.

Since each block of the final layout structure of the document has a content portion, the logical structure 3810 of the document and its layout structure 3900 are associated with each other, sharing the content portions as shown in FIG. 40.

Each layout object of the layout structure retains the following information as attributes:

(1) Two-dimensional position relative to the superordinate object (In the ODA, this information is retained as an attribute "position.")

(2) Information on the own size (This information is retained as an attribute "dimensions" in the ODA.)

(3) In the case of a layout object that is not a block, an identifier or pointer indicating a layout object subordinate thereto (This information is retained as an attribute "subordinates" in the DOA.)

(4) In the case of a layout object that is a block, an identifier or pointer indicating a content portion subordinate thereto (This information is retained as an attribute "content portions" in the ODA.)

Next, the operation of a conventional layout processing program is outlined below.

(1) Generating a minimum layout structure that satisfies the limitations of a layout template.

(2) Generating a layout object (block) corresponding to a logical object (basic logical object) having a content portion.

This operation is hereinafter referred to as "content layout operation."

(3) Disposing the generated block at a layout node (lowest-rank frame) corresponding to a lowest-rank node of the layout template.

This operation is referred to as "pouring."

(4) If necessary, altering the layout structure within a range permitted by the layout template. For example, a new lower-rank frame is generated by adding a new page when the space in the lowest-rank frame for accommodating blocks has been used up.

The content layout operation and the pouring operation are effected by generating a subject layout object and altering the information retained by the generated object. In the case of the content layout operation, a content portion is connected to the layout object and the own size is changed. In the case of the pouring operation, the subject layout object is connected to the superordinate layout object and the own operation is changed.

Referring to a flowchart of FIG. 41, the above operation of the layout processing program is described more specifically.

As shown in FIG. 41, the layout processing program generates a minimum layout structure that satisfies the limitation of a layout template (step 1). The generated structure is given a name "LayStruct." Then, it is judged whether all the basic logical objects have been allocated (step 2). If the judgment is affirmative, the program returns "LayStruct" as a result. If the judgment is negative, the program takes the first one of the basic logical objects that have not been allocated (step 3), and call a content layout routine, which then generates a block (step 4). The basic logical object thus taken and the generated block are named "LogNode" and "LayObject," respectively. Then, the layout processing program judges whether there remains in the lowest-rank frame of "LayStruct" a space large enough to accommodate "LayObject" (step 5). If the judgment is affirmative, "LayObject" is poured into the lowest-rank frame of "LayStruct" (step 6). If the judgment is negative, the program adds to "LayStruct" a structure that is permitted by the layout template to generate a new lowest-rank frame, and proceeds to step 6. After the execution of step 6, the program returns to step 2 to execute it and the subsequent steps.

Next, a brief description is made of how a block is generated and poured into a lowest-rank frame when a layout operation is performed on the logical structure 3810 using the layout template 3820 (see FIG. 38).

For example, based on the layout template 3820, a minimum layout structure 4200 as shown in FIG. 42. Then, a basic logical object 4310 having a content portion A is subjected to the content layout operation to generate, as shown in FIG. 43(a), a block 4320 corresponding to the basic logical object 4310. Then, the pouring is performed to dispose the block 4320 below a lowest-rank frame (i.e., text frame) 4330, which means that the content portion A is poured into a space of the text frame as shown in FIG. 43(b).

Then, a basic logical object 4410 having a content portion B is subjected to the content layout operation to generate, as shown in FIG. 44(a), a block 4420 corresponding to the basic logical object 4410. By the pouring operation, the block 4420 is disposed below a lowest frame 4330, which means that the content portion B is poured into an available space of the text frame as shown in FIG. 44(b).

For the layout of a content portion C, a basic logical object 4510 is subjected to the content layout operation to generate a block 4520 corresponding to the basic logical object 4510. However, if the pop, ring is performed on the block 4520, the layout operation fails, because there are no available space in the text frame (see FIG. 45(b)) and therefore the content portion C cannot be poured. In the event of this type of layout failure, the layout structure may be altered within the limitations of the layout template. In the specific case under consideration, a new lowest-rank frame (text frame) 4610 may be generated as shown in FIG. 46(a) based on the limitations of the layout template 3820 of FIG. 38. By the pouring operation on the lowest-rank frame 4610, the block 4520 corresponding to the already generated content portion C is disposed below the lowest-rank frame 4610, which means that the content portion C is poured into the text frame of a page (next page) different from the page into which the content portions A and B have been poured.

In the case of using an article which does not directly relate to the logical flow of the text such that it is disposed separately from the text, for instance, in double column setting, the layout template of FIG. 38, for example, may be changed to a layout template 4700 shown in FIG. 47. The layout template 4700 expresses a layout image 4700a. As shown in FIG. 47, since a logical object "related articles" of the logical structure 3810 designates a layout object class "small frame" of the layout template 4700, "related articles" is poured into a structure below "small frame." In the ODA, this designation is done by specifying an attribute "layout object class."

When the layout operation is performed on the logical structure 3810 based on the layout template 4700 shown in FIG. 47, a layout result of FIG. 48(a) is obtained. In FIG. 48(a), a layout structure 4800 consists of "layout root," three elements of "page," three elements of "printing plate frame," three elements of "text frame," one "small frame," one "left-hand frame," one "right-hand frame" and eight inclined-lattice-applied rectangles. FIG. 48(b) shows a layout image expressed by the layout result of FIG. 48(a). In this layout image, the pages P1–P3 correspond to respective images expressed by lower-rank structures of the layout objects "page" P1–P3 of the layout structure 4800 shown in FIG. 48(a).

A brief description is made of the pouring of the "related articles" in the form of double column setting.

By applying the layout template 4700 to the logical structure 3810, an layout operation is first performed on the respective basic logical objects having the content portions A and B, and then a block 4920 corresponding to a basic logical object 4910 having the content portion C is generated as shown in FIG. 49(a). Based on the limitations of the layout template 4700, a printing plate frame including a text frame and a small frame is generated on a new page. By the pouring operation, a block 4920 is disposed below a text frame 4930 as shown in FIG. 49(a), which means that the content portion C is poured into an available space of the text frame.

When a content layout operation is performed on a basic logical object 5010 having a content portion a, a block 5020 corresponding to the basic logical object 5010 is generated as shown in FIG. 50(a). By performing a pouring operation, the block 5020 is disposed below the lowest-rank frame (in this example, left-hand frame 5030), which means that the content portion a is poured into an available space of the left-hand frame as shown in FIG. 50(b). By performing layout operations on content portions b and C in the similar manner, the contents of the subject page are arranged to have an image of the page P2 shown in FIG. 48(b).

Layout Process Selecting Function (Top-Down or Bottom-Up)

In the ODA mentioned above, the following events sometimes occur when the logical structure 3810 is subjected to the layout process by applying the layout template 3820 (see FIG. 38).

(1) A content portion has a large content and cannot be accommodated by a generated lowest-rank frame.
(2) The content of a content portion is a figure or table which cannot be accommodated by a generated lowest-rank frame and cannot be divided.

In the above cases, the layout operation is performed in the following manner.

In the case of event (1), a plurality of blocks are generated for one basic logical object, which means that when a block is generated in the content layout operation the size of the block area is determined from the remaining space of the higher-rank layout object on a top-down basis.

For example, assume here that a layout result of FIG. 51(a) has been obtained by subjecting the logical structure 3810 of FIG. 38 to a layout process. In this case, with respect to the basic logical object having the content portion B of the logical structure 3810, two blocks 5110 and 5120 have been generated in a layout structure 5100 shown in FIG. 51 to accommodate content portions B1 and B2 (i.e., divided content portions of the content portion B). FIG. 51(b) shows a layout image expressed by the layout result of FIG. 51(a).

On the other hand, in the case of event (2), the size of the block space is determined on a bottom-up basis from a space required for accommodating a figure or table.

For example, assume here that a layout result of FIG. 52(a) has been obtained by subjecting the logical structure 3810 to a layout process. In this case, the content portion B of chapter 1 of the logical structure 3810 is "figure or table." Since the content portion "figure or table" could not be accommodated in the remaining space of the text frame when a layout operation was performed on the basic logical structure having the content portion "figure or table," it is disposed below a text frame 5210 of the next page of a layout structure 5200 shown in FIG. 52(a). FIG. 52(b) shows a layout image represented by the layout result of FIG. 52(a).

In the ODA, since the subject of the pouring is a block, the selection between the bottom-up and the top-down is performed based on the type of a content portion. For example, the top-down is selected for a text and the bottom-up is selected for a figure or table. That is, the size of an area of a generated block is determined on a top-down basis when the content portion is a text and on a bottom-up basis when it is a figure or table. The content portion is poured into the block area thus determined. Since the block generation is associated with the content layout operation, the division to a plurality of blocks means that the content layout operation needs to be performed at a plurality of times that corresponds to the number of blocks.

Reuse of a Layout Result

In the ODA, since a layout structure is generated by applying a layout process to a logical structure, when the logical structure is altered the layout structure does not reflect the alteration to the logical structure unless a layout process is applied again. In the case of a large document, it is inefficient to perform a layout operation every time a logical structure is altered.

The ODA does not mention a solution of this problem. However, since, as shown in FIG. 40, the basic logical objects of the logical structure 31510 are correlated with the respective blocks of the layout structure 3900 sharing the content portions, it is apparent that the efficiency of the layout process can be improved by utilizing the above corresponding relationship. That is, it can be conceived that portions that are influenced by an alteration are again subjected to a layout operation. For example, when the content portion C of the logical structure 3810 (see FIG. 40) has been changed, a layout operation needs to be performed only on the basic logical structures corresponding to the content portions "C," "a," "b," "c," "D" and "E." Since the content portion may be divided, the one-to-one corresponding relationship as in the case of FIG. 40 is not always established between the basic logical objects and the blocks.

Category-Based Layout Processing Function

The layout process based on the ODA further has the function of selecting a lowest-rank frame into which a basic logical object is to be poured. By predesignating categories of basic logical objects and lowest-rank frames, a certain basic logical object can be poured into a lowest-rank frame having the same category. Designation is made of an attribute "layout category" of the basic logical object and an attribute "permitted categories" of the lowest-rank frame.

For example, as shown in FIG. 53, in order to dispose a "related articles" portion 5311 of a logical structure 5310 in a rear page, a setting may be made in advance so that a logical object "logical root" designates a layout template 5320. Symbol 5320a denotes a layout image expressed by the layout template 5320.

As described above, the generic layout structure according to the ODA has a good advantage that a variety of layout structures can be generated without adding or modifying a program. Layouts of a plurality of logical structures can be obtained by retaining a generic layout structure and reusing it. The top-down/bottom-up layout process and the category-based layout process enable production of a variety of layouts for a certain logical structure. Further, the use of the backtrack mechanism can improve the efficiency of re-conducting a layout operation.

However, in the above-described conventional layout processing technique, the functions (mechanisms) (1)–(4) have the following problems.

Layout Processing Function Based on a Layout Template (Generic Layout Structure)

In the conventional layout processing technique, a new layout template needs to be pro, pared to produce a layout for a logical structure that is different from a layout based on an existing layout templates. For example, to provide a small frame in triple column setting rather than double column setting, the layout template 4700 of FIG. 47, for instance, should be replaced by a layout template of FIG. 54(a). To employ a layout that permits alternative use of double column setting and triple column setting, a layout template as shown in FIG. 55 should be prepared. FIG. 54(b) shows a layout image expressed by the layout template of FIG. 54(a).

In the conventional layout processing technique, as described above, since the layout process for the entire logical structure is controlled using the layout template for the entire logical structure, the layout template for the entire logical structure needs to be prepared before execution of the layout process. Therefore, a new layout template which is different, as a whole, from an existing one needs to be prepared even if they are partially common to each other. It is very cumbersome and takes time and labor to generate a new layout template for each slight layout change. On the other hand, the preparation of a universal layout template including all the conceivable layouts is very difficult. Having a complex structure, such a template will reduce the efficiency of the layout process.

Layout Process Selecting Function (Top-Down or Bottom-Up)

In the conventional layout processing technique, the selection between the top-down and bottom-up is determined only from the content. That is, the top-down is always selected if the content is a text, and the bottom-up is selected if it is a figure or table.

However, a table as an example of the content is generally dividable. Therefore, when a table cannot be accommodated by the available space of a page, in some cases it may be better to allocate the entire table to the next page but in other cases it may be better to allocate part of the table to the available space and the overflow part to the next page. Thus, the selection between the top-down and bottom-up can not always be determined only from the type of content.

Unfortunately, the conventional layout processing technique cannot select (or designate) the top-down or bottom-up layout operation for the same type of content.

Reuse of a Layout Result

In the conventional layout processing technique, the layout process is applied to the entire logical structure of a document. Therefore, when a portion of a logical structure is changed, i.e., when a certain content portion is modified, basic logical objects after the modified content portion need to be again subjected to a layout operation.

For example, in the case of producing the layout result shown in FIG. 48(a), if it is considered that the structure ("related articles" structure) including "related articles" and the objects below it is not directly related to the structure of the text, it may be concluded that when a portion belonging to the "related articles" structure is modified, only the "related articles" structure needs to be subjected to a partial layout operation. Conversely, when only a portion of the text is modified, it would be sufficient to move the layout structure including the small frame (corresponding to "related articles" ) and the objects below it without the need of performing a layout operation on the "related articles" structure.

However, in the conventional layout processing technique, when, for instance, the content portion "C" of the logical structure 3810 (see FIG. 47), which belongs to the text, is modified, a layout operation needs to be performed again on the basic logical objects corresponding to the content portions "C," "a," "b," "c," "D" and "E." When the content portion "a," which is part of the related articles, a layout operation needs to be performed on the basic logical objects corresponding to the content portions "a," "b," "c," "D" and "E." Thus, the efficiency of re-conducting a layout operation is low.

Category-Based Layout Processing Function

In the conventional layout processing technique, only a block can be poured into a particular lowest-rank frame by designating a category. As a result, even in the case of disposing the entire related articles to rear pages, a category needs to be given to the individual basic logical objects. Therefore, when a basic logical object has been copied from a different portion in an edit work, an adjustment should be made of the category given to the copied basic logical object. Thus, the category management on a basic logical object basis is cumbersome. Further, when a category adjustment fails, the desired layout is not obtained, i.e., blocks corresponding to part of the basic logical objects may be disposed at an unexpected location.

SUMMARY OF THE INVENTION

An object of the present invention is to provide a document processing device which can generate a layout template easily in a very simple manner, and can reuse part of an existing layout template.

Another object of the invention is to provide a document processing device which can easily produce a layout of a desired document.

Another object of the invention is to provide a document processing device which can improve the efficiency of re-conducting a layout operation.

According to the invention, a document processing device comprises:

means for retaining a plurality of partial layout templates each expressing rules for producing a layout of a partial logical structure;

means for extracting, from a logical structure of a document to be processed, a logical node array including first logical nodes corresponding to respective basic logical objects having respective content portions and second logical nodes representing respective partial logical structures and designating respective partial layout templates selected from the partial layout templates retained by the partial layout templates retaining means;

means for managing the extracted logical node array; and partial layout means for performing a partial layout operation to generate a partial layout structure by applying, to one of the partial logical structures, one of the selected partial layout templates corresponding thereto, and sequentially performing the partial layout operation in accordance with the extracted logical node array to produce a layout of the entire document logical structure.

With the above construction, a plurality of partial layout templates are prepared in the partial layout templates retaining means and selected in accordance with a document to be processed.

According to a second aspect of the invention, a document processing device comprises:

means for retaining a plurality of partial layout templates each expressing rules for producing a layout of a partial logical structure; and a plurality of formatters provided for respective logical nodes of a logical structure of a document to be processed, and operating in a parallel manner to generate respective partial layout structures by applying, to respective partial logical structures, respective partial layout templates selected from the partial layout templates retained by the partial layout templates retaining means, the formatters starting to operate from a highest-rank formatter downwards.

BRIEF DESCRIPTION OF THE DRAWINGS

FIG. 7 is a flowchart showing a bottom-up-type partial layout operation by a partial layout means of the first embodiment;

FIGS. 15(a)-15(c) are charts illustrating steps of the top-down-type layout operation of the second embodiment;

FIGS. 16(a)-16(c) are charts illustrating steps of the top-down-type layout operation of the second embodiment;

FIG. 17 is a flowchart showing the top-down-type partial layout operation by a partial layout means of the second embodiment.

Figure 31A:
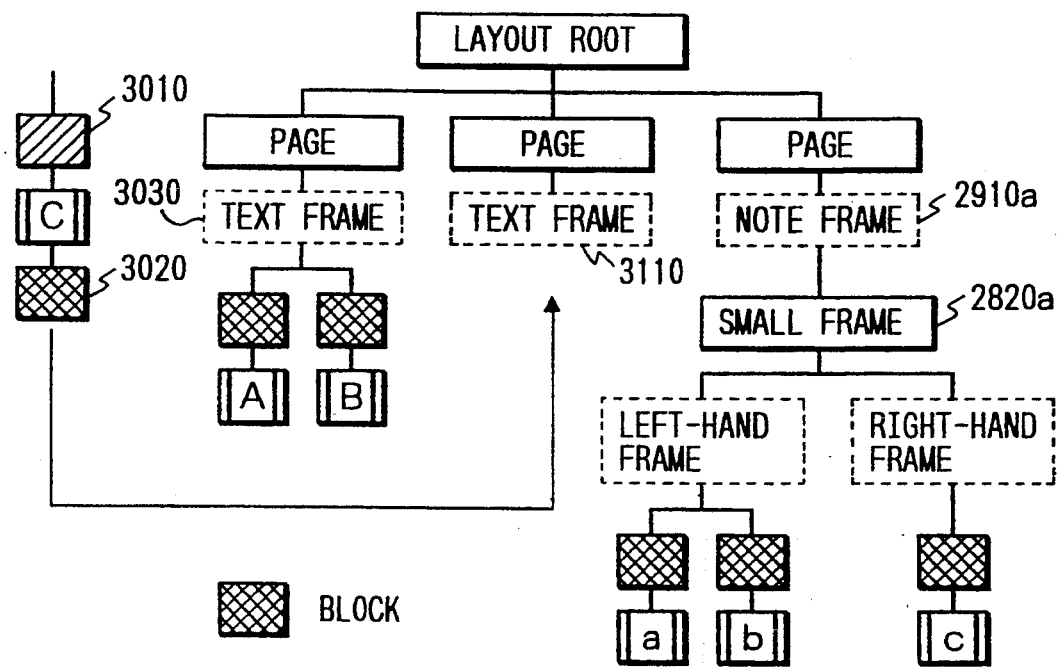
Figure 31B:
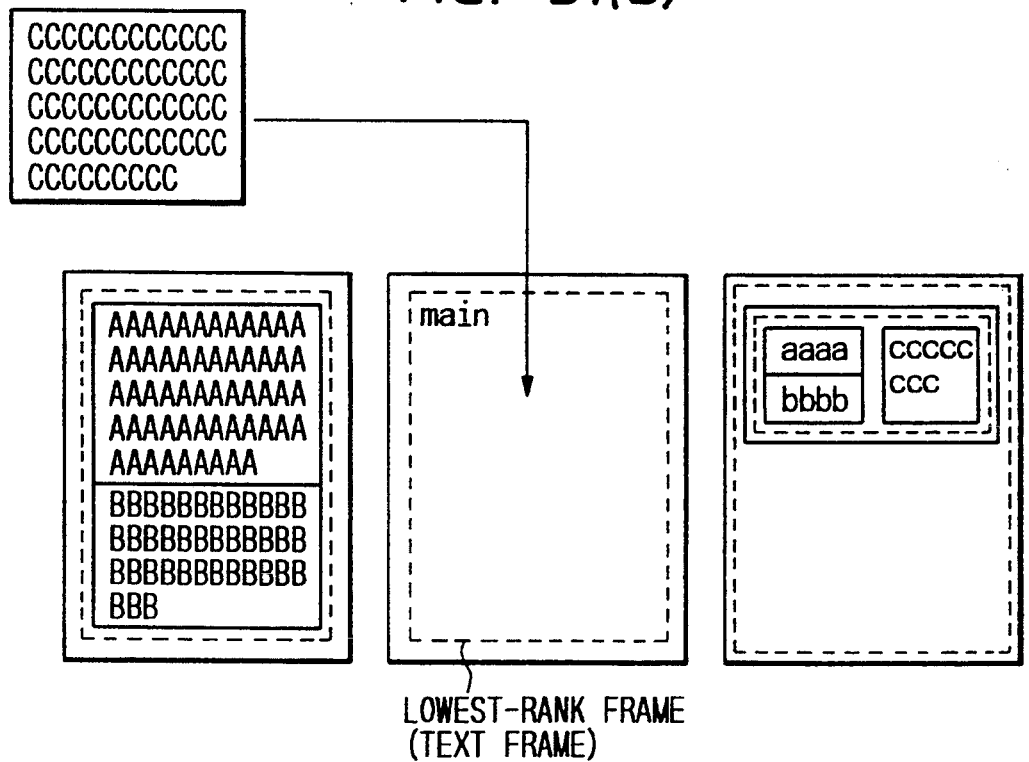
Figure 32:
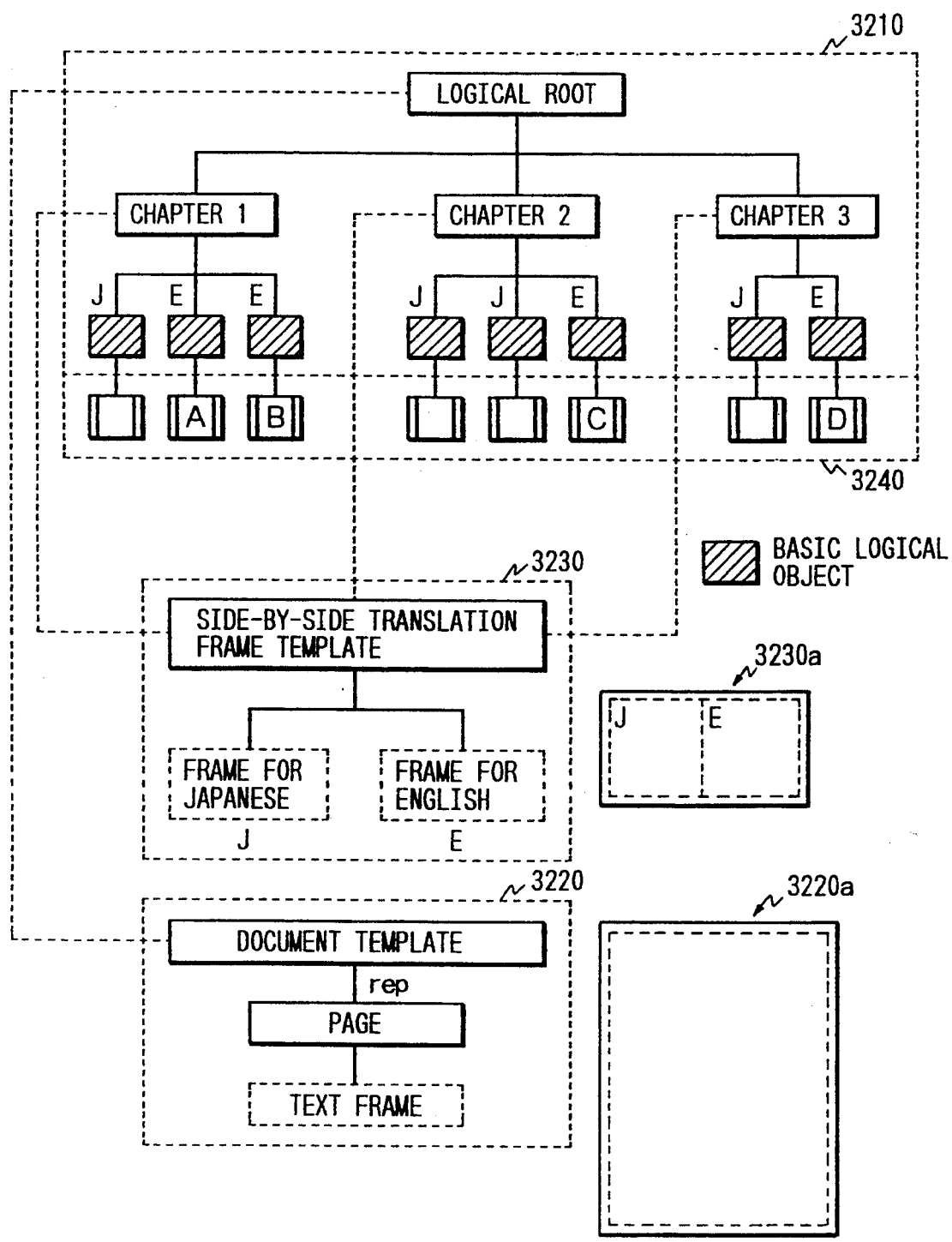
Figure 33A:
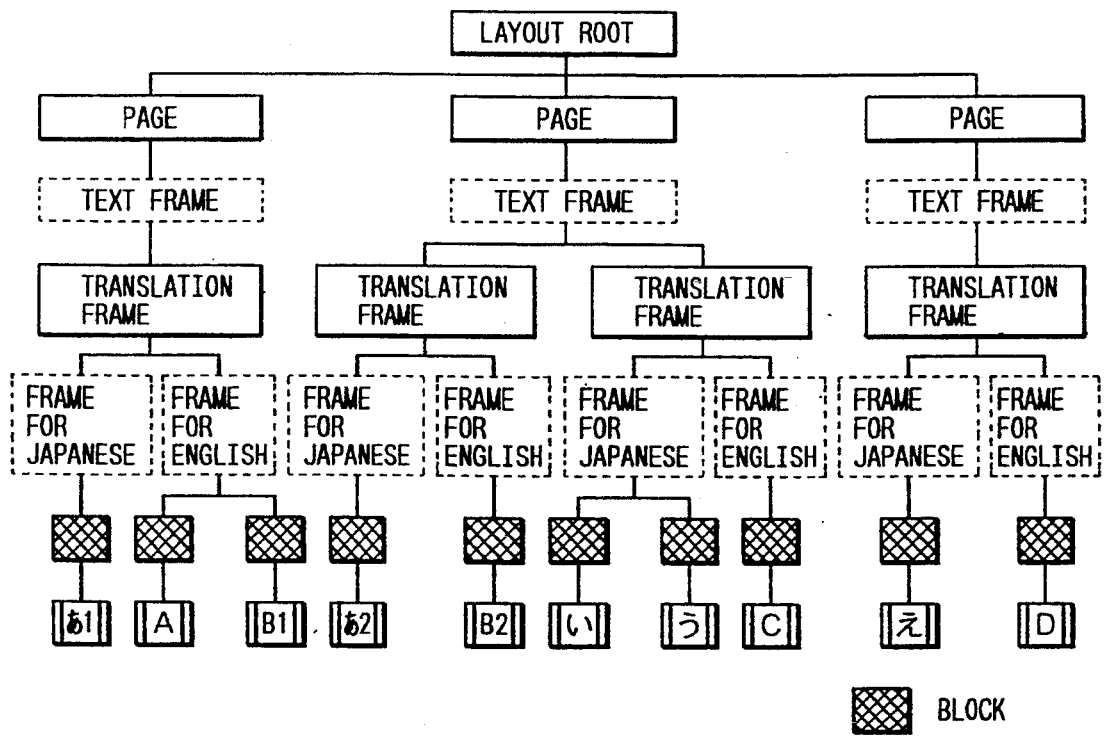
Figure 33B:
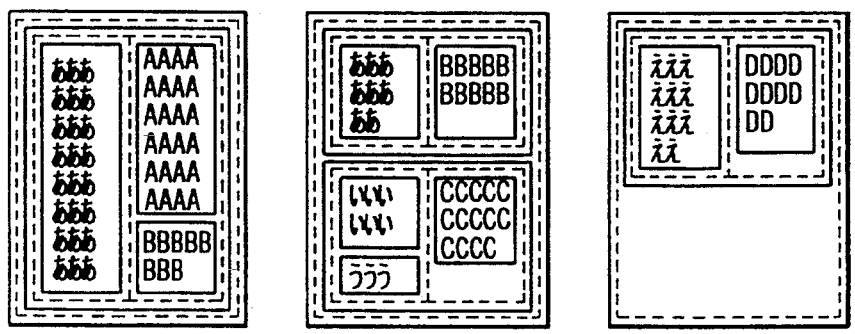
Figure 34:
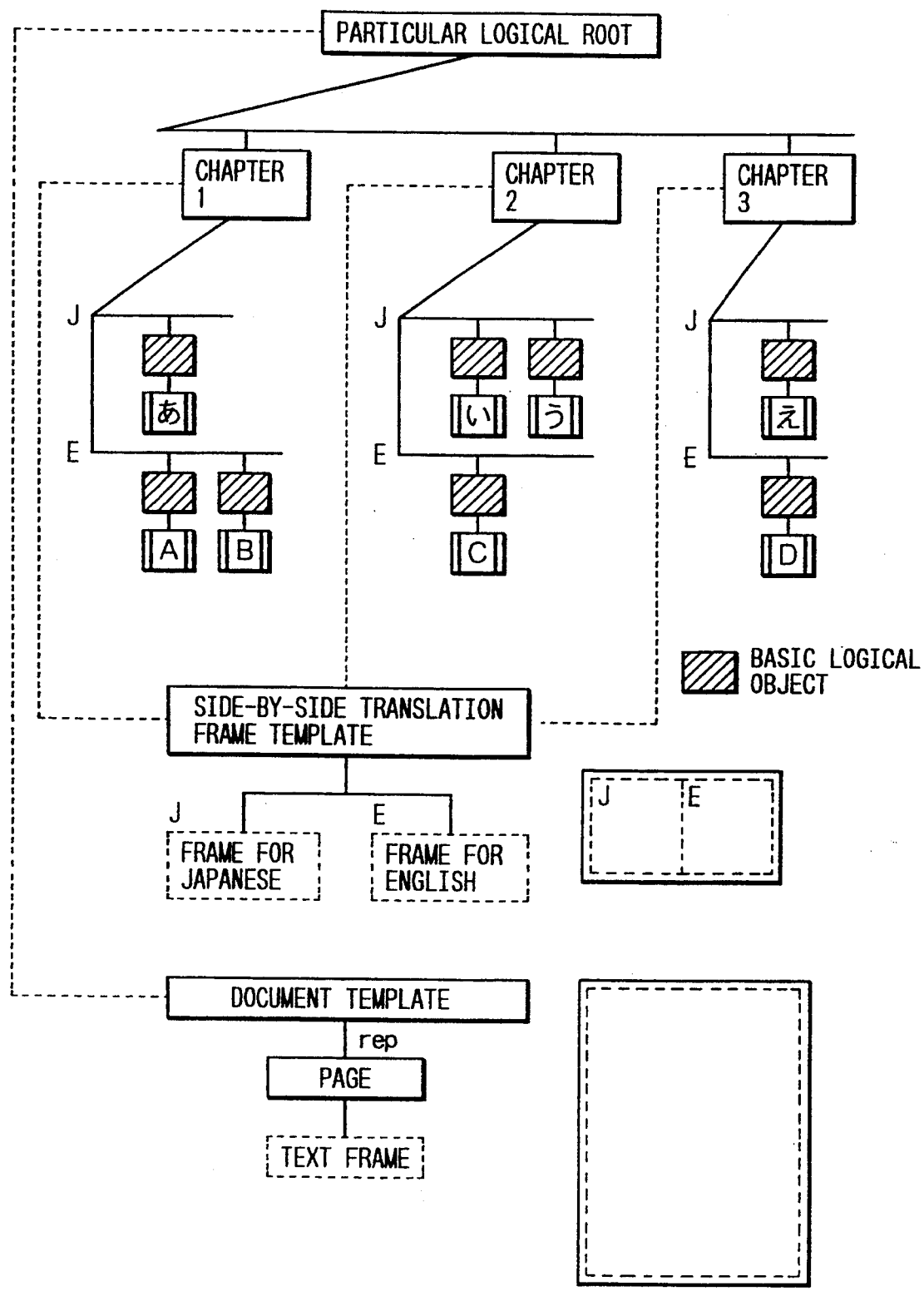
Figure 35:
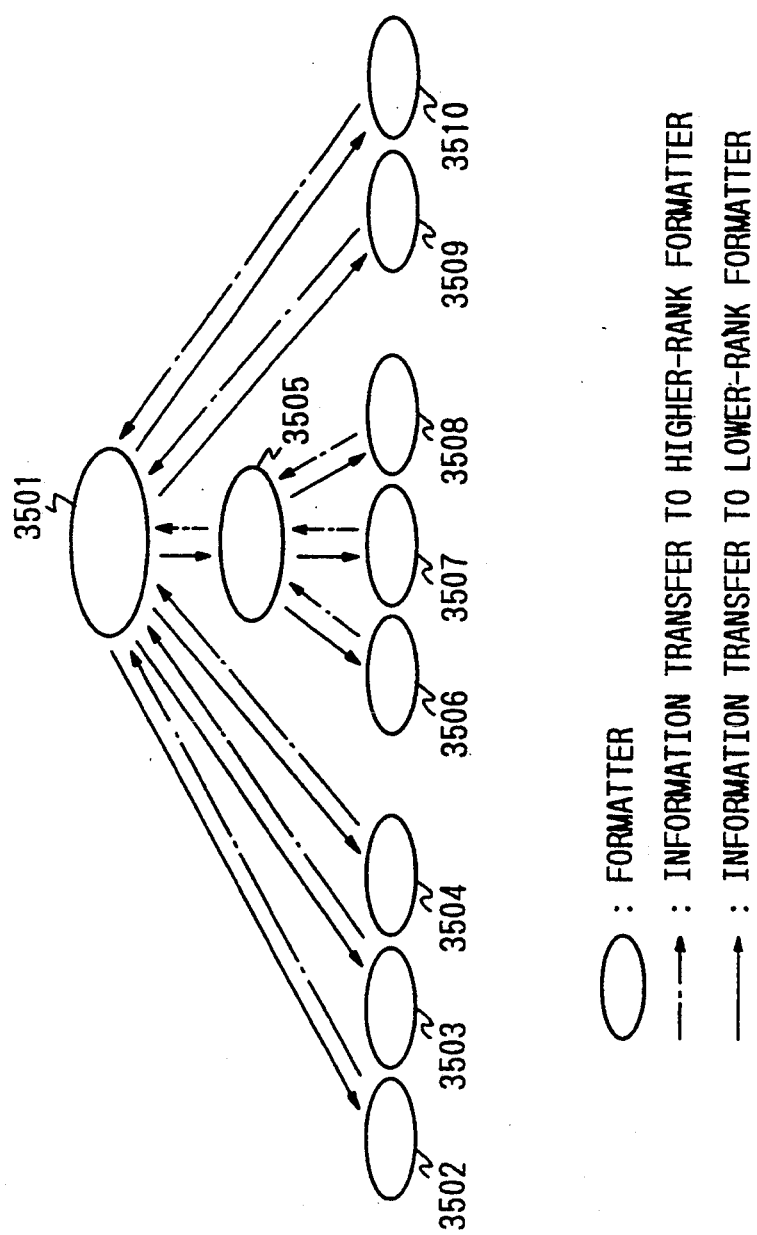
Figure 36:
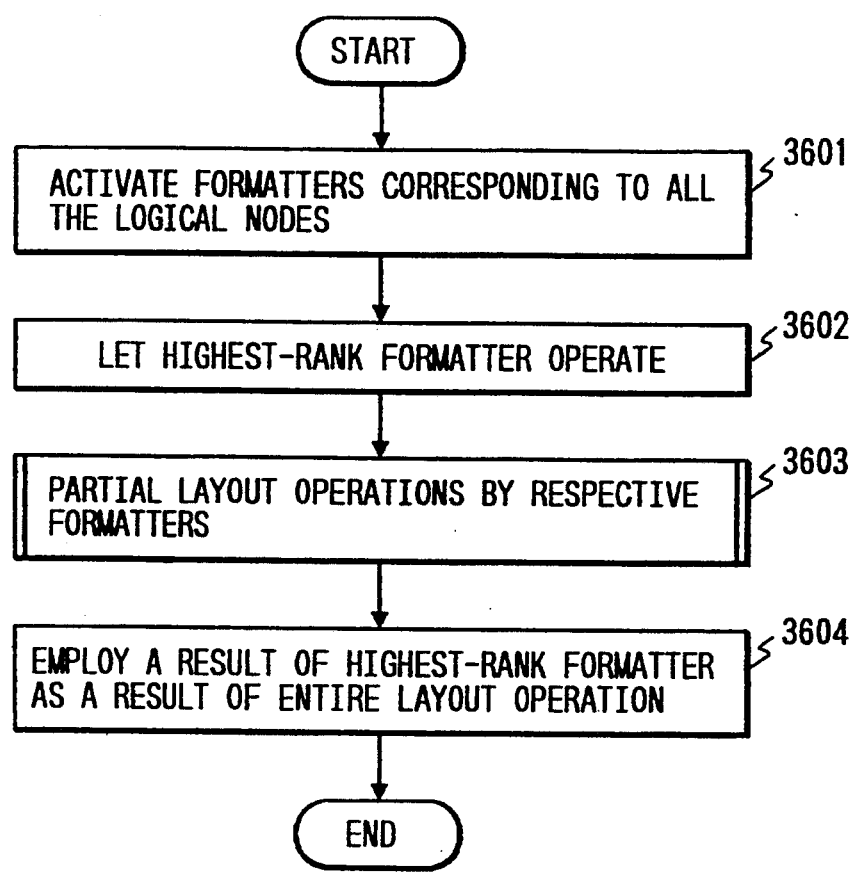
Figure 37:
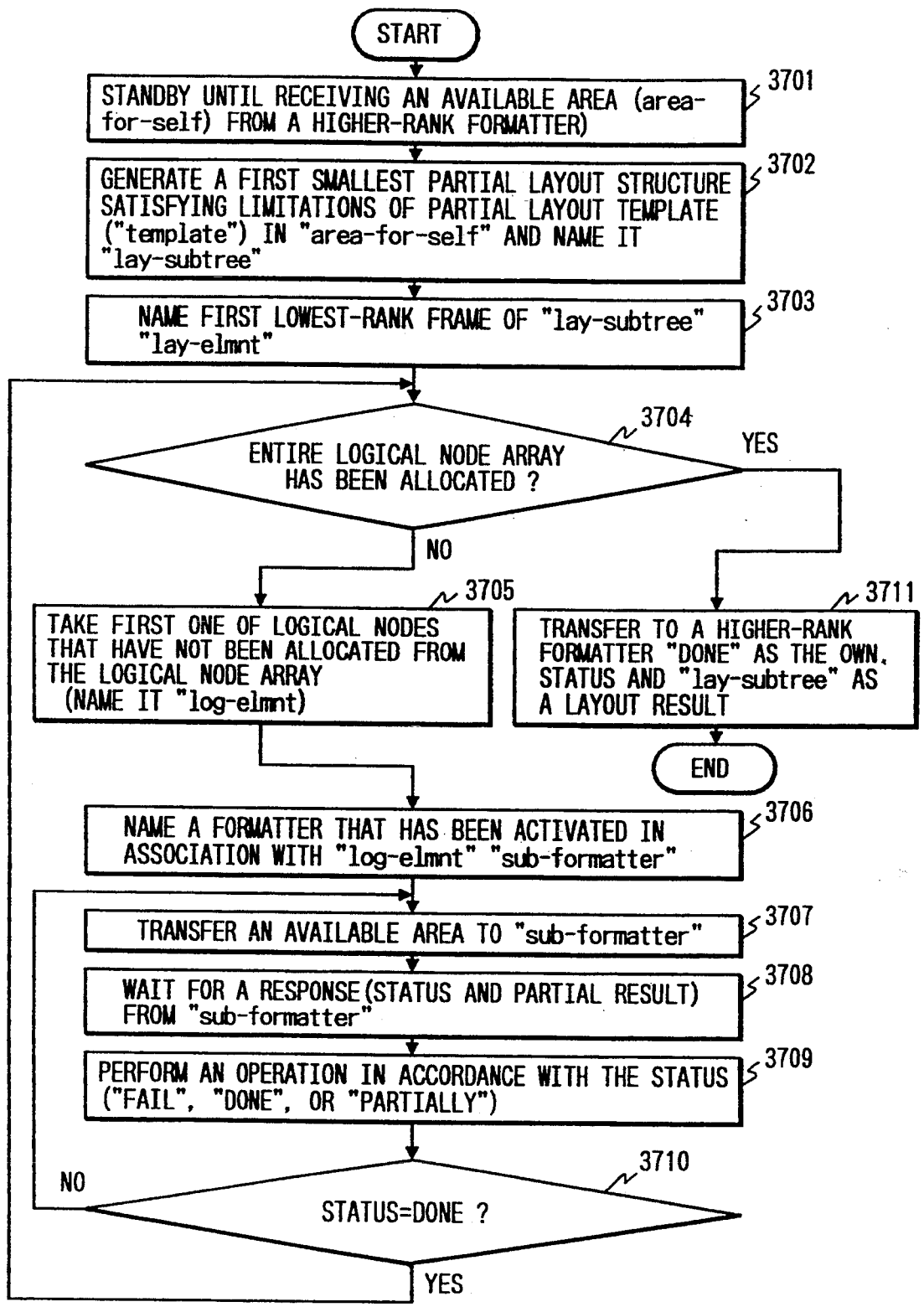
Figure 38:
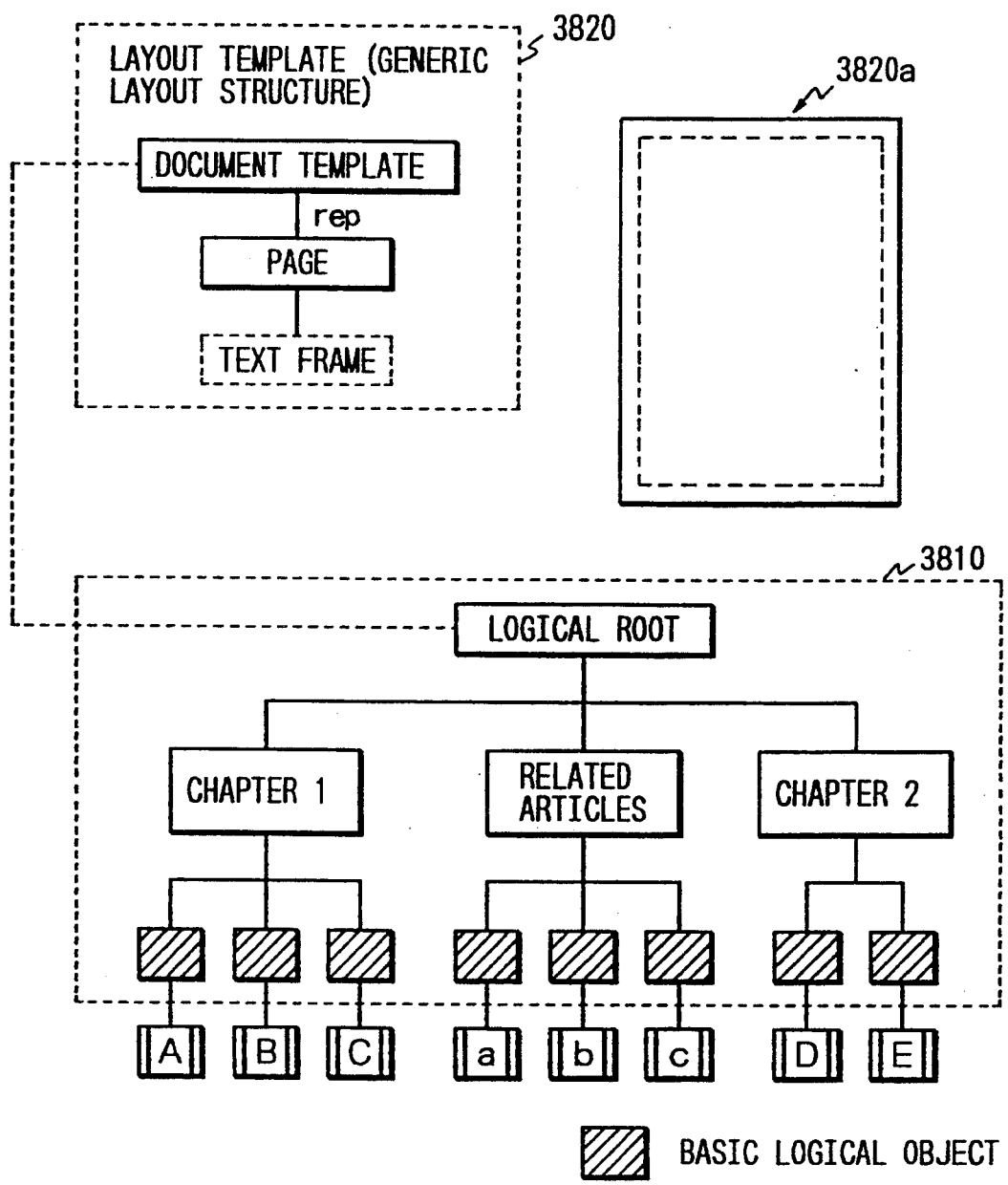
Figure 39A:
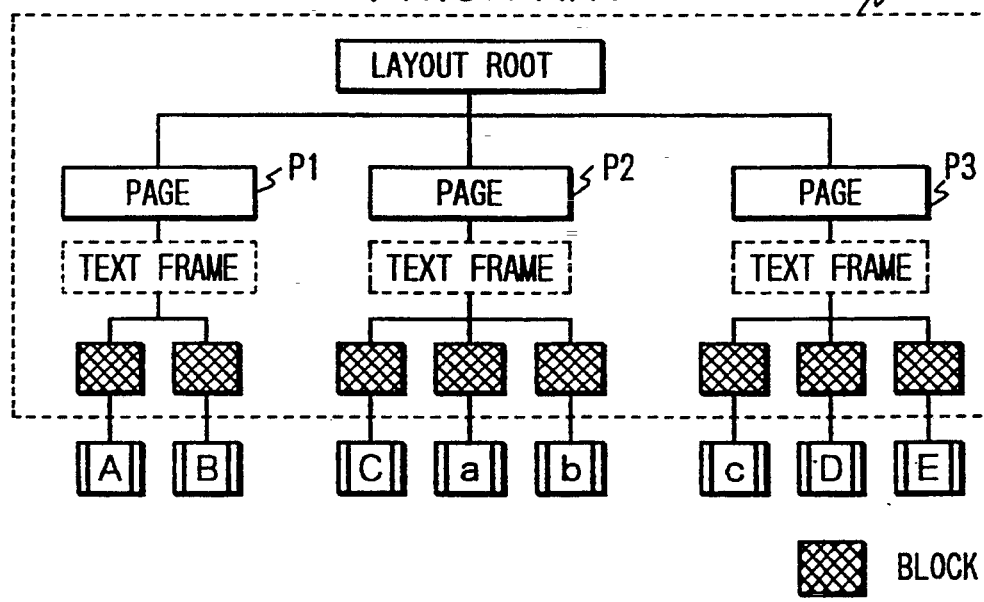
Figure 39B:
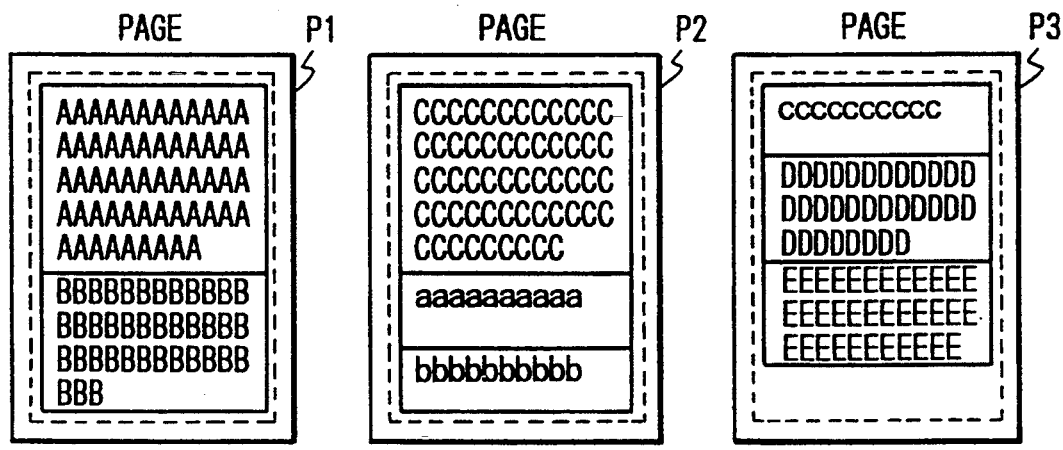
Figure 40:
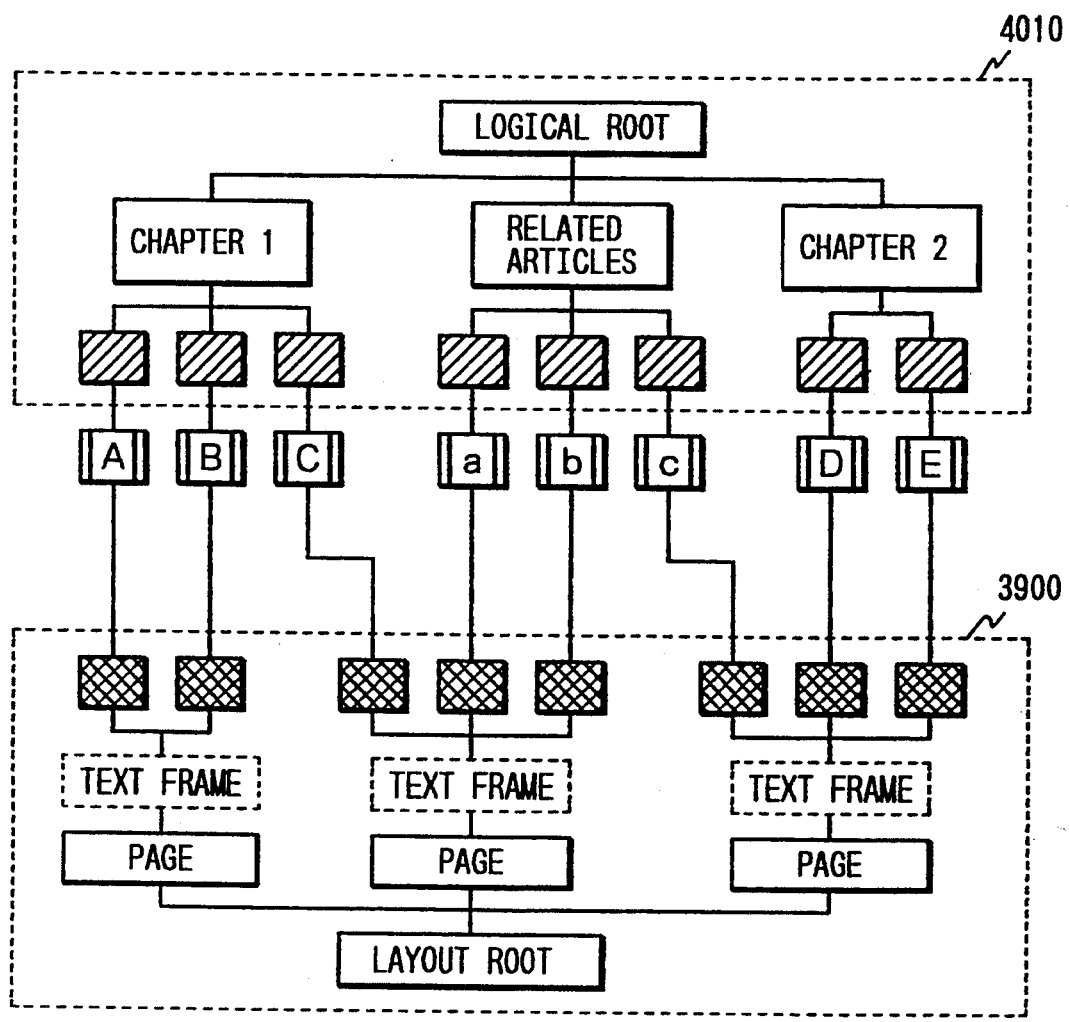

30(b) and 30(b) are charts illustrating the category-based partial layout operation of the fourth embodiment;

FIGS. 31(a) and 31(b) are charts illustrating the category-based partial layout operation of the fourth embodiment;

FIG. 32 is a chart illustrating the category-based partial layout operation of the fourth embodiment;

FIGS. 33(a) and 33(b) are charts illustrating the category-based partial layout operation of the fourth embodiment;

FIG. 34 is a chart illustrating the category-based partial layout operation of the fourth embodiment;

FIG. 35 is a chart illustrating formatters in a document processing device according to a fifth embodiment of the invention;

FIG. 36 is a flowchart illustrating a layout operation of the fifth embodiment;

FIG. 37 is a flowchart illustrating a partial layout operation performed by each formatter in the fifth embodiment;

FIG. 38 is a chart illustrating a relationship between a document logical structure and a layout template in a conventional document processing device;

FIGS. 39(a) and 39(b) are charts illustrating a layout result obtained by applying the layout template of FIG. 38 to the logical structure of FIG. 38;

FIG. 40 is a chart illustrating a correlating relationship between the logical structure of FIG. 38 and the layout structure of FIGS. 39(a) and 39(b).

Figure 41:
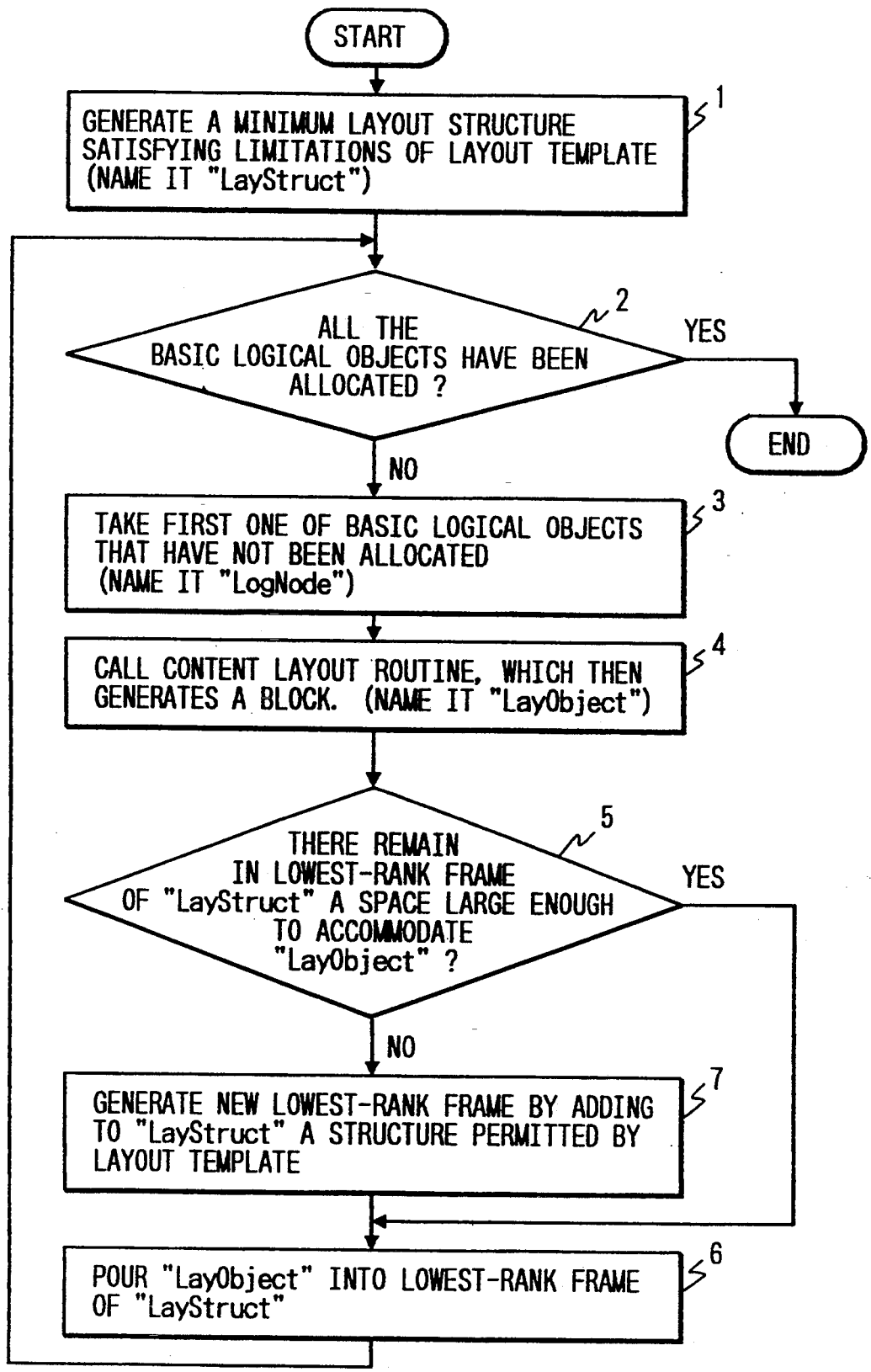
Figure 42:
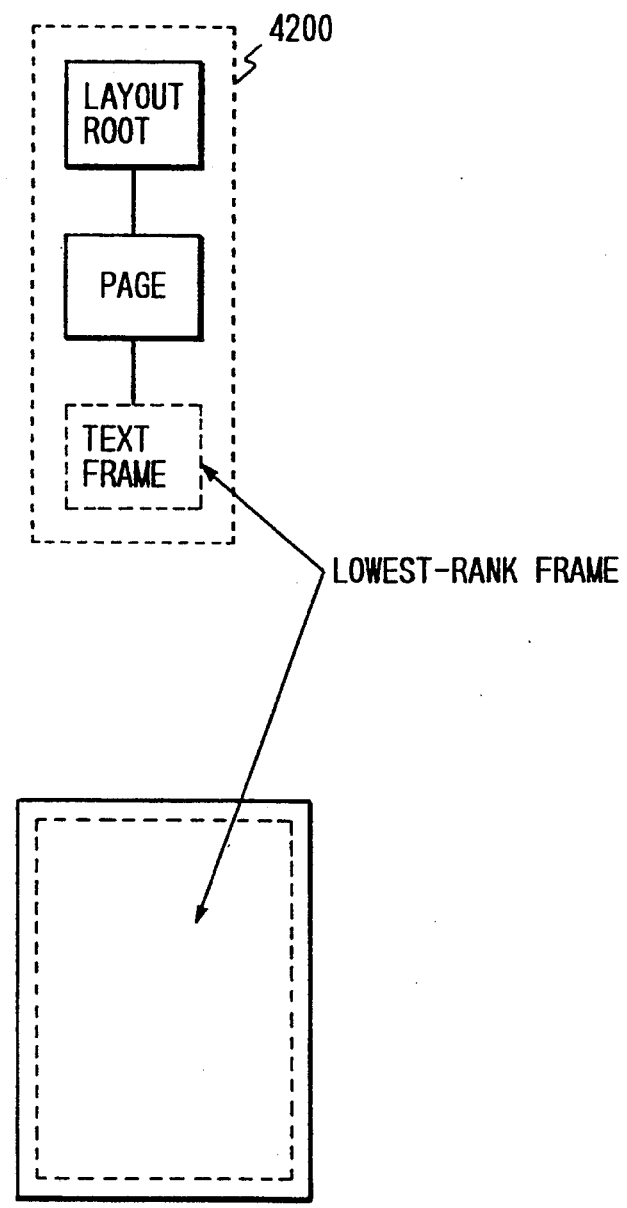
Figure 43A:
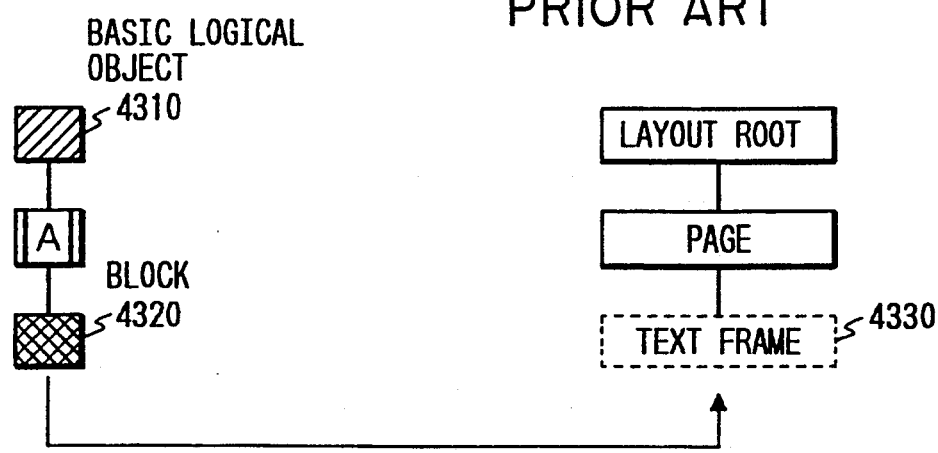
Figure 43B:
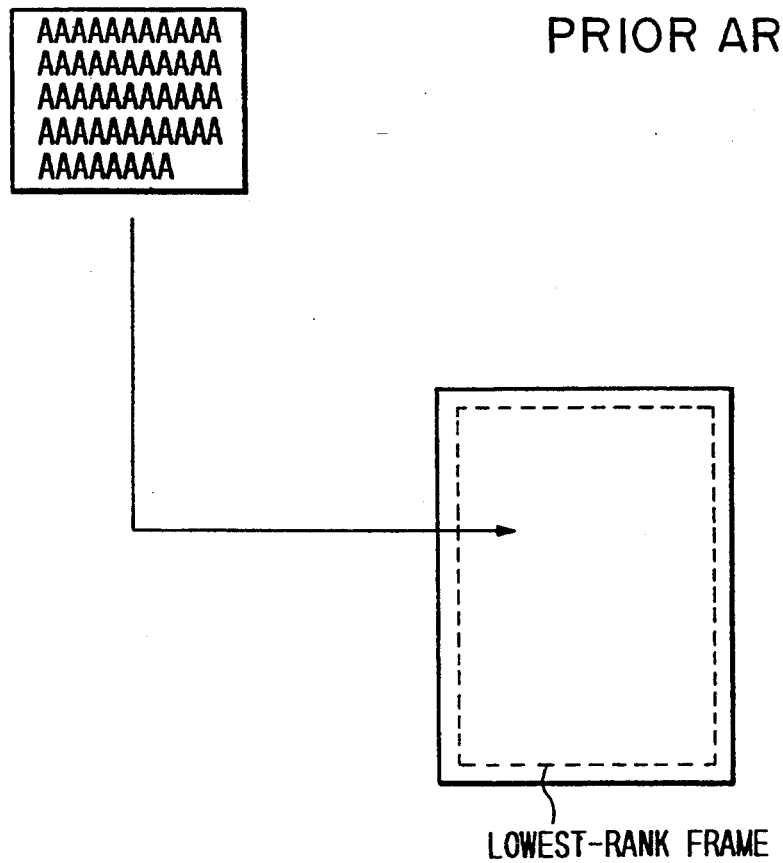
Figure 44A:
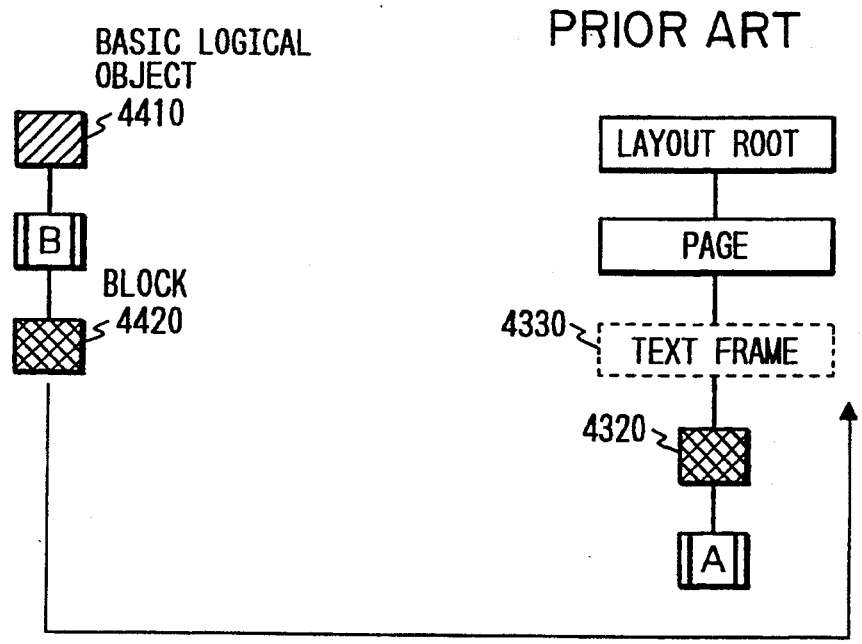
Figure 44B:
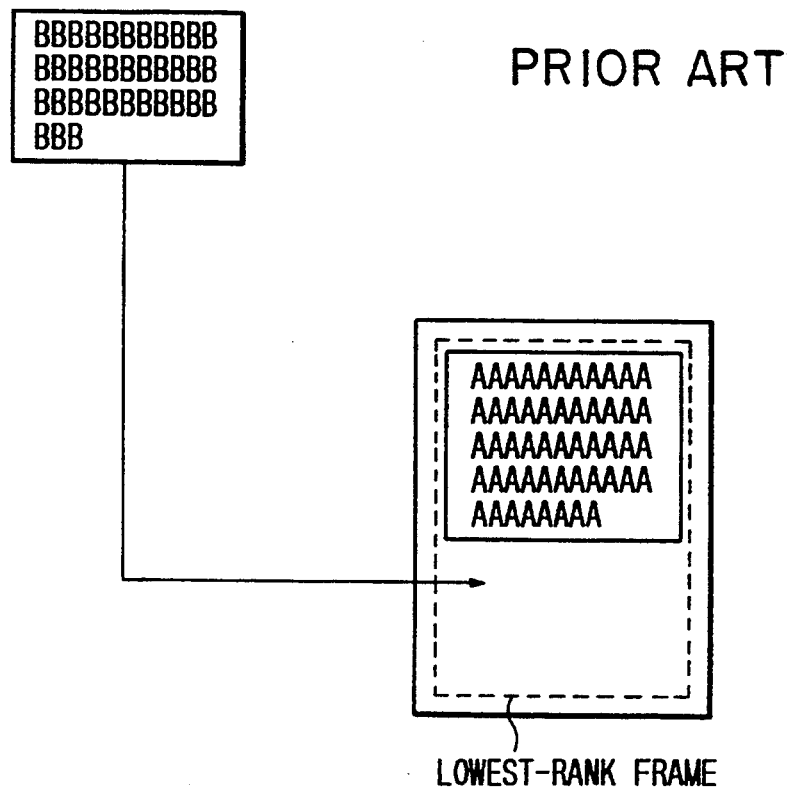
Figure 45A:
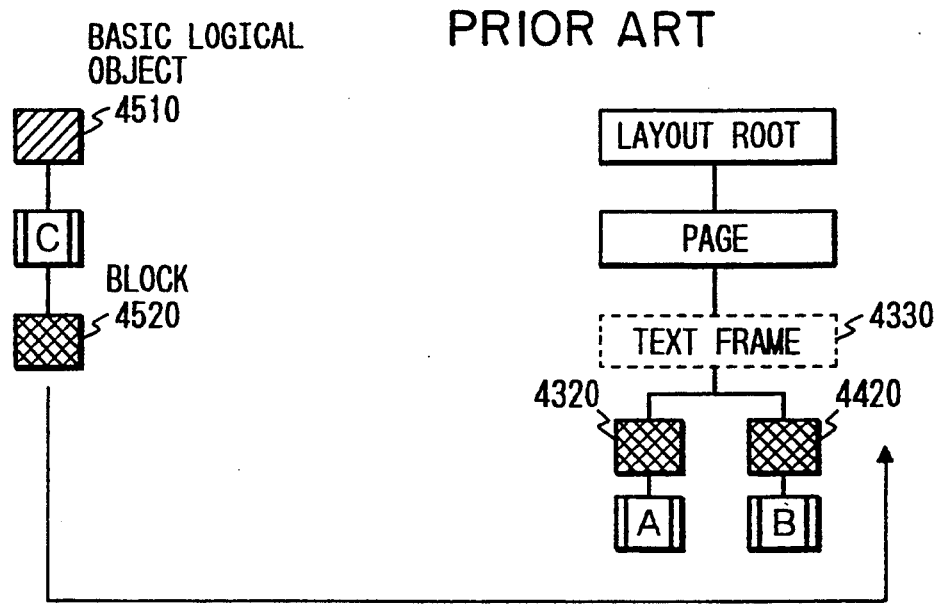
Figure 45B:
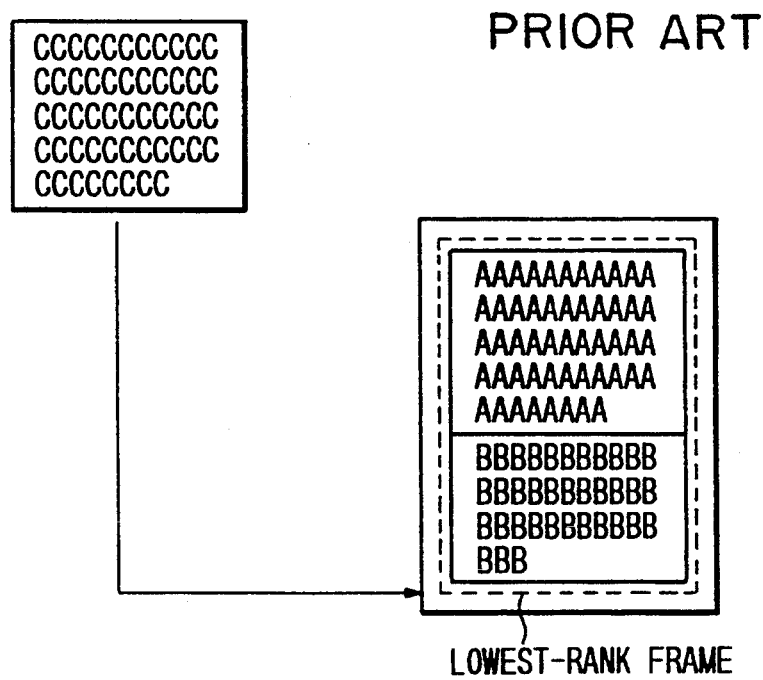
Figure 46A:
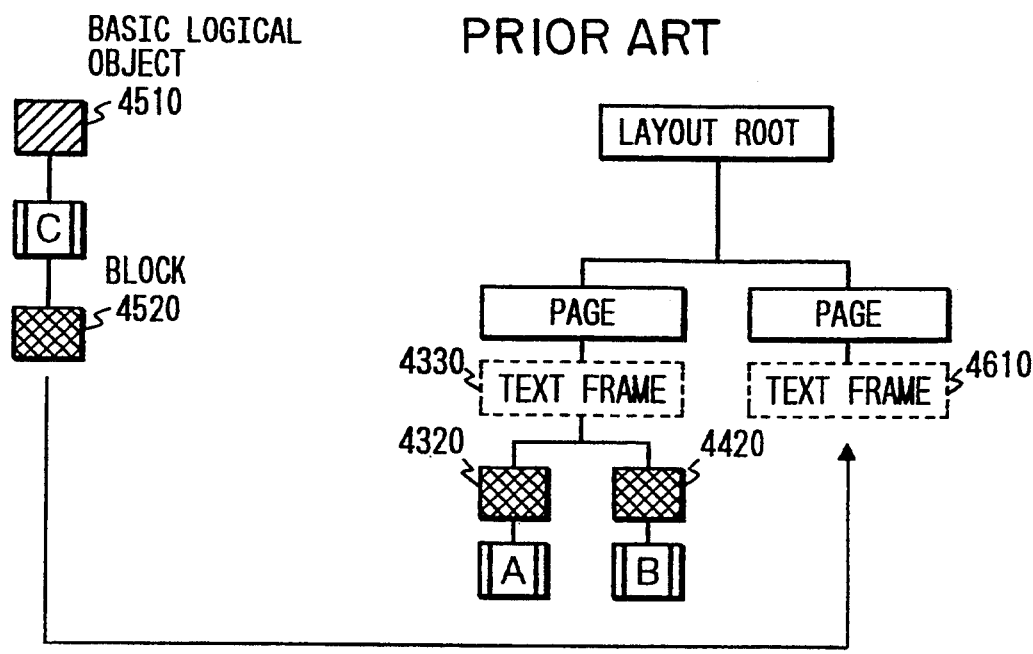
Figure 46B:
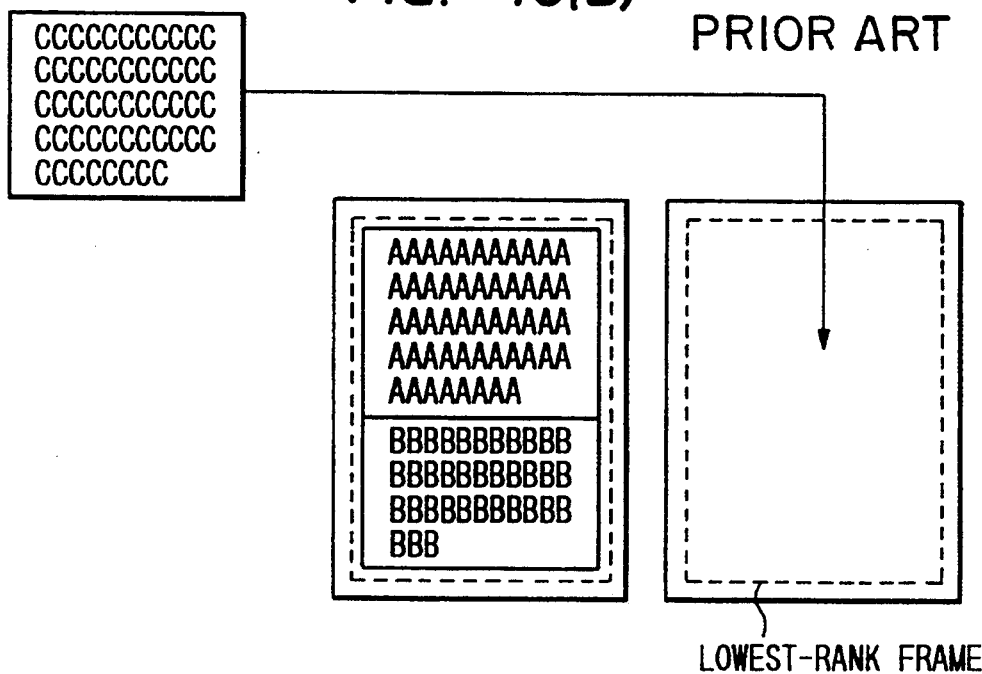
Figure 47:
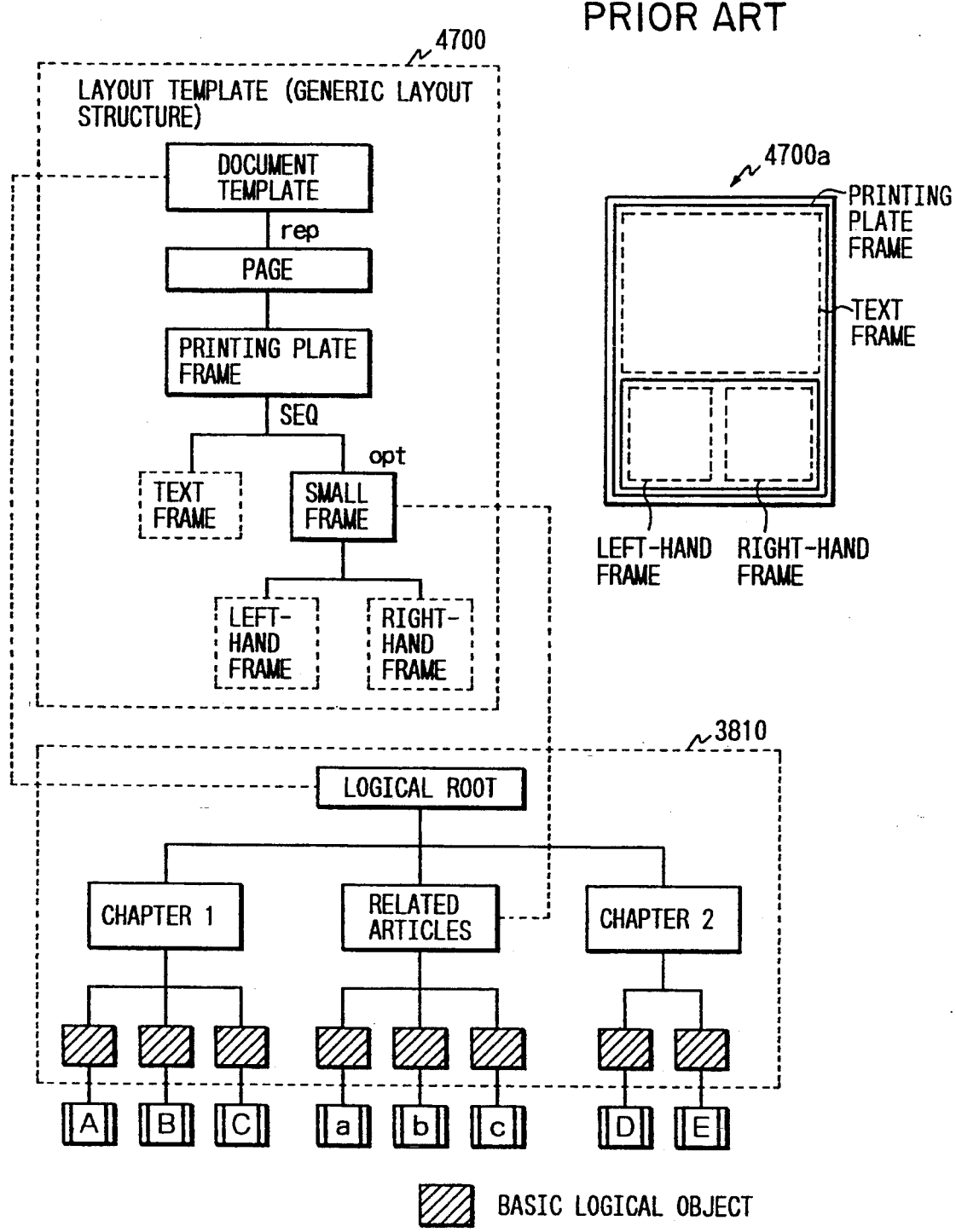
Figure 48A:
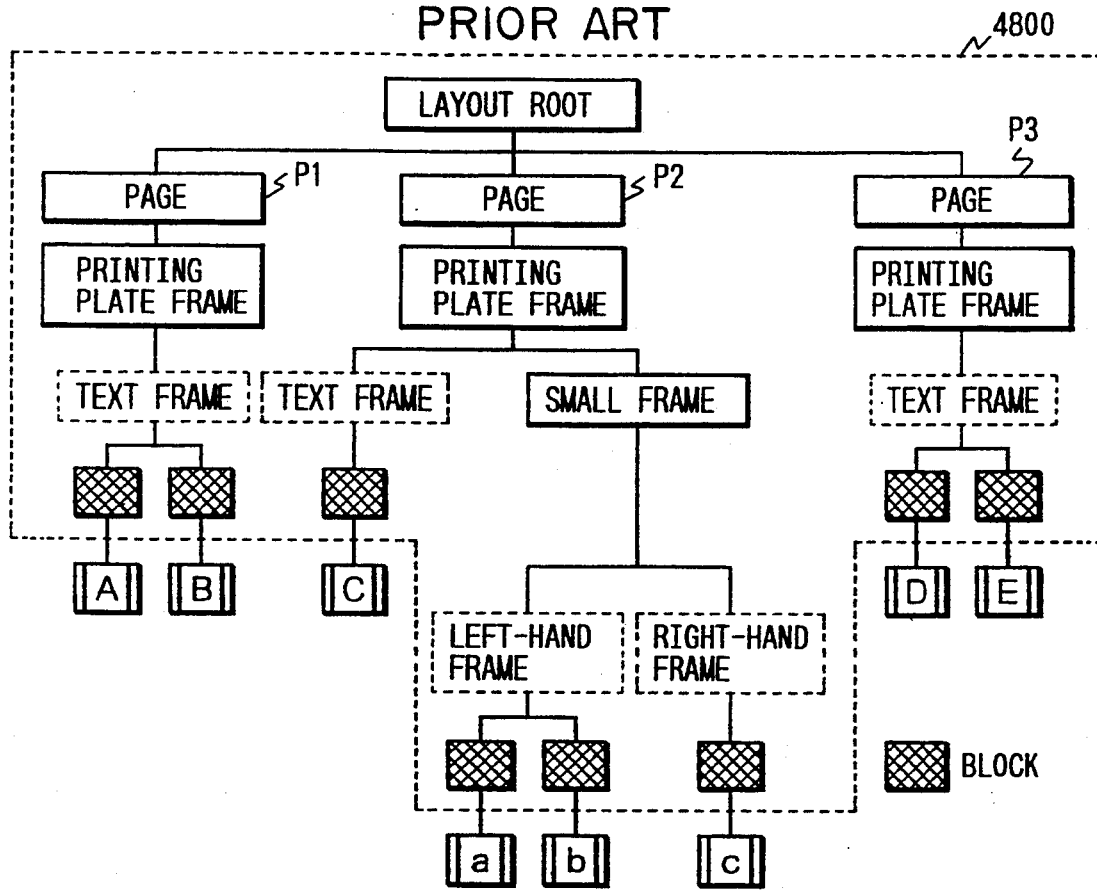
Figure 48B:
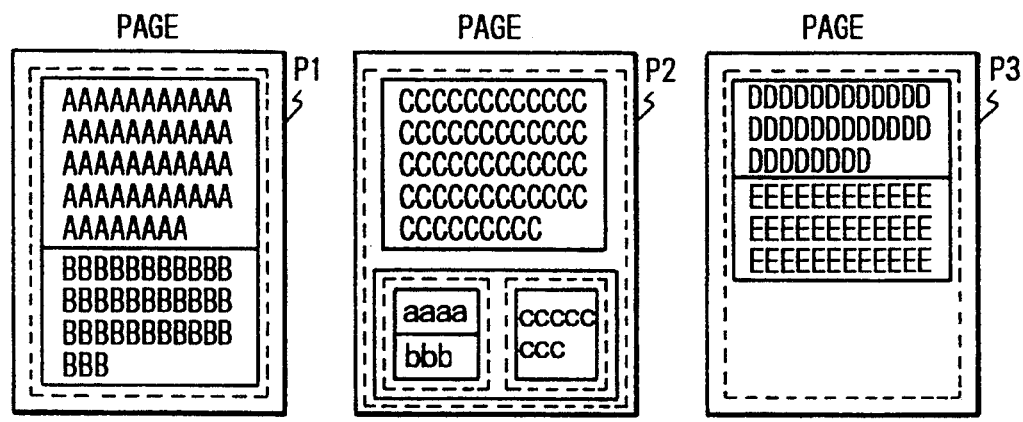
Figure 49A:
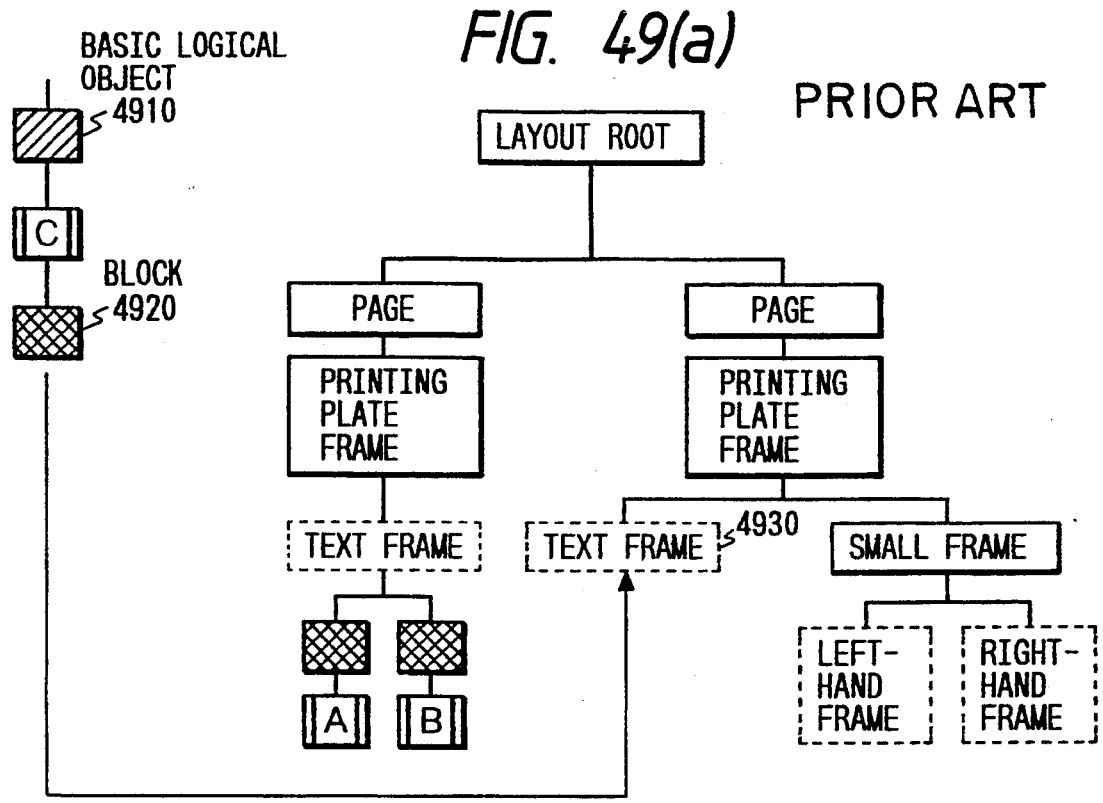
Figure 49B:
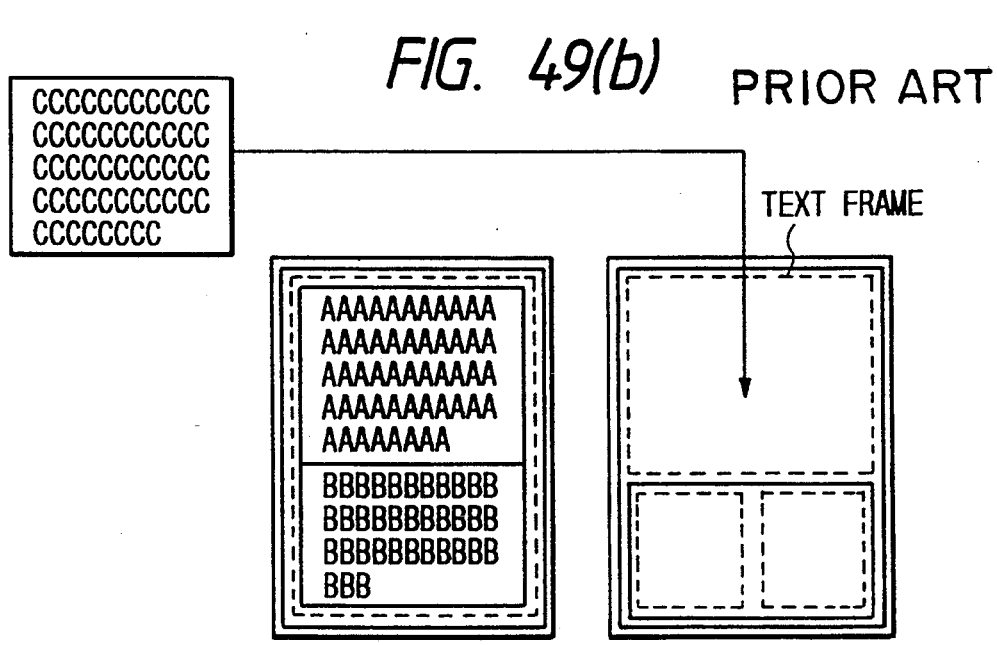
Figure 50A:
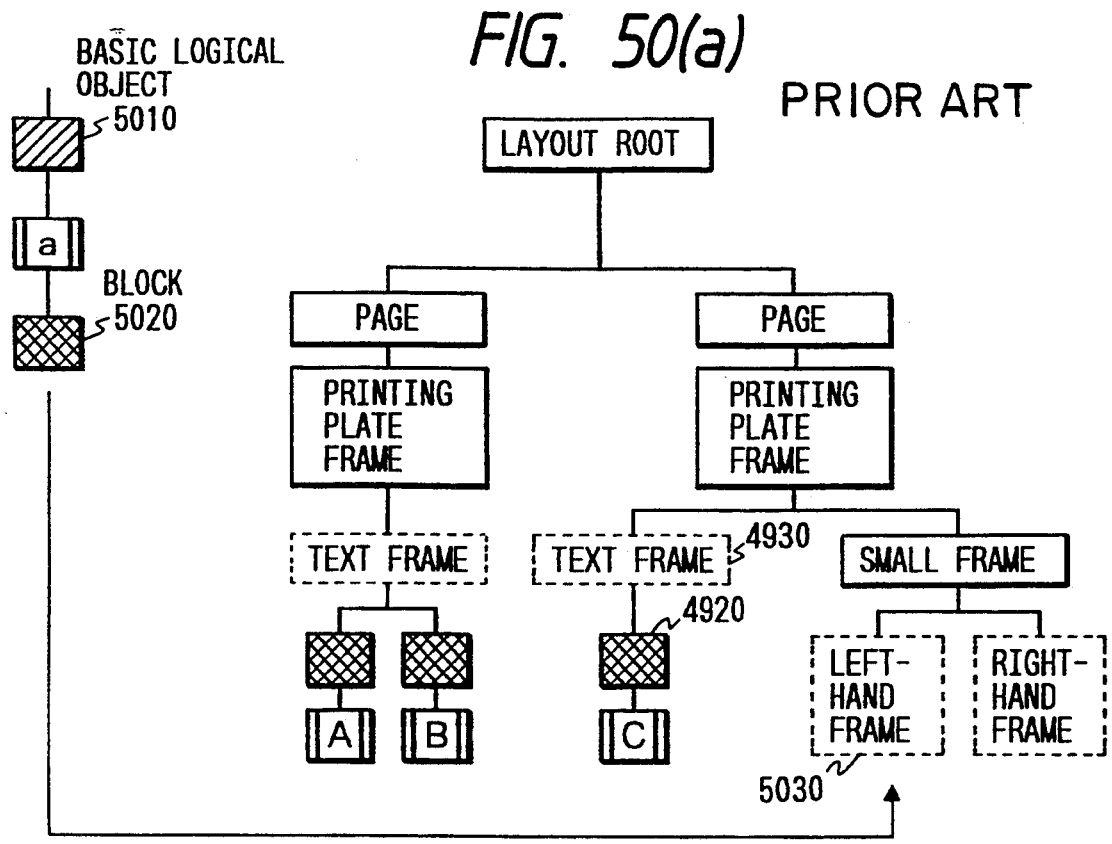
Figure 50B:
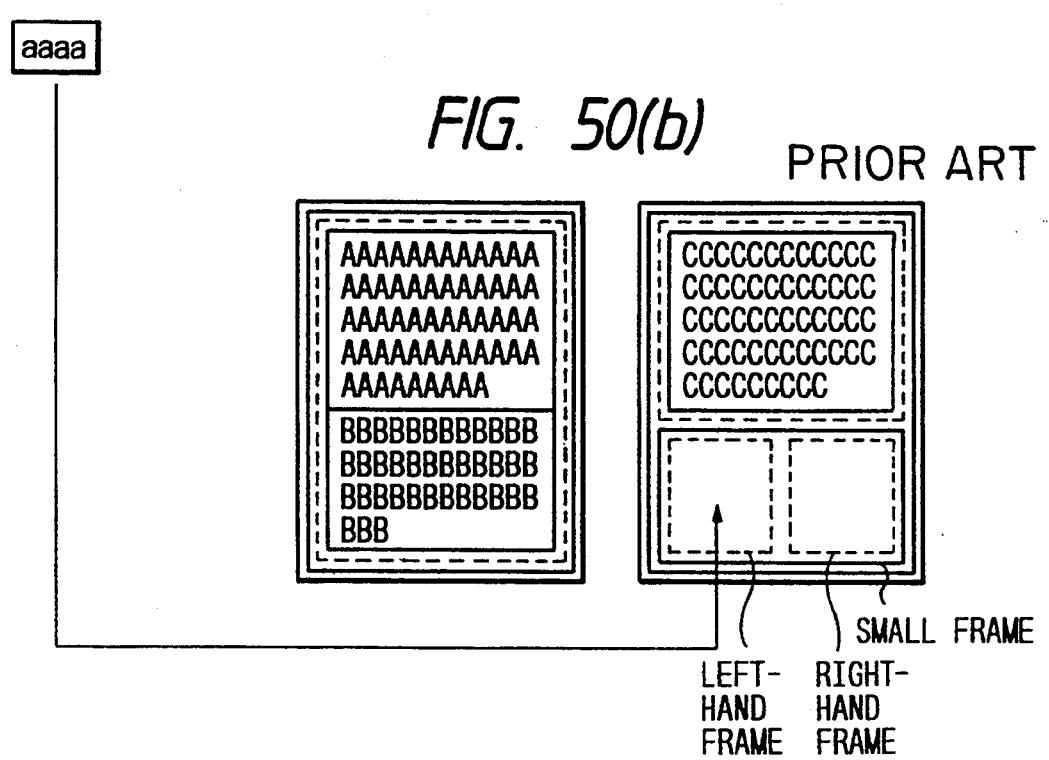
Figure 51A:
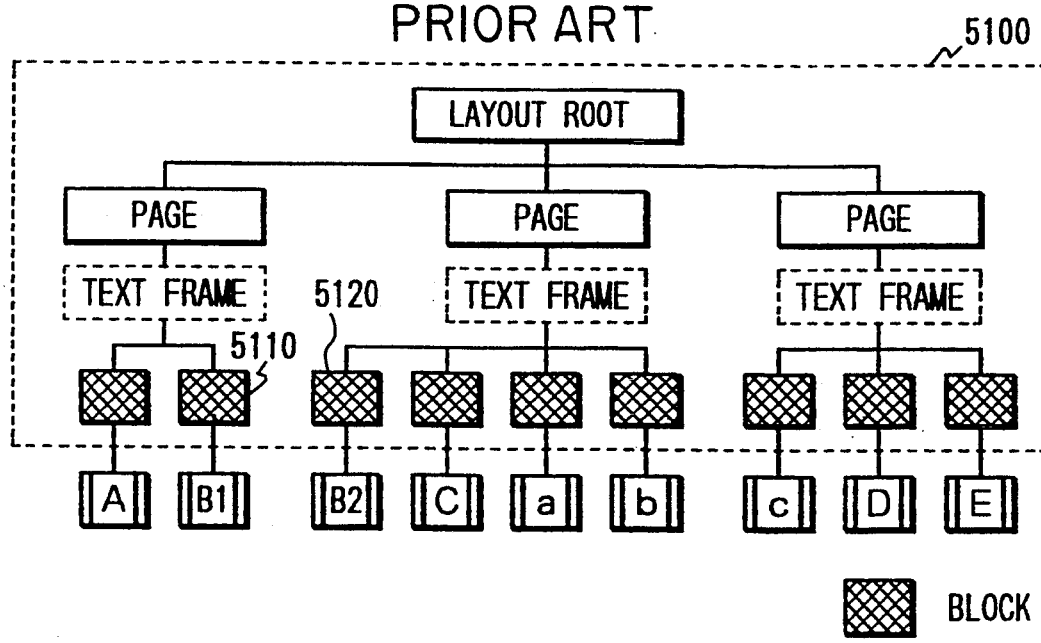
Figure 51B:
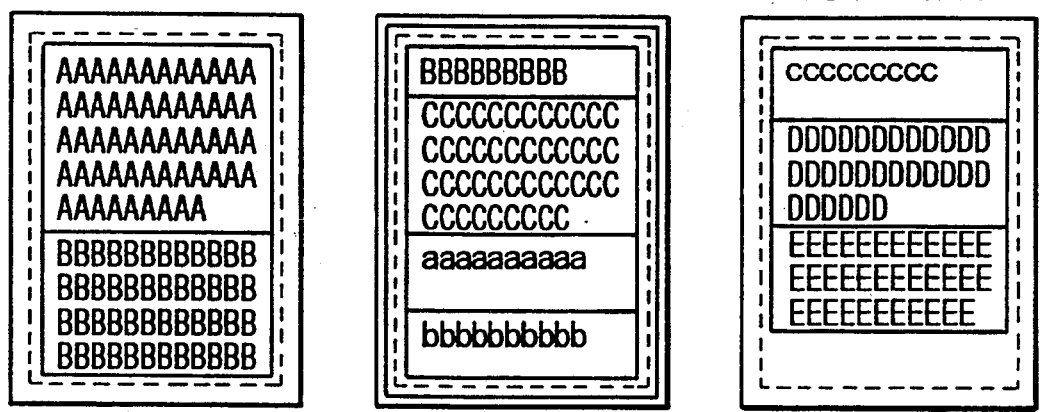
Figure 52A:
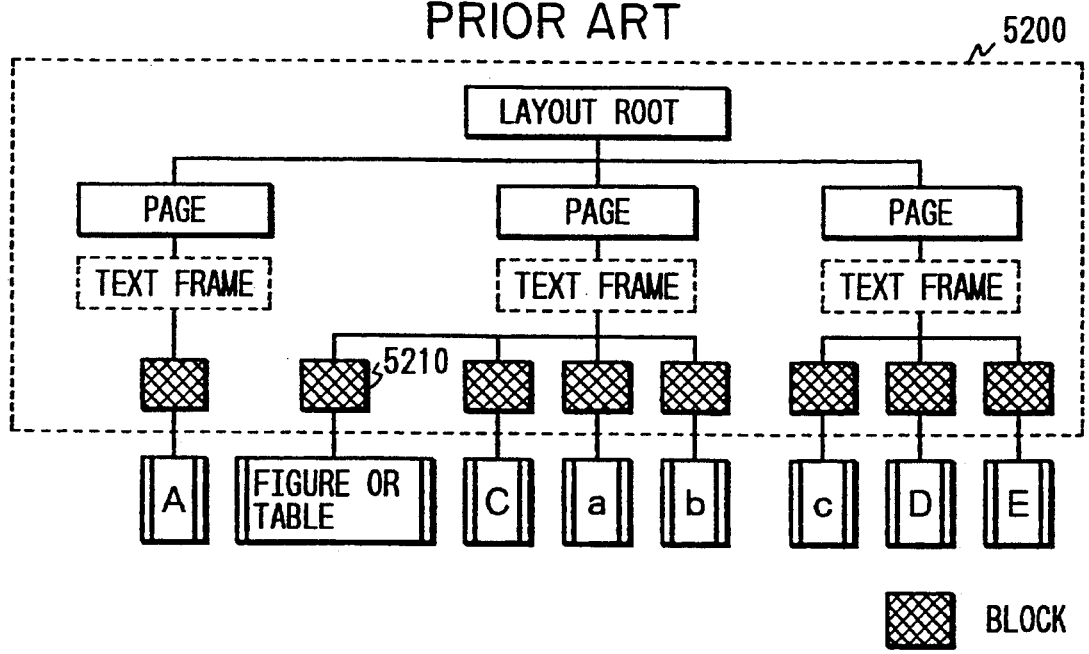
Figure 52B:
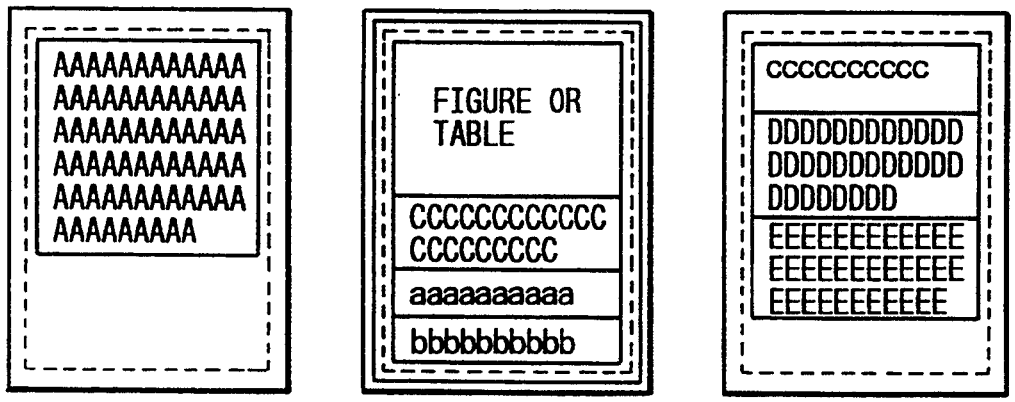
Figure 53:
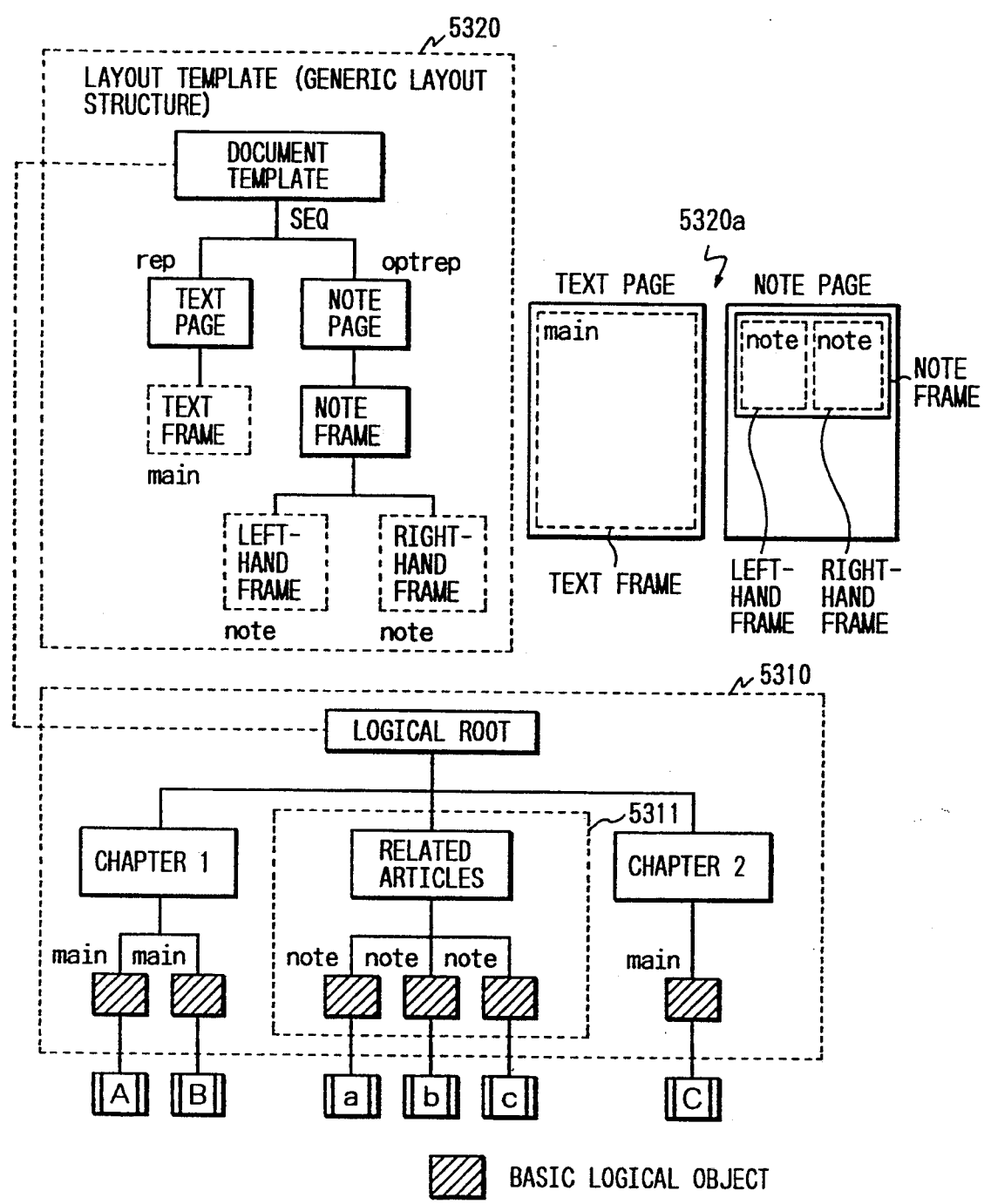
Figure 54A:
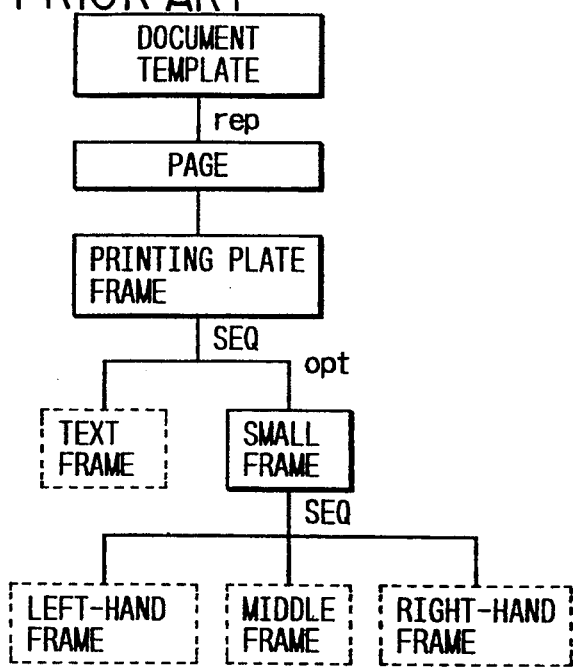
Figure 54B:
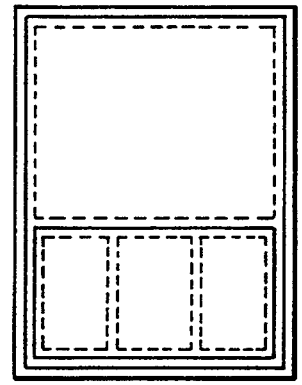
Figure 55:
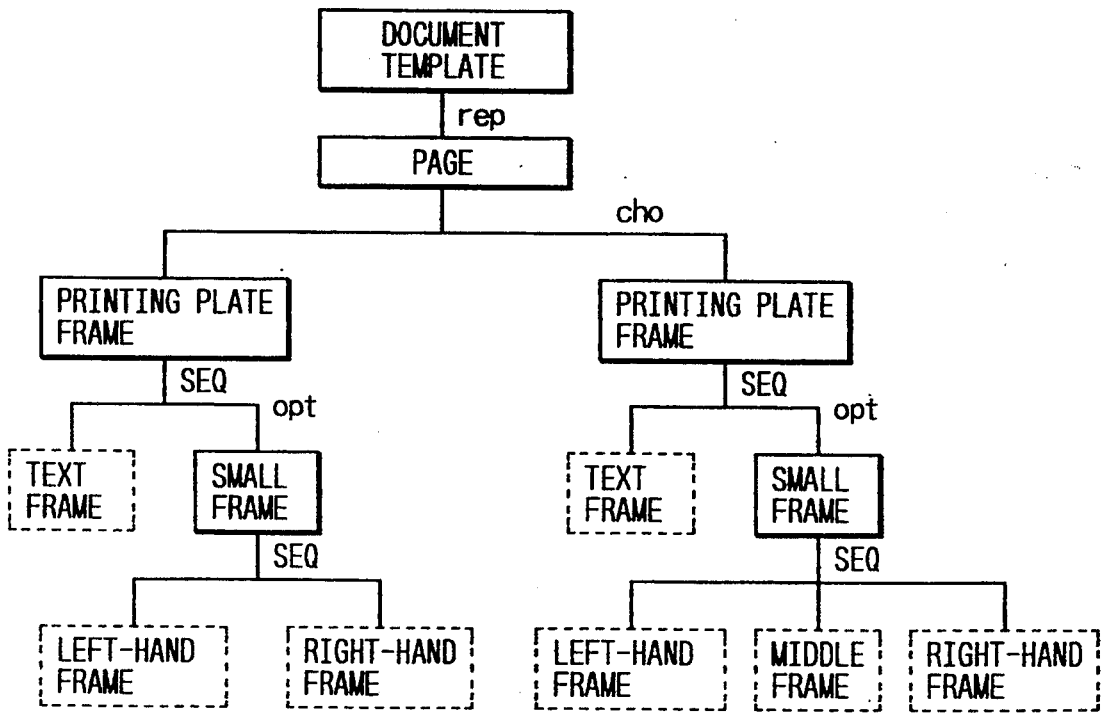

FIG. 41 is a flowchart showing a conventional layout operation;

FIG. 42 is a chart illustrating a step of the conventional layout operation;

FIGS. 43(a) and 43(b) are charts illustrating a step of the conventional layout operation;

FIGS. 44(a) and 44(b) are charts illustrating a step of the conventional layout operation;

FIGS. 45(a) and 45(b) are charts illustrating a step of the conventional layout operation;

FIGS. 46(a) and 46(b) are charts illustrating a step of the conventional layout operation;

FIG. 47 is a chart illustrating a corresponding relationship between a document logical structure and a layout template that expresses rules for producing a layout of a small frame in double column setting;

FIGS. 48(a) and 48(b) are charts illustrating a layout result obtained by applying the layout template of FIG. 47 to the logical structure of FIG. 47;

FIGS. 49(a) and 49(b) are charts illustrating a step of generating the layout structure of FIGS. 48(a) and 48(b);

FIGS. 50(a) and 50(b) are charts illustrating a step of generating the layout structure of FIGS. 48(a) and 48(b);

FIGS. 51(a) and 51(b) are charts illustrating a layout result obtained by a conventional top-down-type layout operation;

FIGS. 52(a) and 52(b) are charts illustrating a layout result obtained by a conventional bottom-up-type layout operation;

FIG. 53 is a chart illustrating a corresponding relationship between a document logical structure and a layout template for a conventional category-based layout operation;

FIGS. 54(a) and 54(b) are charts illustrating a layout template that expresses rules for producing a layout of a small frame in triple column setting in the conventional device; and FIG. 55 is a chart illustrating a layout template that expresses rules for producing a layout of a small frame in double or triple column setting in the conventional device.

DESCRIPTION OF THE PREFERRED EMBODIMENTS

Embodiments of the present invention are described hereinafter with reference to the accompanying drawings.

A first embodiment of the invention is described below with reference to FIGS. 1-10.

Figure 1:
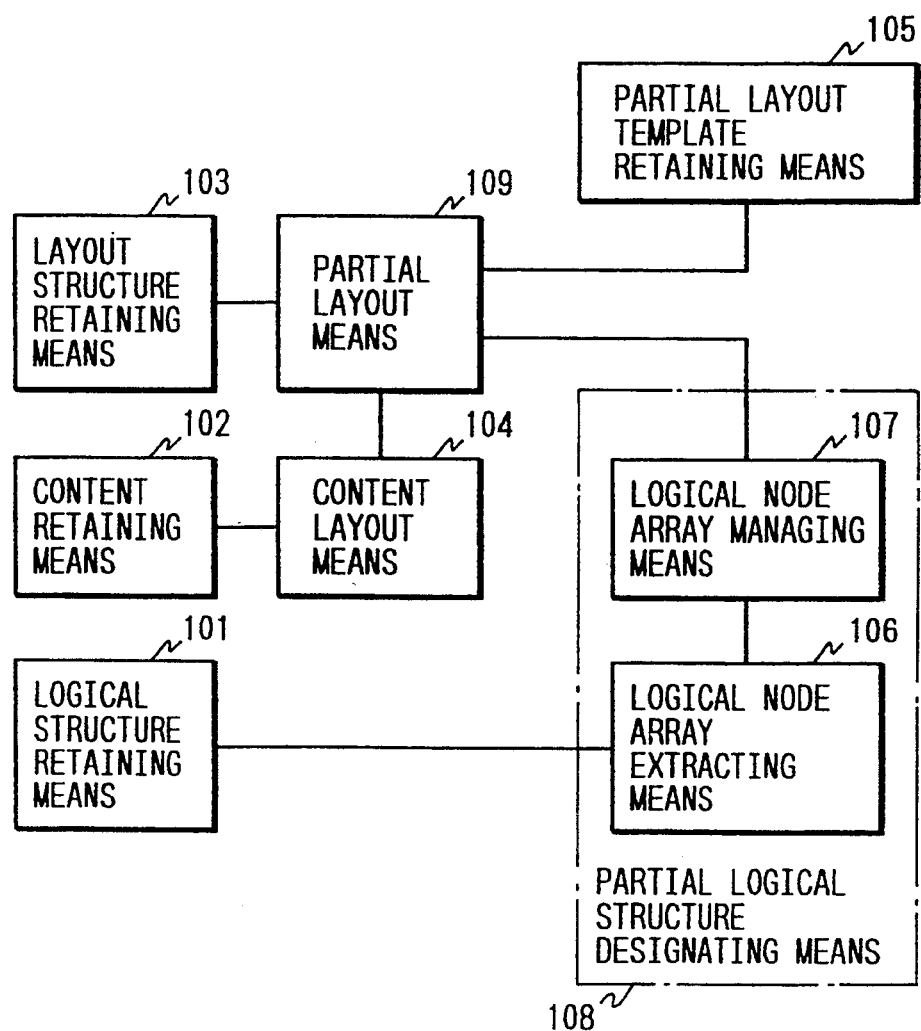
FIG. 1 is a functional block diagram showing a document processing device according to a first embodiment of the present invention.

FIG. 1 is a functional block diagram showing a document processing device according to the first embodiment of the invention. Specifically, this device is one that is applied to apparatuses having a document processing function, such as a word processor, work station and a computer.

In FIG. 1, the document processing device consists of a logical structure retaining means 101 for retaining a logical structure of a document; a content retaining means 102 for retaining contents of the document; a layout structure retaining means 103 for retaining a layout structure produced by applying a layout process to the logical structure; a content layout means 104 for generating a layout object (i.e., block) having a content to be disposed in a lowest-rank frame from a logical object (i.e., basic logical object) having the content; a partial layout template retaining means 105 for retaining partial layout templates (described later in detail); a partial logical structure designating means 108 having a logical node array extracting means 106 for extracting a logical node array (described later in detail) from the logical structure and a logical node array managing means 107 for managing the extracted logical node array; and a partial layout means 109 for producing a layout of a logical node array of one hierarchy according to rules of a partial layout template.

Each of the means 101-103, 105 and 107 is implemented by a storage device such as a hard disk or a main memory. Each of the means 104, 106 and 109 is implemented such that software (i.e., a program) is executed by a control means such as a processor or CPU. Alternatively, the means 104, 106 and 109 may be implemented by hardware or firmware.

Figure 2:
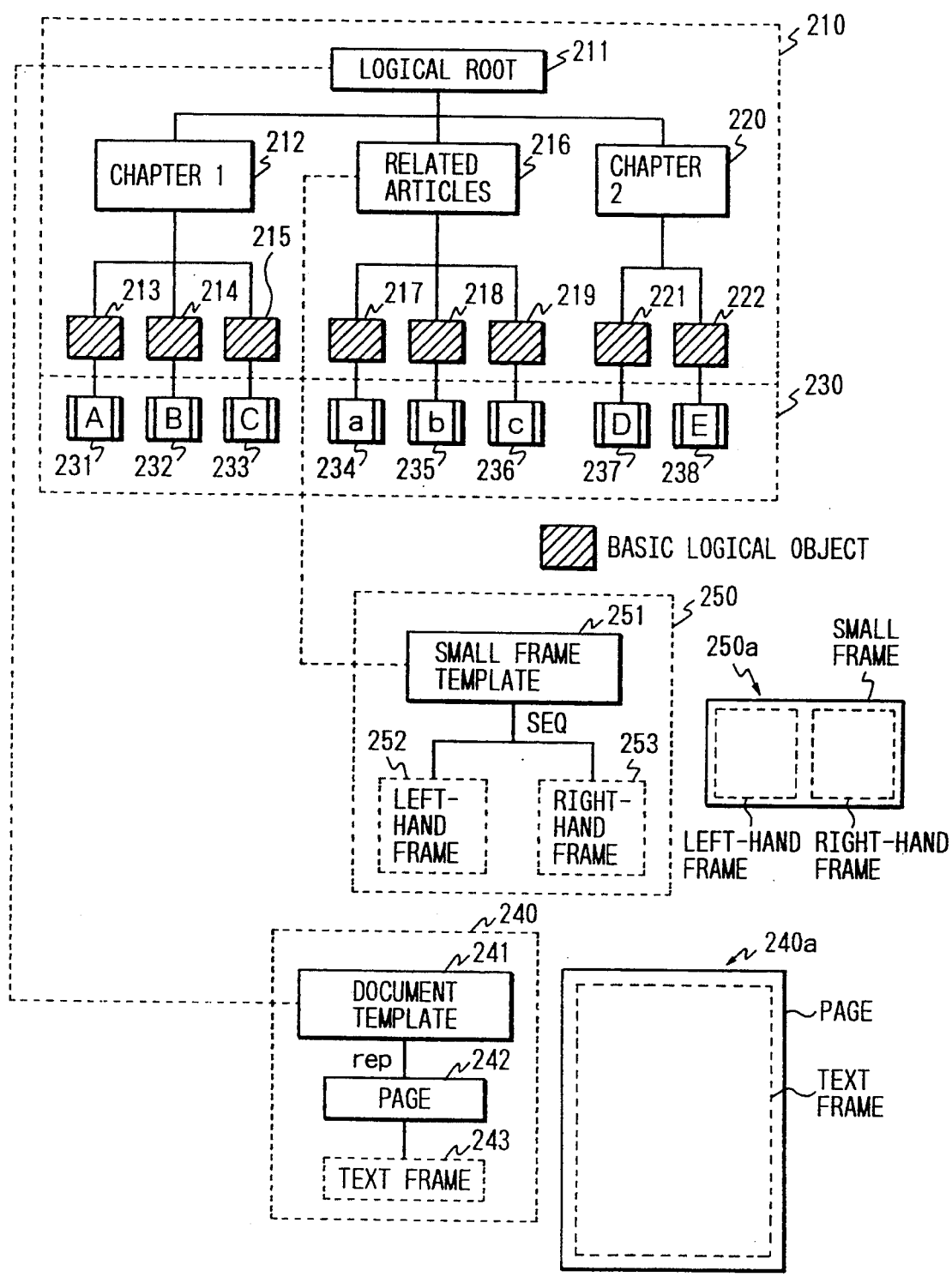
FIG. 2 is a chart illustrating a corresponding relationship between a document logical structure and partial layout templates in the first embodiment.

FIG. 2 shows an example of a logical structure of a document, document contents and a partial layout template. A logical structure 210, document contents 230 and partial layout templates 240 and 250 are retained by the logical structure retaining means 101, content retaining means 102 and partial layout template retaining means 105, respectively.

The logical structure 210 consists of logical objects 211-222, of which the logical objects 213-215, 217-219 and 221-222 are called a basic logical object. Each basic logical object has a corresponding one of content portions 231-238 that constitute the document contents 230. (In actual operations, the basic logical object designates the content portion by a pointer.)

Each of the partial layout templates 240 and 250 is rules for the layout of a logical node array of one hierarchy. The partial layout template 240 consists of layout object classes 241-243, and the partial layout template 250 consists of layout object classes 251-253. The layout object class 241 ("document template"), which is a layout root, is designated by the logical object class 211 ("logical root"), which is a root of the logical structure 210. The layout object class 251 ("small frame template"), which is a layout root, is designated by the logical object 216 ("related articles"). The layout object classes 243, 252 and 253 serve to generate a lowest-rank frame. In the above-mentioned ODA, each partial layout template is expressed as a partial structure of a generic layout structure. It is noted that the layout template 3820 of FIG. 38 is reused in FIG. 2 as the partial layout template 240. In FIG. 2, symbols 240a and 250a represent layout images expressed by the partial layout templates 240 and 250, respectively.

In this embodiment, among the logical objects constituting the logical structure, the basic logical objects and the logical objects designating the partial layout template are called a "logical node." When necessary, the term "basic logical object" or "logical object" is added to the term "logical node" for discrimination. The logical node has a role of designating activation of the partial layout means 109 or the content layout means 104.

In this embodiment, when the partial layout means 109 for performing the partial layout operation is called, the logical node array extracting means 106 extracts, as preprocessing, a logical node array from the logical structure of a document, and the extracted logical node array is managed by the logical node array managing means 107 as information indicating a logical structure range to be processed. The logical node array clearly defines the range to which the partial layout template is to be applied. When logical nodes exist in a lower-rank structure of a certain logical node array, an array of the lower-rank nodes is regarded as nested in the higher-rank node. Since the root of a logical structure designates a partial layout template for the entire logical structure, logical nodes of a logical node group located below the root constitute a logical node array nested in the logical node of the root. The nesting further extends such that logical nodes of a further lower rank are nested in the logical node of the logical node array, and finally logical nodes constituted of basic logical objects, which are leaves of the logical structure, having respective contents are nested.

Figure 3:
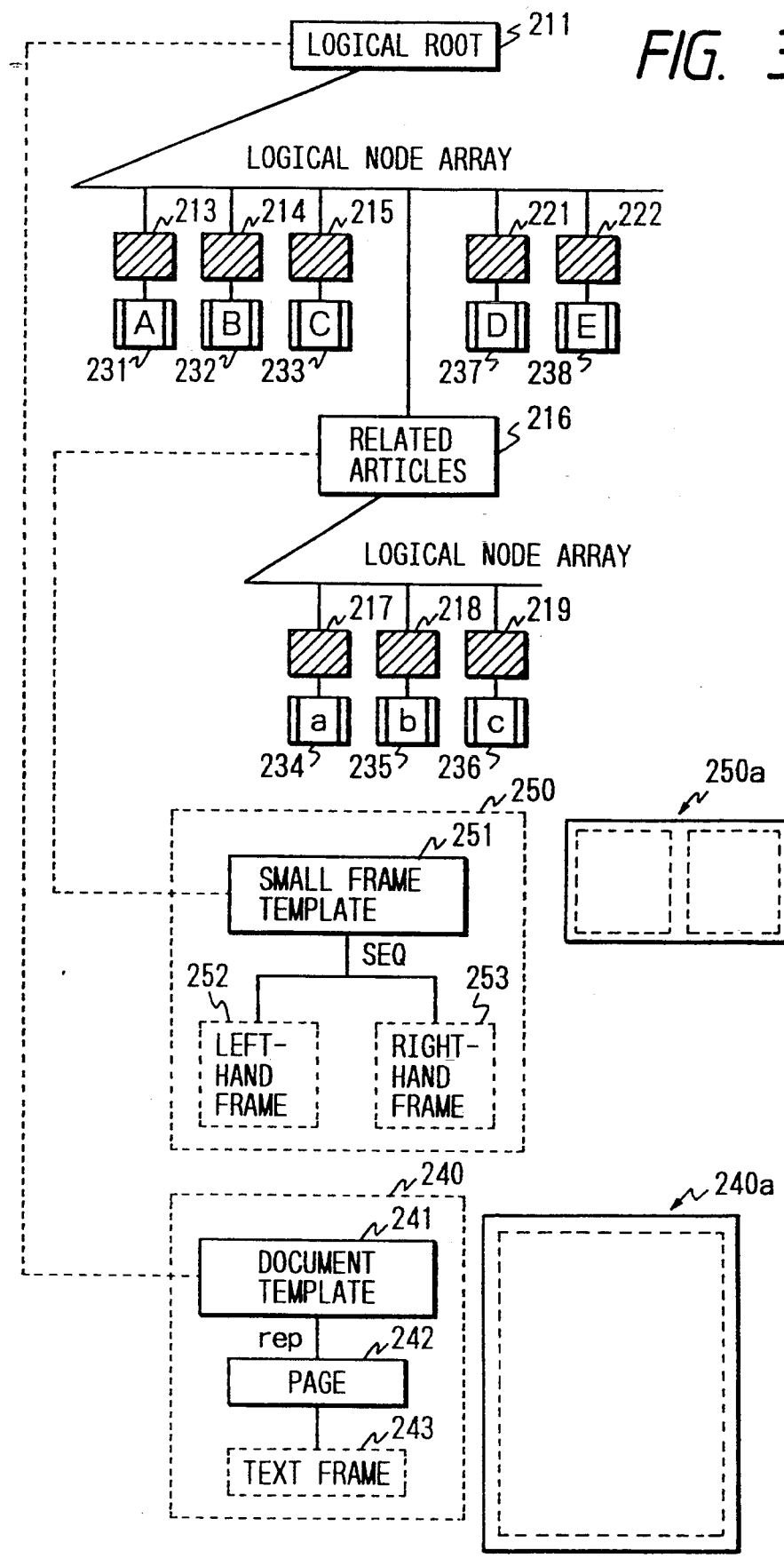
FIG. 3 is a chart illustrating a logical node array of the logical structure of FIG. 2.

FIG. 3 shows a logical node array obtained from the logical structure of FIG. 2. The logical node array of FIG. 3 has a two-hierarchy structure including a logical node array that constitutes the entire logical structure and another logical node array that constitutes related articles. The logical node array of the first hierarchy that is nested in the highest logical node 211 ("logical root") consists of logical nodes (basic logical objects) 213-215 and 212-222 having respective content portions "A"-"E" and a logical node (logical object) 216 of "related articles." A partial layout operation on the logical node array of the first hierarchy is performed by using the partial layout template 240 that is associated with the highest-rank logical node (actually, "document template" as the layout root is associated with the highest-rank logical node). The logical node array of the second hierarchy consisting of logical nodes (basic logical objects) 217-219 having respective contents "a'-'-"c" are nested in the logical node 216 ("related articles"). The logical node 216 designates the partial layout template 250 (actually, the "small frame template" as the layout root), which means that a partial layout operation on the nested logical node array of the second hierarchy is performed by using the partial layout template 250.

The logical node array serves to manage the logical objects to be subjected to a partial layout operation or content layout operation, and not all the logical objects of a logical structure are a logical node. For example, in the FIG. 3 example, the logical objects "chapter 1" and "chapter 2" in the logical structure of FIG. 2 are not included in the logical node array. That is, although the logical objects "chapter 1" and "chapter 2" have some role in the logical classification, they are not reflected in the layout result.

Figure 4:
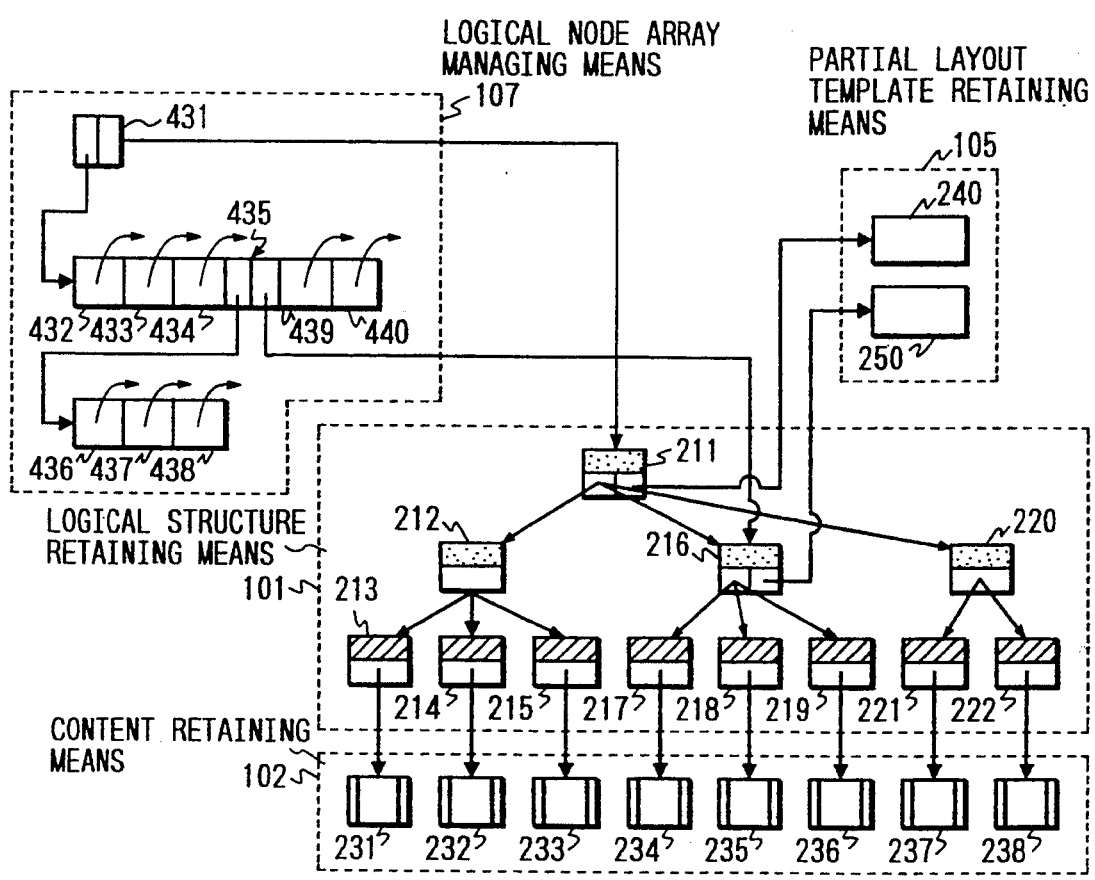
FIG. 4 is a chart illustrating data structures of a logical structure, a logical node array corresponding thereto, partial layout templates and content portions.

FIG. 4 shows data structures of the logical structure, partial layout templates and logical node array at a time point when the logical node array has been extracted and managed to complete the preprocessing, i.e., when the device is ready for the partial layout operation.

In FIG. 4, numerals 211-222 denote the logical objects constituting the logical structure 210 of FIG. 2. Numerals 231-238 denote the content portions constituting the document contents 230 of FIG. 2. Numerals 240 and 250 denote the partial layout templates of FIG. 2.

As shown in FIG. 4, in the data structure of the logical structure 210, each higher-rank logical object has a pointer for indicating the lower-rank logical objects (located immediately below the higher-rank logical object), and each basic logical object has a pointer for indicating the content portion connected thereto. Further, the logical object (logical node) 211 has a pointer for indicating the partial layout template 240, and the logical object (logical node) 216 has a pointer for indicating the partial layout template 250.

In FIG. 4, numerals 431-438 denote nodes corresponding to the respective logical nodes that constitute the logical node array of FIG. 3. This is an example of the data structure serving as a means for implementing the logical node array. The logical nodes and the nodes are correlated as follows.

As shown in FIG. 4, the node 431 corresponds to the logical node 211; node 432 to logical node 213; node 433 to logical node 214; node 434 to logical node 215; node 435 to logical node 216; node 436 to logical node 217; node 437 to logical node 218; node 438 to logical node 219; node 439 to logical node 221; and node 440 to logical node 222. Each node has a pointer for indicating the corresponding logical node. The node 431 corresponding to the logical node 211 that designates the partial layout template 240 has a pointer for indicating the node array of the first hierarchy to be nested, i.e., the nodes 432-435 and 439-440. The node 435 corresponding to the logical node 216 that designates the partial layout template 250 has a pointer for indicating the node array of the second hierarchy to be nested, i.e., the nodes 436-438.

There may be employed, as the means for implementing the logical node array, means other than the above one in which the FIG. 4 structure is retained as a data structure. For example, the logical structure may be interpreted to extract the logical node array information every time it is necessary. That is, this type of means provides virtual existence of the logical node array.

More specifically, referring to FIG. 4, while a layout operation is performed on the logical node 211 that is the root of the logical structure, the logical node array extracting means 106 recognizes the logical object 212 (this is not a logical node) located below the logical node 211, further recognizes the logical nodes (basic logical objects) 213-215 located below the logical object 212, and retains, as internal information, the logical node array (nodes 432-434 in FIG. 4) corresponding to the recognized basic logical objects 213-215.

While a layout operation is performed on the logical nodes (basic logical objects) 213-215, the logical node extracting means 106 recognizes the logical node 216, further recognizes the logical nodes basic logical objects) 217-219 located below the logical node 216, and retains, as internal information, the recognized logical object 216 and the logical node array corresponding to the basic logical objects nested in the node 216 (i.e., the node 435 and the nodes 436-438 nested therein in FIG. 4).

As another means for implementing the logical node array, the logical node array may be retained instead of the ordinary method of retaining the logical structure.

This is explained below more specifically. In the above example, the structure of FIG. 2 (the structure before extracting the logical node array) is first generated, the structure of FIG. 3 (the structure after extracting the logical node array) is then obtained from the FIG. 2 structure, and finally a layout operation is performed with reference to the FIG. 3 structure. Instead, a layout operation may be performed by generating the FIG. 3 structure (the structure having the logical node array but not having the logical objects "chapter 1" and "chapter 2") without generating the FIG. 2 structure.

In any means described above, it is important that the partial layout template and its application range be managed such that a hierarchical array of the logical objects can be extracted properly.

Figure 5A:
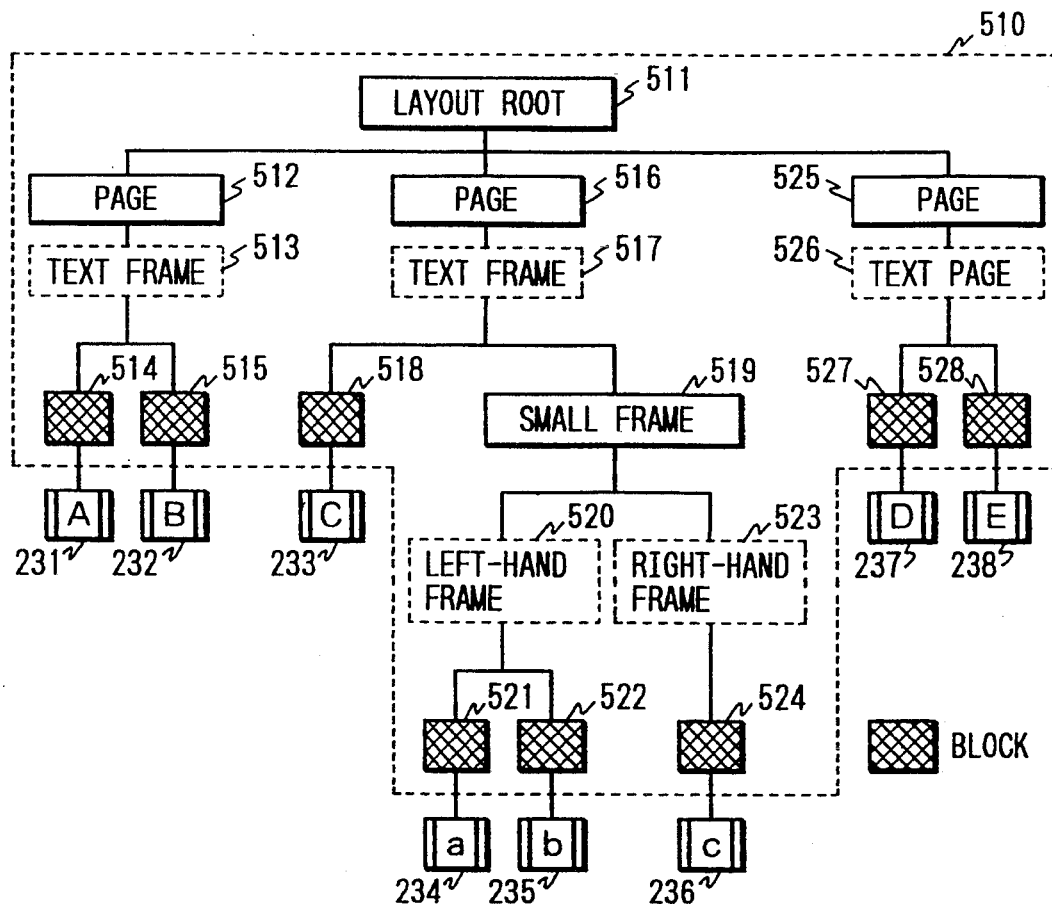
FIGS. 5(a) and 5(b) are charts illustrating a layout result obtained by applying the partial layout templates of FIG. 2 to the logical node array of FIG. 2.

FIG. 5(a) shows a layout structure obtained by applying the partial layout templates 240 and 250 of FIG. 3 to the logical structure of FIG. 3.

Figure 5B:
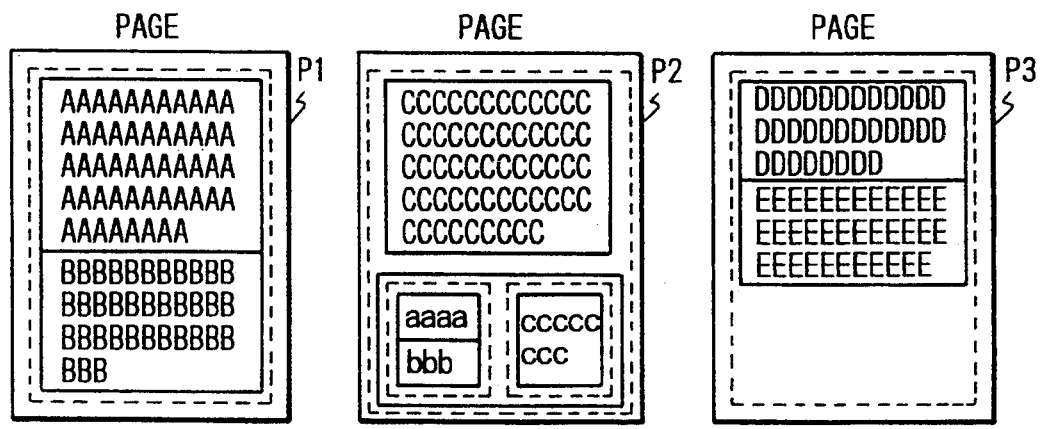
Figure 6:
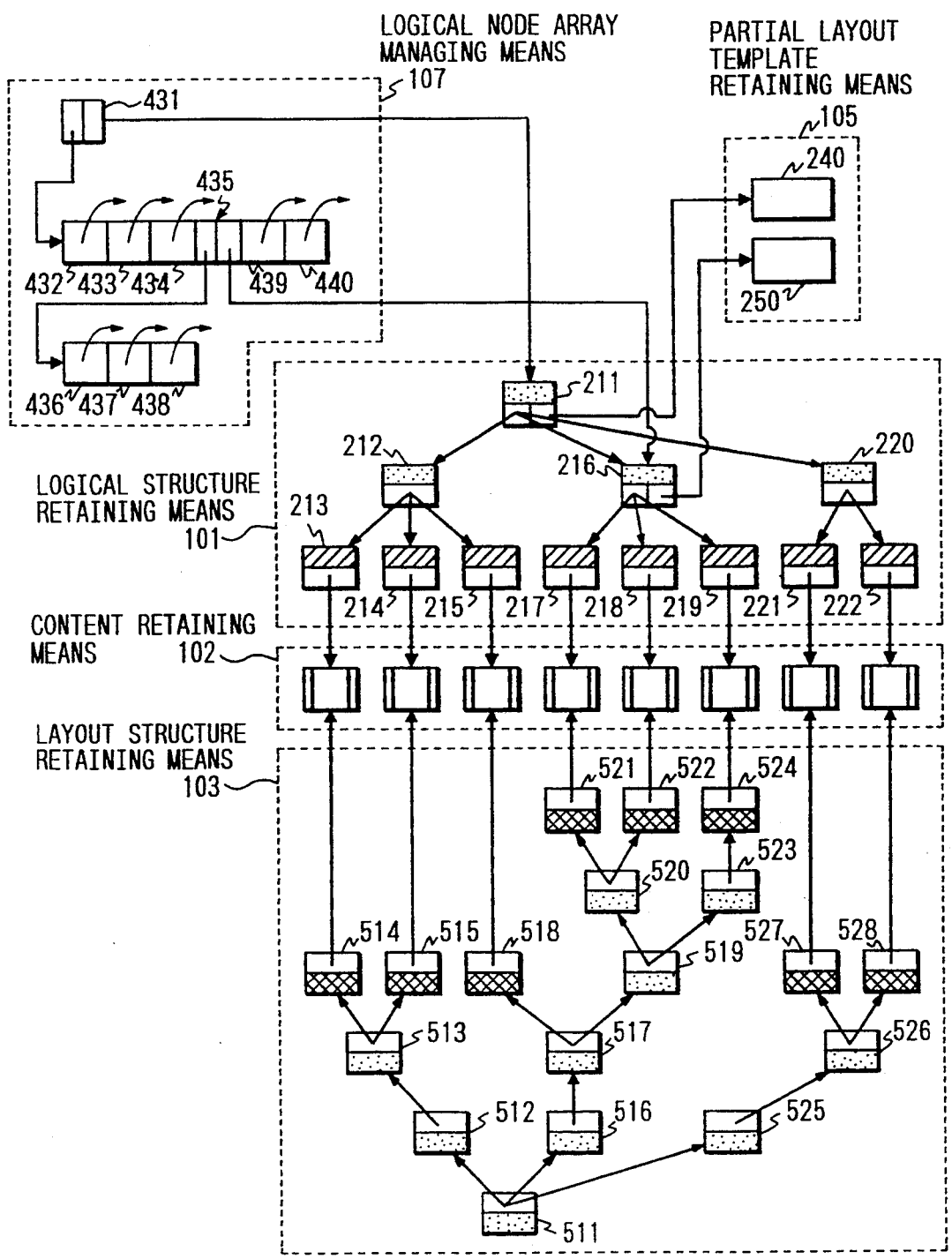
FIG. 6 is a chart illustrating data structures in which data of the layout structure of FIGS. 5(a) and 5(b) is added to the data structures of FIG. 4.

In FIG. 5(a), a layout structure 510 consists of layout objects 511–528, of which the layout objects 514, 515, 518, 521, 522, 524, 527 and 528 are blocks. The blocks (layout objects) are connected to the respective content portions. FIG. 5(b) shows a layout image expressed by the layout result of FIG. 5(a), in which a page P1 is a layout image corresponding to a structure including a layout object 512 ("page") and layout objects below it, a page P2 is a layout image corresponding to a structure including a layout object 516 ("page") and layout objects below it, and a page P3 is a layout image corresponding to a structure including a layout object 525 ("page") and layout objects below it. FIG. 6 shows a data structure of the layout structure 510 of FIG. 5(a). A higher-rank layout object has a pointer for indicating lower-rank layout objects, and each block has a pointer for indicating a content portion connected thereto.

Therefore, it can be said that the logical structure 210 of FIG. 2 is correlated with the layout structure 510 of FIG. 5(a) via the content portions. That is, the content portions are referred to by both of the logical structure 210 and the layout structure 510.

Although in the example of FIG. 6 the basic logical objects and the blocks are correlated one to one, it may be the case that a plurality of layout objects (blocks) are generated from one basic logical object, in which case the related content portion is dividend by the content layout means 104.

Next, the layout structure generation by the partial layout means 109 is described below.

The partial layout means 109 pours, into a lowest-rank frame, a partial layout structure that has been obtained from logical nodes of the first hierarchy logical node array by calling the content layout means 104 or the self, i.e., the partial layout means 109 (recursive calling). That is, the conventional operation in which only the layout object of a block are allowed to be poured into a lowest-rank frame is now extended to such a degree that layout objects of a frame can also be poured into a lowest-rank frame.

As shown in FIG. 6, a logical node in which a logical node array is nested necessarily designates a partial layout template. When the partial layout means 109 is activated with respect to a partial layout template designated by a certain logical node and a logical node array nested therein, the partial layout means 109 performs the following operation.

(1) If a logical node constituting the logical node array is a basic logical object, the content layout means 104 is called, and a block generated by the content layout means 104 is poured into a lowest-rank frame of a layout structure generated by the partial layout template.

(2) If a logical node constituting the logical node array designates a partial layout template, a partial layout operation is performed on a logical node array nested in this logical node and the partial layout template designated by this logical node by recursively calling the self, i.e., the partial layout means 109. A resultant frame is poured into a lowest-rank frame of the layout structure already existing.

The partial layout operation by the partial layout means 109 is outlined below. Referring to the logical node array managing means 107, the partial layout means 109 sequentially performs a layout operation starting from the head logical node of the highest-hierarchy logical node array among the logical node arrays managed by the logical node array managing means 107. The head logical node of the highest-hierarchy logical node array is the logical object as the root of the logical structure, which designates a partial layout template corresponding to the entire logical structure. Therefore, by first applying the partial layout means 109 to the logical node of the root, the partial layout means 109 is sequentially applied to the logical node arrays nested in the logical node of the root and finally the content layout means 104 is activated.

Next, referring to a flowchart of FIG. 7, the partial layout operation by the partial layout means 109 is described below.

As shown in FIG. 7, the partial layout means 109 generates a minimum partial layout structure that satisfies the limitations of a partial layout template designated by the logical node of tile root (step 701). The generated partial layout structure is named "LayStruct."

Then, it is judged whether the entire logical node array has been subjected to the layout operation (step 702). If the judgment is affirmative, the partial layout means 109 returns "LayStruct" as a result. If the judgment is negative, the partial layout means 109 takes the first one of the logical nodes of the logical node array which have not been allocated. The logical node thus taken is named "LogNode."

Then, it is judged whether "LogNode" is a basic logical object (step 704). If the judgment is affirmative, the partial layout means 109 calls the content layout means 104, which then generates a layout object (block) (step 705). If the judgment is negative, the partial layout means 109 generates a layout object (frame) with respect to a logical node array below "LogNode" and a partial layout template designated by "LogNode" by calling the self (i.e., partial layout means 109) by recursive calling (step 706). The generated block or frame is named "LayObject," When called in step 706, the partial layout means 109 generates a minimum layout structure that satisfies the limitations of the partial layout template designated by "LogNode" in the same manner as in step 701.

After performing step 705 or 706, the partial layout means 109 judges whether there remains in the lowest-rank frame of "LayStruct" a sufficient space to accommodate "LayObject" (step 707). If the judgment is affirmative, "LayObject" is poured into the lowest-rank frame of "LayStruct" (step 708). If the judgment is negative, the partial layout means 109 adds, to "LayStruct," a structure that satisfies the limitations of the partial layout template of step 701 (i.e., the partial layout template designated by the root), to generate a new lowest-rank frame (step 709). Then, the partial layout means 109 proceeds to step 708. After execution of step 708, the partial layout means 109 returns to step 702 to perform it and the following steps.

Again referring to FIG. 4, the partial layout operation by the partial layout means 109 is described below more specifically.

In FIG. 4, the partial layout means 109 refers to the head node 431 of the node group corresponding to the logical node array, then refers to the logical node 211 corresponding to the node 431, and further refers to the partial layout template 240 (see FIG. 3) designated by the logical node 211. Then, the partial layout means 109 generates a minimum partial layout structure that satisfies the limitations of the partial layout template 240.

Then, the nodes 432–435 and 439–440, which are nested in the node 431, are sequentially subjected to a partial layout operation, in which the partial layout template 240 is applied to those nodes. In the partial layout operation on the node 435, since the nodes 436–438 are nested in the node 435 and the logical node 216 corresponding to the node 435 designates the partial layout template 250 (see FIG. 3), a layout operation on those nodes are performed prior to a layout operation on the nodes 439 and 440, in which the partial layout template 250 is applied to the logical nodes corresponding to the nodes 436–438.

A description is made of the partial layout operation performed by the partial layout means 109 on the node 435 (pouring of a frame) after the operation on the node 434.

Figure 8A:
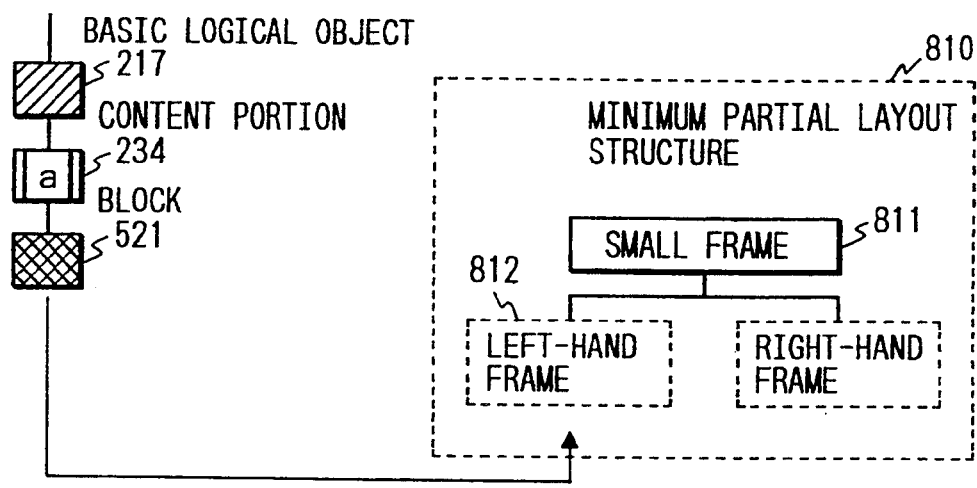
FIGS. 8(a) and 8(b) are charts illustrating a partial layout step of the first embodiment.
Figure 8B:
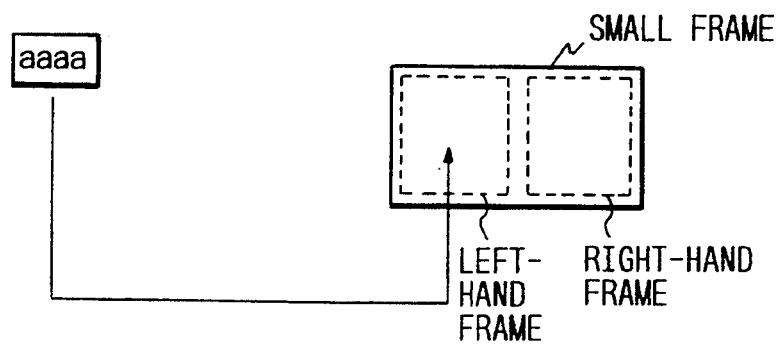
Figure 9A:
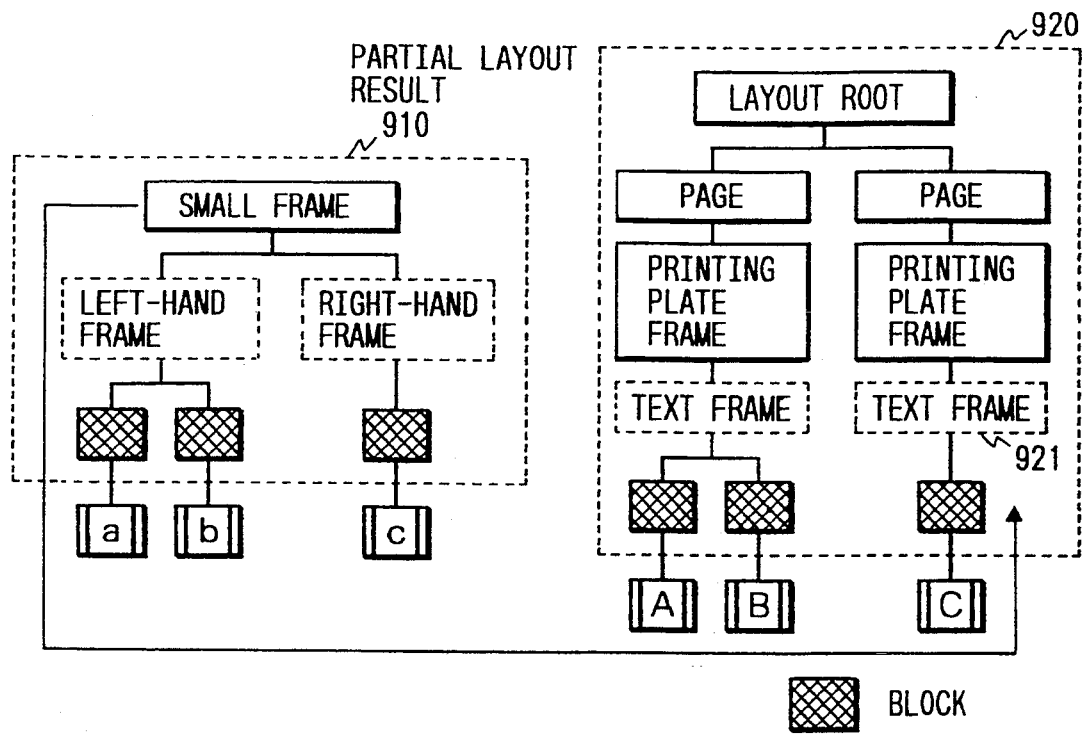
FIGS. 9(a) and 9(b) are charts illustrating a partial layout step of the first embodiment.

First, referring to the node 435, the partial layout means 109 generates a minimum partial layout structure 810 shown in FIG. 8(a) so as to satisfy the limitations of the partial layout template 250 (see FIG. 3) designated by the logical node 216 that corresponds to the node 435. Then, in the partial layout operation on the logical node (basic logical object) 217 corresponding to the node 436 that is nested in the node 435, the partial layout means 109 calls the content layout means 104 and disposes the block 521 generated by the content layout means 104 in the lowest-rank frame. This means that the generated block is poured into the lowest-rank frame of the partial layout structure 810. A partial layout result 910 is obtained as shown in FIG. 9(a) by performing partial layout operations on the nodes 437 and 438 in the similar manner.

Figure 9B:
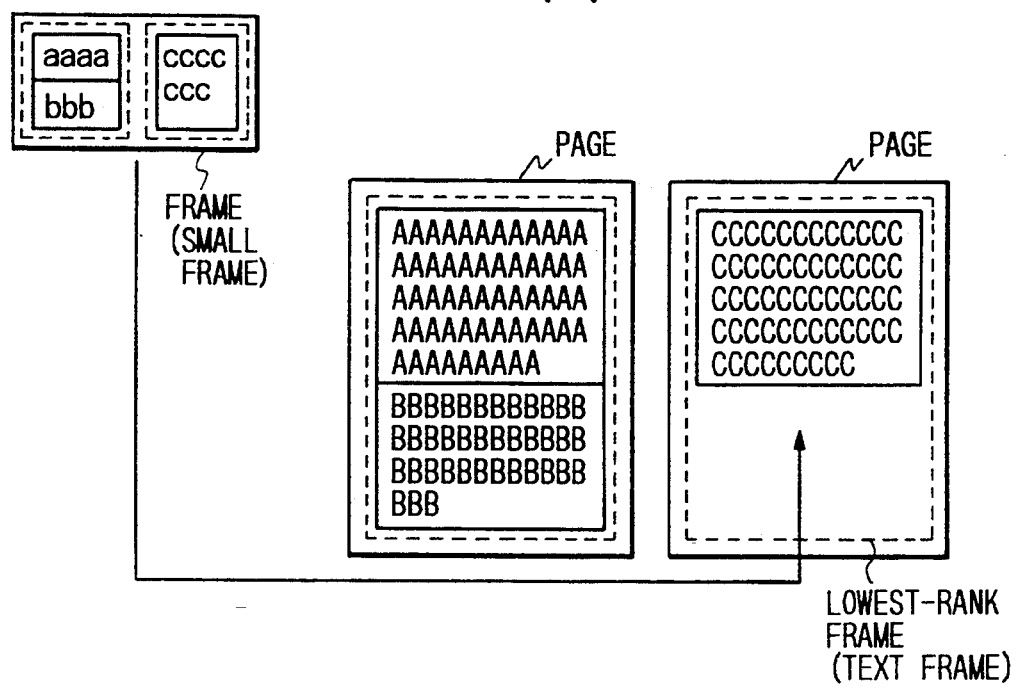

Since the partial layout template 240 is applied to the partial layout result 910, the partial layout result 910 is disposed in a lowest-rank frame (text frame) 921 of a partial layout structure 920 that has been obtained by applying the partial layout template 240 to the nodes 431–434. This means that the partial layout result 910 (i.e., a frame (small frame)) is poured into the lowest-rank frame as shown in FIG. 9(b).

It is noted here that the conventional layout process cannot perform the above operation of pouring a frame into a lowest-rank frame.

After completion of the operation on the node 435, layout operations on the nodes 439 and 440 nested in the node 431 are performed, so that the layout result 510 of FIG. 5(a) is obtained for the entire logical structure of FIG. 3. In the layout structure 510 of FIG. 5(a), the printing plate frame 4800 of FIG. 48(a) is changed to the text frame. This is because the text frame is regarded as a lowest-rank frame in the partial layout operation on the first-hierarchy logical node array, and the left-hand and right-hand frames are regarded as lowest-rank frames in the partial layout operation on the second-hierarchy logical node array.

As described above, a layout of the entire logical structure is obtained by the partial layout means 109 that is activated for the root of the logical structure, and the partial layout means 109 (recursive calling) and the content layout means 104 that are indirectly activated by the partial layout means 109.

Figure 10:
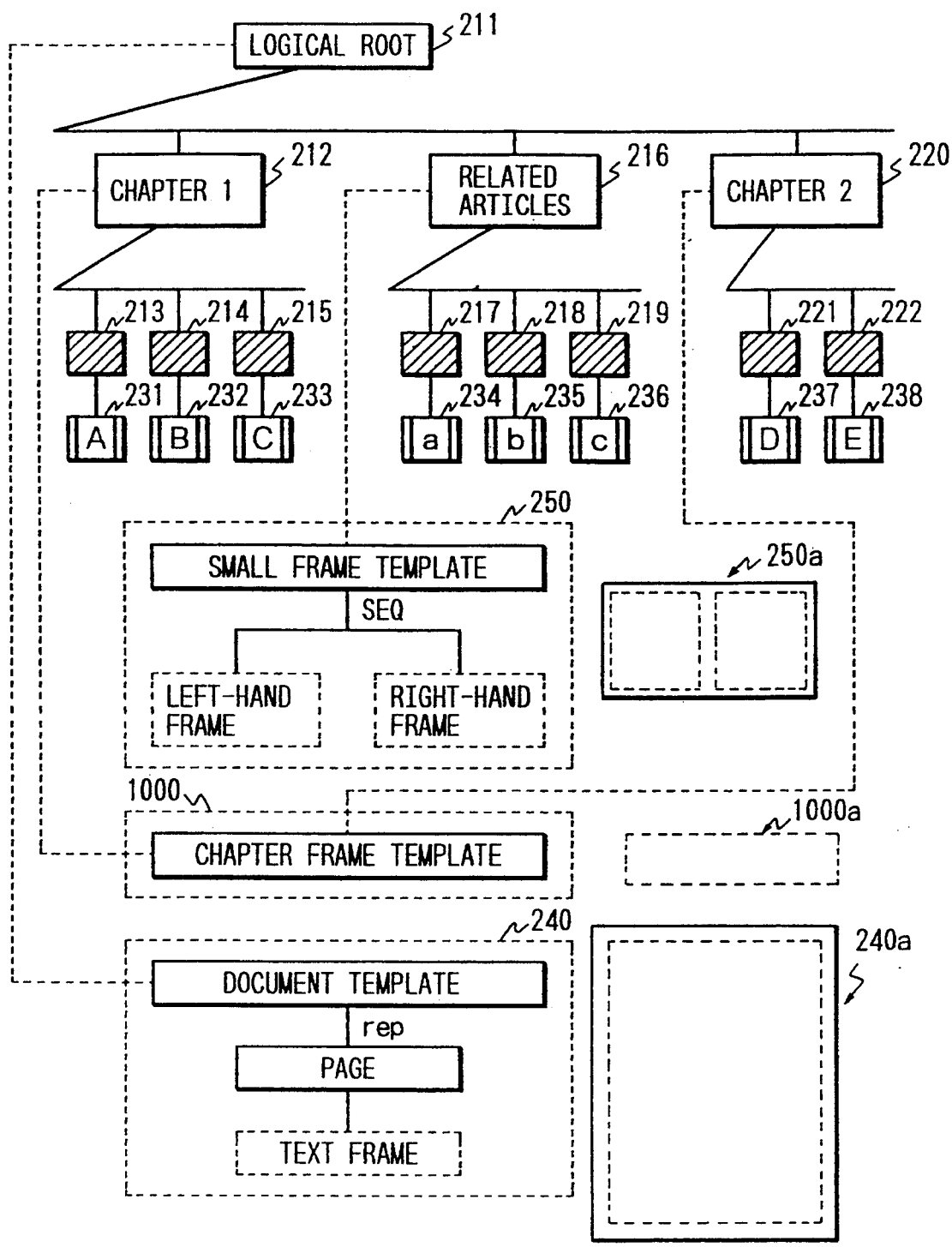
FIG. 10 is a chart illustrating a partial layout step of the first embodiment.

If a partial layout template is also described for the logical objects 212 and 222 ("chapter 1" and "chapter 2") of the logical structure of FIG. 2, logical node arrays assume a structure as shown in FIG. 10. In the example of FIG. 10, a logical node array consisting of logical nodes 212, 216 and 220 is nested in a logical node 211, a logical node array consisting of logical nodes 214–215 are nested in a logical node 212, and a logical node array consisting of logical nodes 221 and 222 is nested in a logical node 220. Further, the logical nodes 212 and 220 designate a partial layout template 1000. Symbol 1000a denotes a layout image expressed by the partial layout template 1000.

A second embodiment of the invention is described below with reference to FIGS. 11–17.

Figure 11:
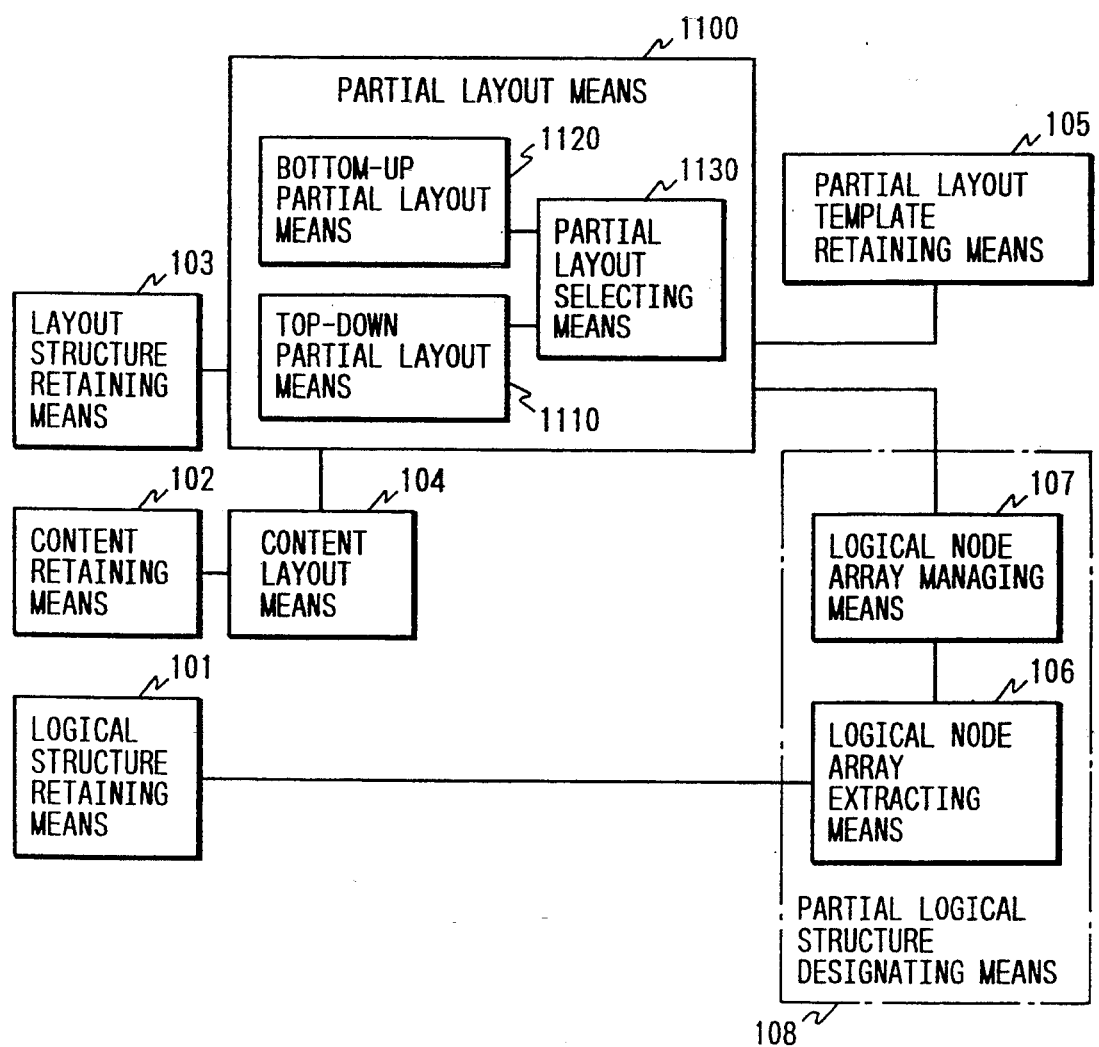
FIG. 11 is a functional block diagram showing a document processing device according to a second embodiment of the invention.

FIG. 11 is a functional block diagram showing a document processing device according to a second embodiment of the invention. In this diagram, the partial layout means 109 of FIG. 1 is changed to a partial layout means 1100. In FIG. 11, the parts having the same functions as in FIG. 1 are given the same reference numerals.

The partial layout means 1100 consists of a top-down partial layout means 1110 for determining, on a top-down basis, the size of a partial layout structure from a remaining space of an upper-rank layout object, a bottom-up partial layout means 1120 for determining, on a bottom-up basis, the size of a partial layout structure from an area of lower-rank layout objects combined, and a partial layout selecting means 1130 for selecting between the above two partial layout means based on layout means selecting information (described later).

In the partial layout template retaining means 105, in addition to the functions described in the first embodiment, the partial layout template retains the layout means selecting information that indicates which of the top-down layout means 1110 and the bottom-up layout means 1120 a partial layout template should be used. In this embodiment, the layout means selecting information is a value indicating "top-down" or "bottom-up." The partial layout selecting means 1130 selects the top-down partial layout means 1110 when the value of the layout means selecting information indicates "top-down," and selects the bottom-up partial layout means 1120 when it indicates "bottom-up."

Figure 12A:
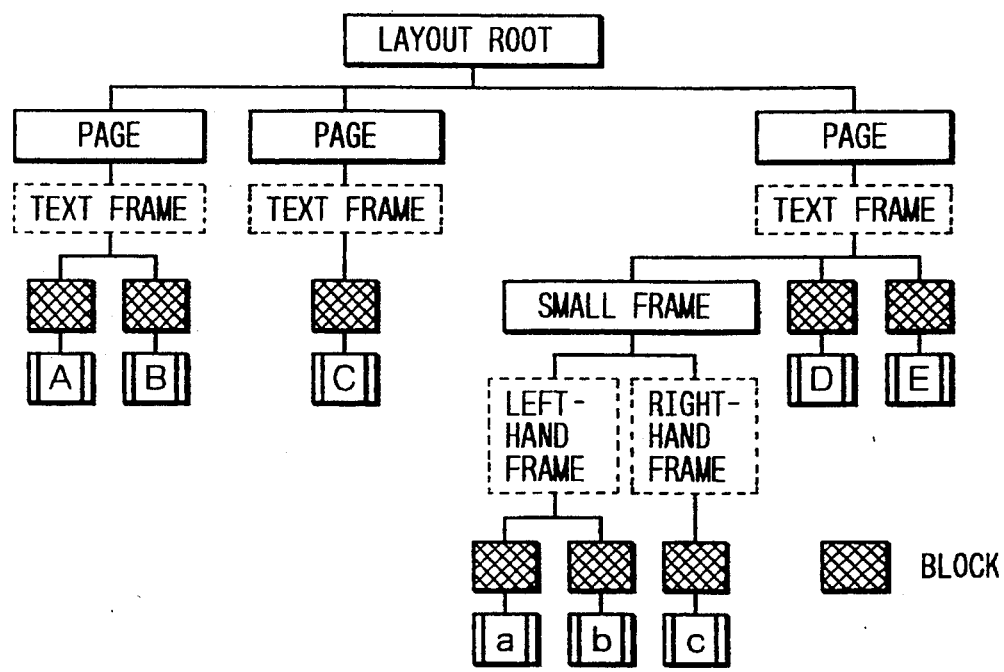
FIGS. 12(a) and 12(b) are charts illustrating a layout result obtained by a bottom-up-type layout operation of the second embodiment in which the partial layout templates of FIG. 2 are applied to the logical structure of FIG. 2.
Figure 12B:
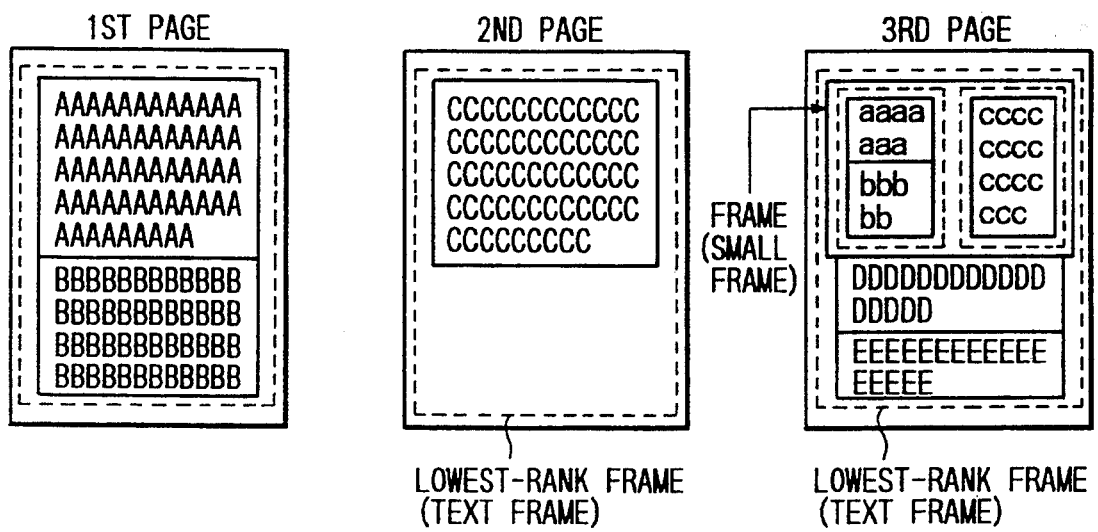

In the partial layout operation of the first embodiment performed by the partial layout means 109 (see the flowchart of FIG. 7), the size of the frame ("small frame") is determined on a bottom-up basis from an area of the lower-rank layout objects combined. Therefore, when a layout operation is performed on the logical structure 210 of FIG. 2 by applying the partial layout templates 240 and 250 to it but the remaining space (available space) of the lowest-rank frame is insufficient (i.e., the remaining space of the text frame is insufficient to accommodate the small frame), e layout result as shown in FIG. 12(a) is obtained. FIG. 12(b) shows a layout image expressed by the layout result of FIG. 12(a).

Figure 13A:
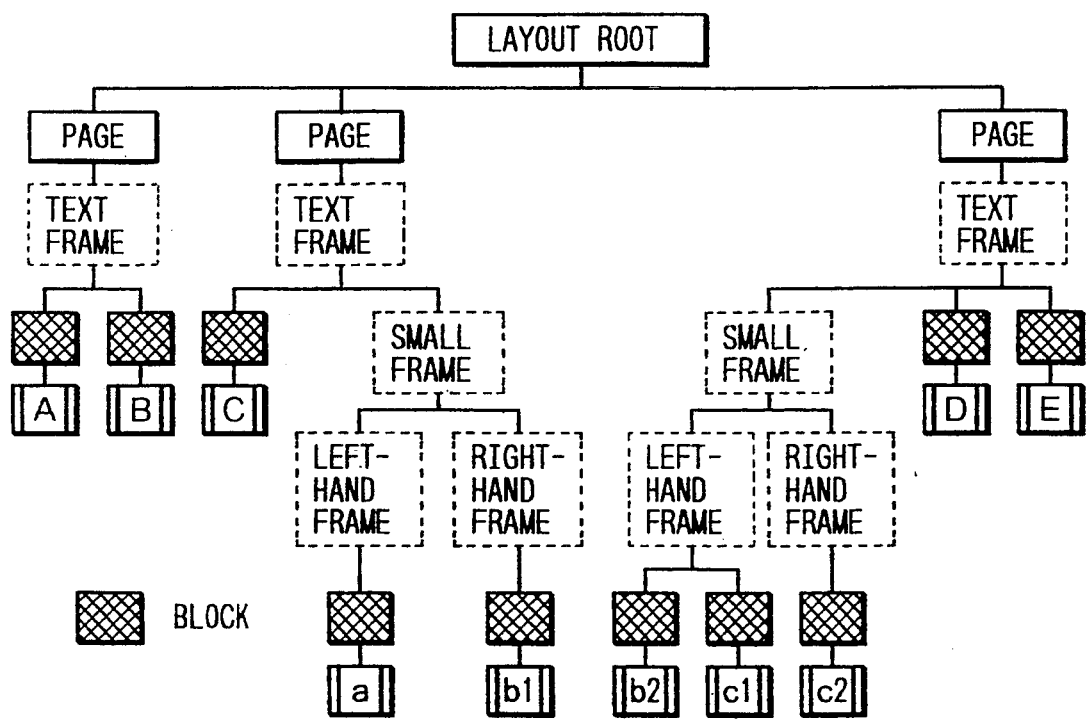
FIGS. 13(a) and 13(b) are charts illustrating a layout result obtained by a top-down-type layout operation of the second embodiment in which the partial layout templates of FIG. 2 are applied to the logical structure of FIG. 2.
Figure 13B:
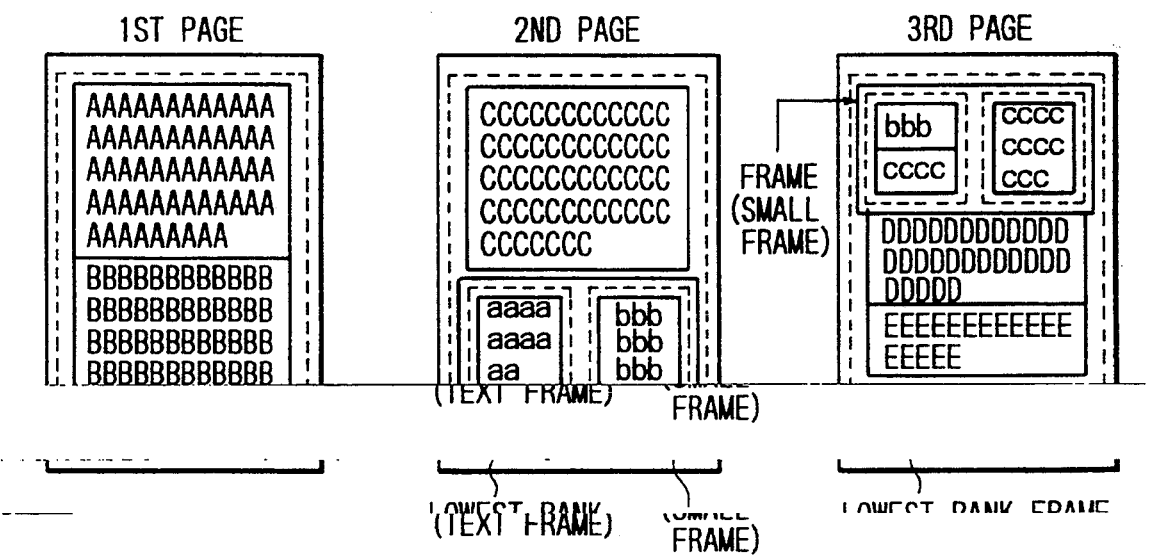

On the other hand, if the size of the frame ("small frame") is determined on a top-down basis, a layout result as shown in FIG. 13(a) is obtained. FIG. 13(b) shows a layout image expressed by the layout result of FIG. 13(a).

That is, as in the conventional layout operation of pouring a block to a lowest-rank frame, both of the bottom-up-type and top-down-type operations are available in pouring a frame to a lowest-rank frame in the invention.

Figure 14A:
FIGS. 14(a)-14(d) are charts illustrating steps of the bottom-up-type layout operation of the second embodiment.
Figure 14B:
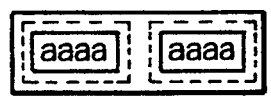
Figure 14C:
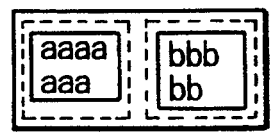
Figure 14D:
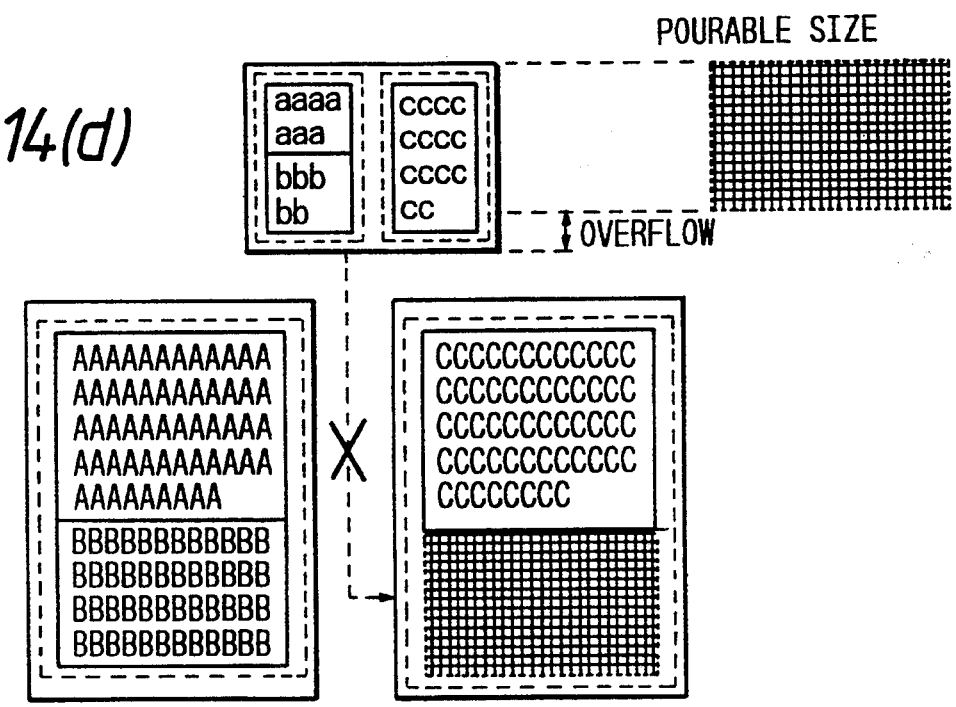

Next, referring to FIGS. 14(a)–14(d), 15(a)–15(c) and 16(a)–16(c), a description is made of bottom-up-type and top-down-type layout procedures in pouring a frame. FIGS. 14(a)14(d) show a bottom-up-type layout operation in pouring a frame, and FIGS. 15(a)–15(c) and 16(a)–16(c) show a top-down-type layout operation in pouring a frame.

Bottom-Up-Type Layout Operation

1) Generating a minimum partial layout structure:
   A layout image of the frame ("small frame") expressed by the partial layout structure is as shown in FIG. 14(a).
2) Pouring a block having a content portion "a":
   A layout image of a frame ("small frame") after a content portion "a" has been poured into the small frame is as shown in FIG. 14(b). In FIG. 14(b), the content portion "a" is poured into both of a left-hand frame and a right-hand frame because the pouring is adapted to provide the content portion "a" to the two frames in a balanced manner.
3) Pouring a block having a content portion "b":
   A layout image of the frame ("small frame") after a content portion "b" has been poured into the small frame is as shown in FIG. 14(c).
4) Pouring a block having a content portion "c":
   A layout image of the frame ("small frame") after a content portion "c" has been poured into the small frame is as shown in FIG. 14(d).

However, when the content portion "c" has been poured, the size of the frame ("small frame") exceeds the remaining space (available space) of a text frame (lowest-rank frame) of a certain page, i.e., pourable space. Therefore, the generated frame ("small frame") cannot be poured into this lowest-rank frame and, as a result, it is poured into a text frame (lowest-rank frame) of a newly generated page. This corresponds to a case where in the layout image of FIG. 12(b) it is intended to pour the small frame into the text frame of page 2 but it is actually poured into page 3 because of a shortage of the available space in page 2.

Top-Down-Type Layout Operation 1

1) Generating a minimum partial layout structure:
   As shown in FIG. 15(a), a partial layout structure is given a maximum pourable size, which corresponds to the remaining space (available space) of a lowest-rank frame (text frame) located above the partial layout structure under consideration.
2) Pouring a block having a content portion "a":
   A layout image of a frame ("small frame") after a content portion "a" has been poured into the small frame is as shown in FIG. 15(b). In FIG. 15(b), the content portion "a" is poured into both of a left-hand frame and a right-hand frame because the pouring is adapted to provide the content portion "a" to the two frames in a balanced manner.
3) Pouring a block having a content portion "b":
   A content portion "b" starts to be poured into the small frame. When the pouring of the content portion "b" has just become impossible, the small frame is poured into the lowest-rank frame ("text frame") as shown in FIG. 15(c). This corresponds to a case where in the layout image of FIG. 13(b) the divided frame ("small frame") is poured into page 2, that is, part of the content portion "b" and the entire content portion "c" are not poured.

However, according to the top-down-type operation, it is possible to allocate the remaining contents of the small frame to the next page. This is explained below.

Top-Down-Type Layout Operation 2

1) Generating a minimum partial layout structure:
   As shown in FIG. 16(a), a partial layout structure is given a maximum pourable size, which corresponds to the space (available space) of a newly generated lowest-rank frame located above the small frame under consideration.
2) Pouring the part of the content portion "b" that could not be poured in "top-down-type layout operation 1" and the block having the content portion "c":
   When the pouring of the part of the content portion "b" and the entire content portion "b" has been completed, a layout image of the frame ("small frame") is as shown in FIG. 16(b).
3) After the size of the small frame is changed to a minimum one, the small frame is poured into the lowest-rank frame located above it as shown in FIG. 16(c). This corresponds to a case where in the layout image of FIG. 13(b) the divided frame ("small frame") is poured into page 3.

In the conventional layout process, where a subject of pouring is a block, the selection between the bottom-up-type and top-down-type layout operations can be made based on the type of a content portion. That is, the top-down-type operation is selected for a text and the bottom-up-type operation is selected for a figure or table. However, in the invention, since a frame can also be a subject of pouring and the frame does not have a content portion directly, the selection between the bottom-up-type and top-down-type operations cannot be made based on the content portion.

As a countermeasure, in the second embodiment the partial layout template retains the layout means selecting information which is a value indicating either "top-down" or "bottom-up." Apparently, when no value is set, a predetermined value may be set as a default value.

In the layout operation, the partial layout selecting means 1130 refers to the partial layout template, and recognizes the value (or default value) specified in the partial layout template. Based on the recognition result, the partial layout selecting means 1130 selects the top-down partial layout means 1110 if the value indicates "top-down," and selects the bottom-up partial layout means 1120 if the value indicates "bottom-up." Then, the top-down partial layout means 1110 performs a top-down-type layout operation or the bottom-up partial layout means 1120 performs a bottom-up-type layout operation.

As described above, whether to perform the top-down-type or bottom-up-type layout operation is specified in the partial layout template, and the layout operation is performed based on this information. Therefore, even when the logical object ("related articles") 216, for instance, has the same lower-rank structure, the selection between the bottom-up-type and top-down-type layout operations can be made with an explicit indication therefor. When a table expressed as a combination of frames cannot be accommodated by the remaining space of a certain page, a selection can be made between a first operation where the table is divided and allocated to two pages and a second operation where the entire table is allocated to the next page.

Next, the bottom-up-type and top-down-type layout operations are described in detail. But since the bottom-up-type layout operation is similar to the operation already described in the first embodiment using the flowchart of FIG. 7, a description therefor is emitted here. It is apparent that the bottom-up-type layout operation is performed by the bottom-up partial layout means 1120.

Referring to a flowchart of FIG. 17, a description is made of the top-down-type layout operation by the top-down partial layout means 1110.

As shown in FIG. 17, the top-down partial layout means 1110 generates a minimum partial layout structure that satisfies the limitations of the partial layout template designated by a logical node of a root of a frame (step 1701). The generated partial layout structure is named "LayStruct."

Then, the size of the frame as the root of "LayStruct" is made the remaining space of a layout object located above the frame, i.e., the full remaining space of a lowest-rank frame into which "LayStruct" is to be poured (step 1702). Then, it is judged whether the entire logical node array has been allocated (step 1703).

If the judgment is negative, the top-down partial layout means 1110 takes the first one of the logical nodes of the logical node array which have not been allocated (step 1704). The logical node thus taken is named "LogNode."

Then, it is judged whether "LogNode" is a basic logical node (step 1705). If the judgment is affirmative, the top-down partial layout means 1110 calls the content layout means 104, which then generates a layout object (block) having a size pourable into the lowest-rank frame as the root. On the other hand, the judgment in step 1705 is negative, a layout object (frame) is generated, by calling the partial layout means 1100, with respect to a logical node array located below "LogNode" and a partial layout template designated by "LogNode" (step 1707). Whether to select the top-down partial layout means 1110 or the bottom-up partial layout means 1120 is determined by the partial layout selecting means 1130 based on the selecting information of the template designated by "LogNode." The generated block or frame is named "LayObject,"

In step 1707, the recursively called top-down partial layout means 1110 generates a minimum layout structure satisfying the limitations of the partial layout template designated by "LogNode" in the same manner as in step 1701.

After performing step 1706 or 1707, the top-down partial layout means 1110 pours "LayObject" into the lowest-rank frame of "LayStruct" (step 1708). Then, the top-down partial layout means 1110 judges whether the entire logical node array or contents below "LogNode" have been allocated (step 1709). If the judgment is negative, the top-down partial layout means 1110 returns to step 1703 to perform it and the following steps. If the judgment is affirmative, the top-down partial layout means 1110 makes the size of the frame as the root of "LayStruct" a minimum size that can accommodate all the layout objects constituting "LayStruct," and returns "LayStruct" as a result (step 1710). If the judgment of step 1703 is affirmative, the top-down partial layout means 1110 proceeds to step 1710.

As described above, in this embodiment, the top-down-type layout operation (flowchart of FIG. 17) by the top-down partial layout means 1110 is performed only in an operation of generating a partial layout structure having a frame as a root. A partial layout operation on the root of the entire logical structure is performed by the bottom-up partial layout means 1120 on a bottom-up basis (flowchart of FIG. 7). Only the bottom-up partial layout means 1120 performs an operation of generating a lowest-rank frame by adding a layout structure such as a page. When the top-down partial layout means 1110 cannot pour the entire subject logical node array into one lowest-rank frame, it finishes its partial layout operation by transferring the pourable part (partial layout result) to a higher-rank partial layout operation (actually, a partial layout operation of the partial layout means 1100 on a higher-rank logical object). Therefore, the transfer of the partial layout result finally reaches a bottom-up-type layout operation. The bottom-up partial layout means 1110 generates a new lowest-rank frame, and the partial layout means 1100 is again activated with respect to the logical node the layout operation for which has finished halfway. That is, with respect to the overflow logical node, a partial layout operation by the same partial layout template is activated.

In the ODA mentioned above, a layout template is allowed to have a parameter "variable" or "fixed" to select the frame size, and one of layout operations is selected based on the value of this parameter. While "variable" indicates the top-down layout operation, "fixed" means that the size is fixed irrespective of a lower-rank layout object and is entirely different from this embodiment's indication of the bottom-up-type layout operation. "Fixed" may also be employed in the invention as an additional parameter.

A third embodiment of the invention is described below with reference to FIGS. 18–24.

Figure 18:
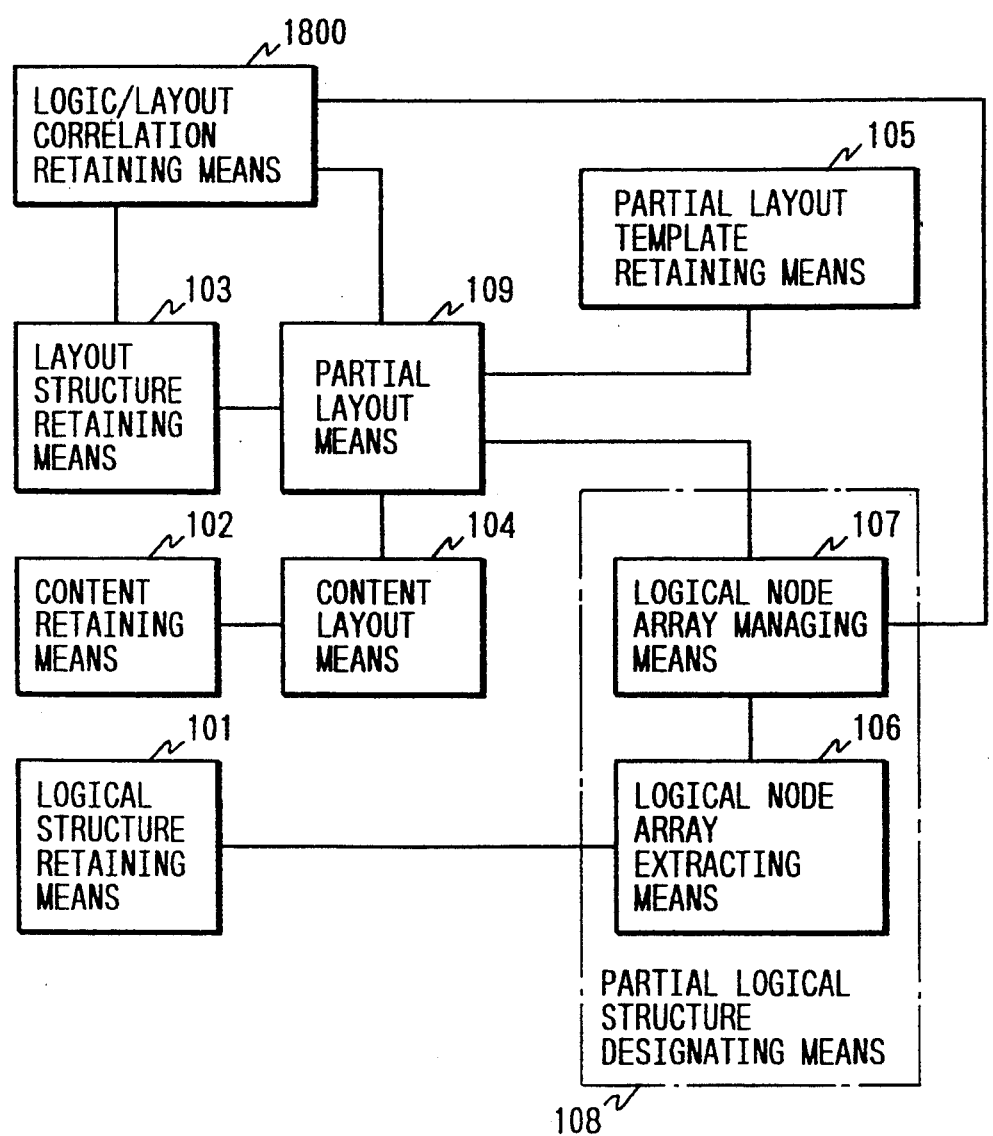
FIG. 18 is a functional block diagram showing a document processing device according to a third embodiment of the invention.

FIG. 18 is a functional block diagram of a document processing device according to a third embodiment of the invention. In this block diagram, a logic/layout correlation retaining means 1800 is added to the FIG. 1 constitution (first embodiment). In FIG. 18, the parts having the same functions as in FIG. 1 are given the same reference numerals.

The logic/layout correlation retaining means 1800 retains a corresponding relationship between partial logical structures of a logical structure to which a partial layout operation is to be applied and partial layout structures. For example, as indicated by the dashed lines in FIG. 19, the logic/layout correlation retaining means 1800 retains information indicating a corresponding relationship between "logical root" and "layout root" and that between "related articles" and "small frame."

Figure 19:
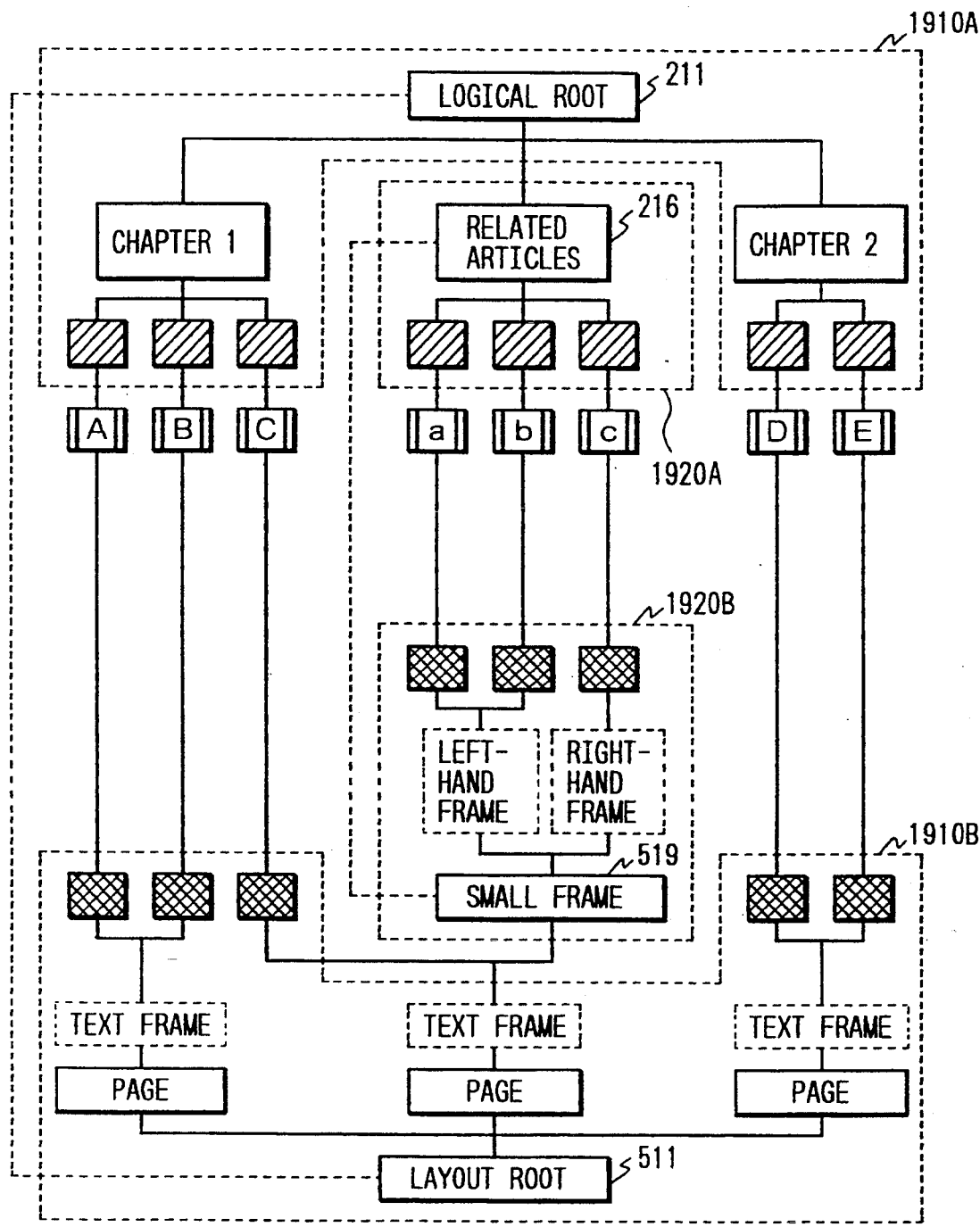
FIG. 19 is a chart illustrating a corresponding relationship between partial logical structures and partial layout structures in the third embodiment.

In FIG. 19, the logical structure 210 of FIG. 2 and the layout structure 510 of FIG. 5, which is a layout result of the logical structure 210, are correlated by sharing the content portions. Needless to say, the logical node 211 ("logical root") designates the partial layout template 240 of FIG. 2, and the logical node 216 ("related articles") designates the partial layout template 250 of FIG. 2. The content portions are the same as those shown in FIG. 2.

Therefore, the logic/layout correlation retaining means 1800 retains corresponding relationships between logical objects (logical nodes) designating a partial layout template and corresponding layout objects, such as the corresponding relationship between the logical node 211 ("logical root") and the layout node 511 ("layout root") and the corresponding relationship between the Logical node 216 ("related articles") and the layout node 519 ("small frame") (see FIG. 19).

From close examination of the logical structure 210 and the layout structure 510 shown in FIG. 19, it is understood that during a layout operation the structure including the logical node 216 ("related articles") and the nodes below it, i.e., a partial logical structure 1920A is not directly related to a text structure, i.e., a partial logical structure 1910A. When the structure including "related articles" and the nodes below it (i.e., partial logical structure 1920A) has been altered, it should be sufficient to partially reallocate only that structure. On the contrary, when part of the text (i.e., partial logical structure 1910A) not related to "related articles" has been changed, it should be sufficient to move the layout structure including "small frame" corresponding to "related articles" and the layout objects below it (i.e., partial layout structure 1920B), that is, it is not necessary to reallocate the "related articles" logical structure.

Therefore, by virtue of the fact that the logic/layout correlation retaining means 1800 retains the corresponding relationship between the logical node 211 ("logical root") and the layout node 511 ("layout root") and that between the logical node 216 ("related articles") and the layout node 519 ("small frame"), when the partial logical structure 1910A has been altered it suffices that only the partial logical structure 1910A is reallocated, and when the partial logical structure 1920A has been altered it suffices that only the partial logical structure 1920A is reallocated.

Figure 20:
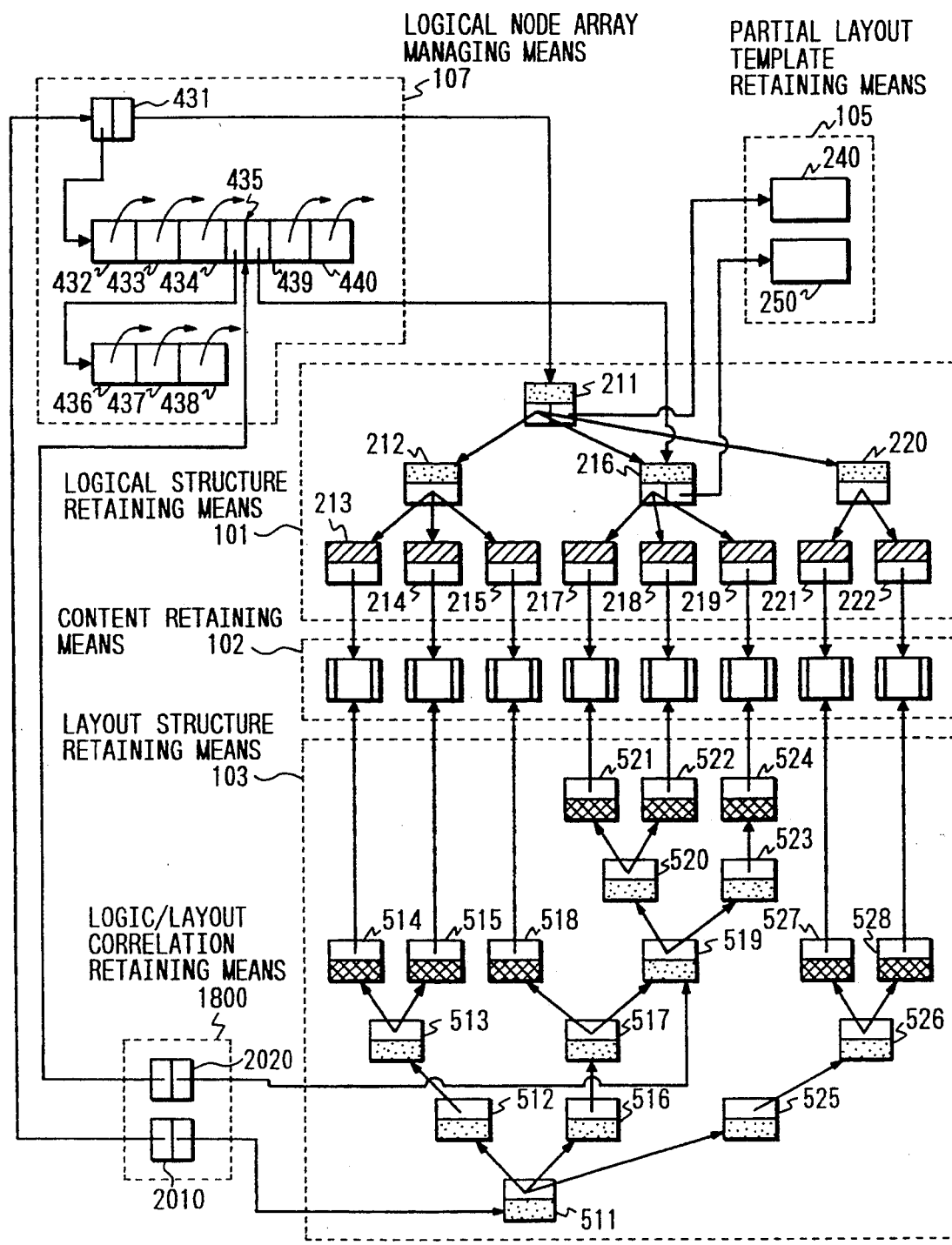
FIG. 20 is a chart illustrating a data structure of a logical structure, a logical node array, partial layout templates, content portions, a layout structure and a logic layout correlation in the third embodiment.

FIG. 20 shows data structures of the structures of FIG. 19. In FIG. 20, data (hereinafter referred to as "logic/layout correlation data") indicating corresponding relationships between the partial logical structures and the partial layout structures are added to the data structures of FIG. 6 (first embodiment).

In FIG. 20, logic/layout correlation data 2010 managed by the logic/layout correlation retaining means 1800 consists of a pointer indicating the node 431 (corresponding to the logical node 211) of the logical node arrays retained by the logical node array managing means 107 and a pointer indicating the layout node 511 ("layout root") of the layout structure retained by the layout structure retaining means 103. Logic/layout correlation data 2020 consists of a pointer indicating the node 435 (corresponding to the logical node 216) of the logical node arrays retained by the logical node array managing means 107 and a pointer indicating the layout node 519 ("small frame") of the layout structure retained by the layout structure retaining means 103.

A partial layout operation including a reallocating operation by the partial layout means 109 is described below with reference to a flowchart of FIGS. 21 and 22.

Figure 21:
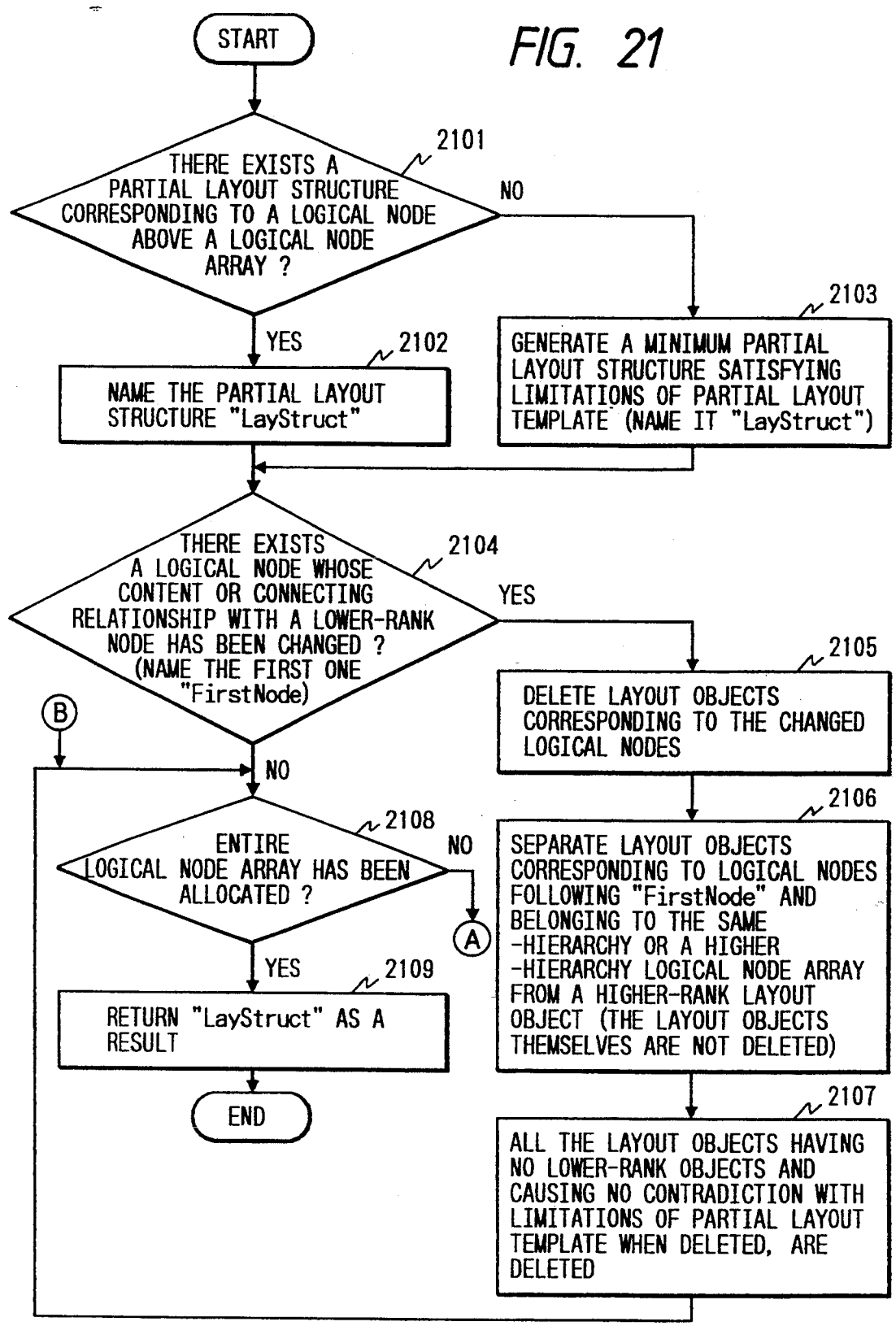
FIGS. 21 and 22 show a flowchart of a partial layout operation, considering a reallocating operation, performed by a partial layout means of the third embodiment.

As shown in FIG. 21, the partial layout means 109 judges whether there exists a partial layout structure corresponding to a logical node located above a logical node array (step 2101).

If the judgment is affirmative, the partial layout structure corresponding to the higher-rank logical node is named "LayStruct" (step 2102). If the judgment is negative, a minimum partial layout structure satisfying the limitations of a partial layout template designated by the higher-rank logical node is generated and named "LayStruct" (step 2103).

After the execution of step 2102 or 2103, it is judged whether there exists a logical node whose content or connecting relationship with a lower-rank logical node has been changed (step 2104). The first one of the changed logical nodes is named "FirstNode."

If the judgment is affirmative, layout objects corresponding to the-changed logical nodes are deleted (step 2105). Then, layout objects corresponding to logical nodes following "FirstNode" and belonging to the same-hierarchy or higher-hierarchy logical node arrays are separated from a higher-rank layout object (the layout objects themselves are not deleted) (step 2106). Further, all the layout objects having no lower-rank layout objects and therefore causing no contradiction with the limitations of the partial layout template when deleted, are deleted (step 2107).

When step 2107 has been executed or the judgment in step 2104 is negative, it is judged whether the entire logical node array has been allocated (step 2108). If the judgment is affirmative, "LayStruct" is returned as a result (step 2109).

Figure 22:
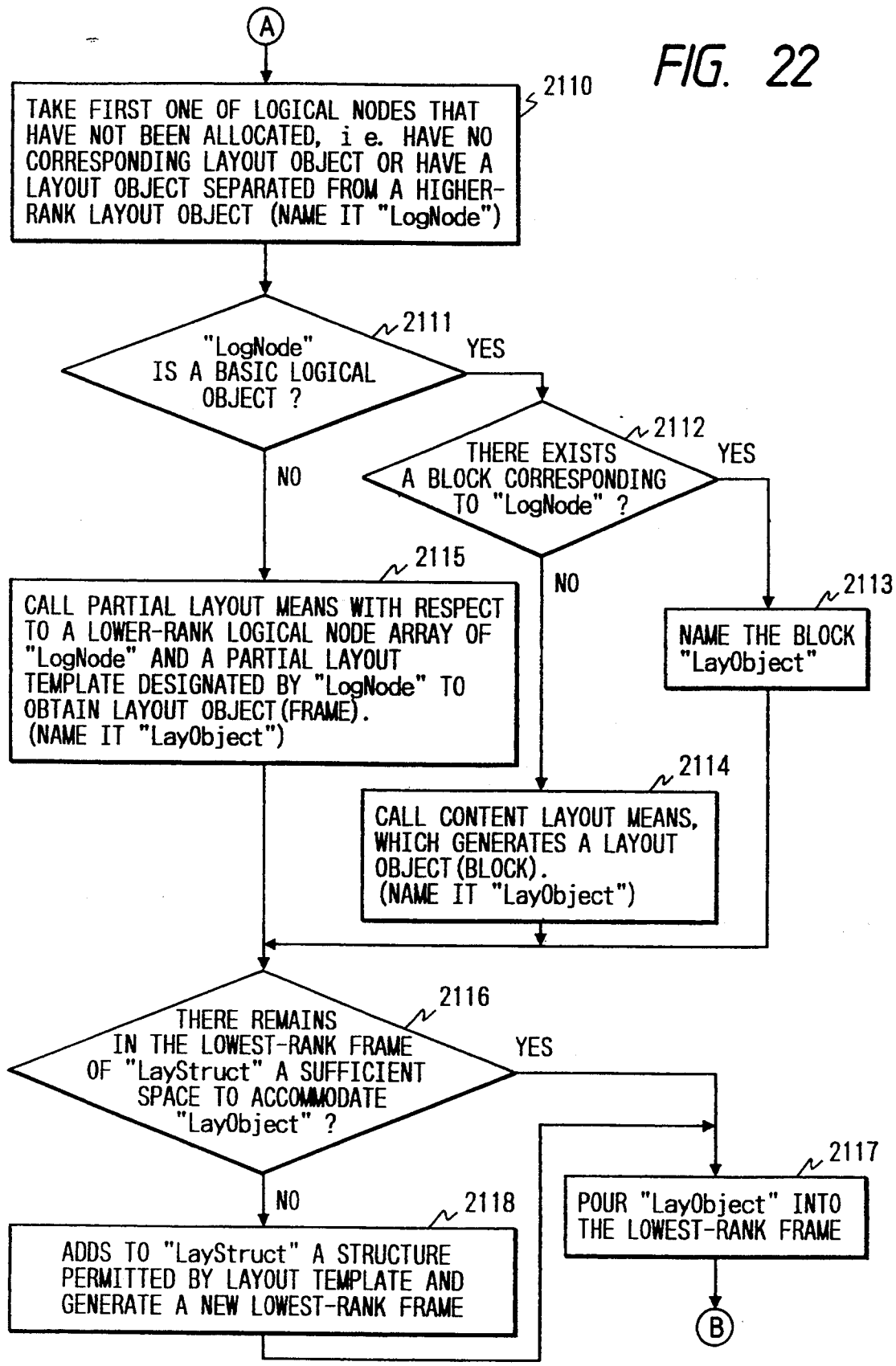

If the judgment in step 2108 is negative, the partial layout means 109 takes, from the logical node array, the first one of the logical nodes that have not been allocated, i.e., have no corresponding layout object or have a corresponding layout object separated from a higher-rank layout object, as shown in FIG. 22 (step 2110). The first logical node is named "LogNode." Then, the partial layout means 109 judges whether "LogNode" is a basic logical object (step 2111).

If the judgment is affirmative, the partial layout means 109 judges whether there exists a block corresponding to "LogNode" (step 2112). If the Judgment is affirmative, the block is named "LayObject" (step 2113). If the judgment is negative, the partial layout means 109 calls the content layout means 104, which then generates a layout object (block) (step 2114). The generated layout object is named "LayObject,"

If the judgment in step 2111 is negative, the partial layout means 109 calls, by recursive calling, the self (partial layout means 109) with respect to a lower-rank logical node array of "LogNode" and a partial layout template designated by "LogNode" to obtain a layout object (frame) (step 2115). The layout object thus obtained is named "LayObject,"

When one of steps 2113, 2114 and 2115 is finished, the partial layout means 109 judges whether there remains in the lowest-rank frame of "LayStruct" a sufficient space to accommodate "LayObject" (step 2116).

If the judgment is affirmative, "LayObject" is poured into the lowest-rank frame of "LayStruct" (step 2117). If the judgment is negative, the partial layout means 109 adds to "LayStruct" a structure permitted by the layout template to generate a new lowest-rank frame (step 2118). Then, the partial layout means 109 proceeds to step 2117 mentioned above. After the execution of step 2117, the partial layout means 109 returns to step 2108 of FIG. 21 to perform step 2108 and the steps following it.

Figure 23:
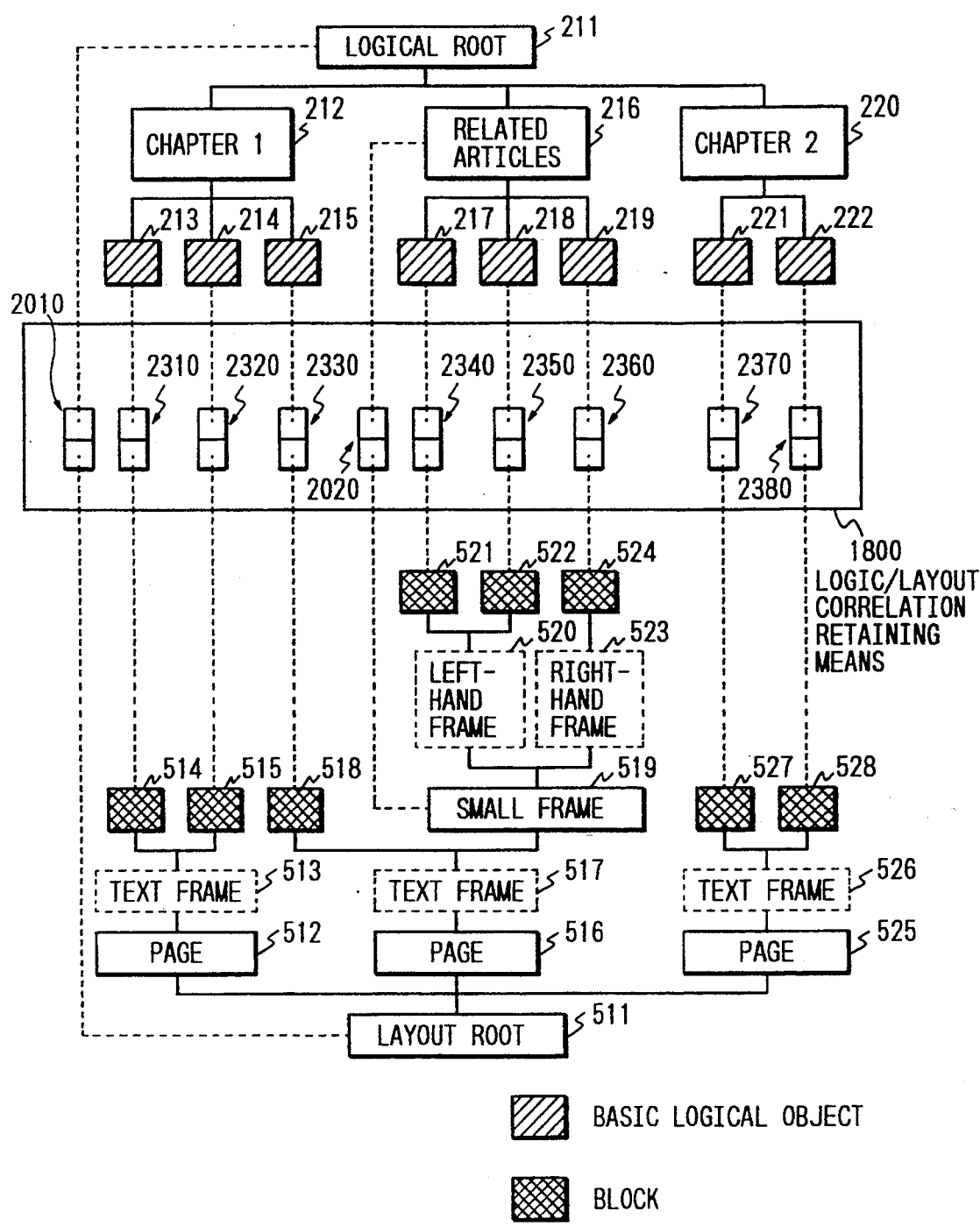
FIG. 23 is a chart illustrating a logic/layout correlation between a document logical structure and a layout structure after completion of a layout operation in the third embodiment.
Figure 24:
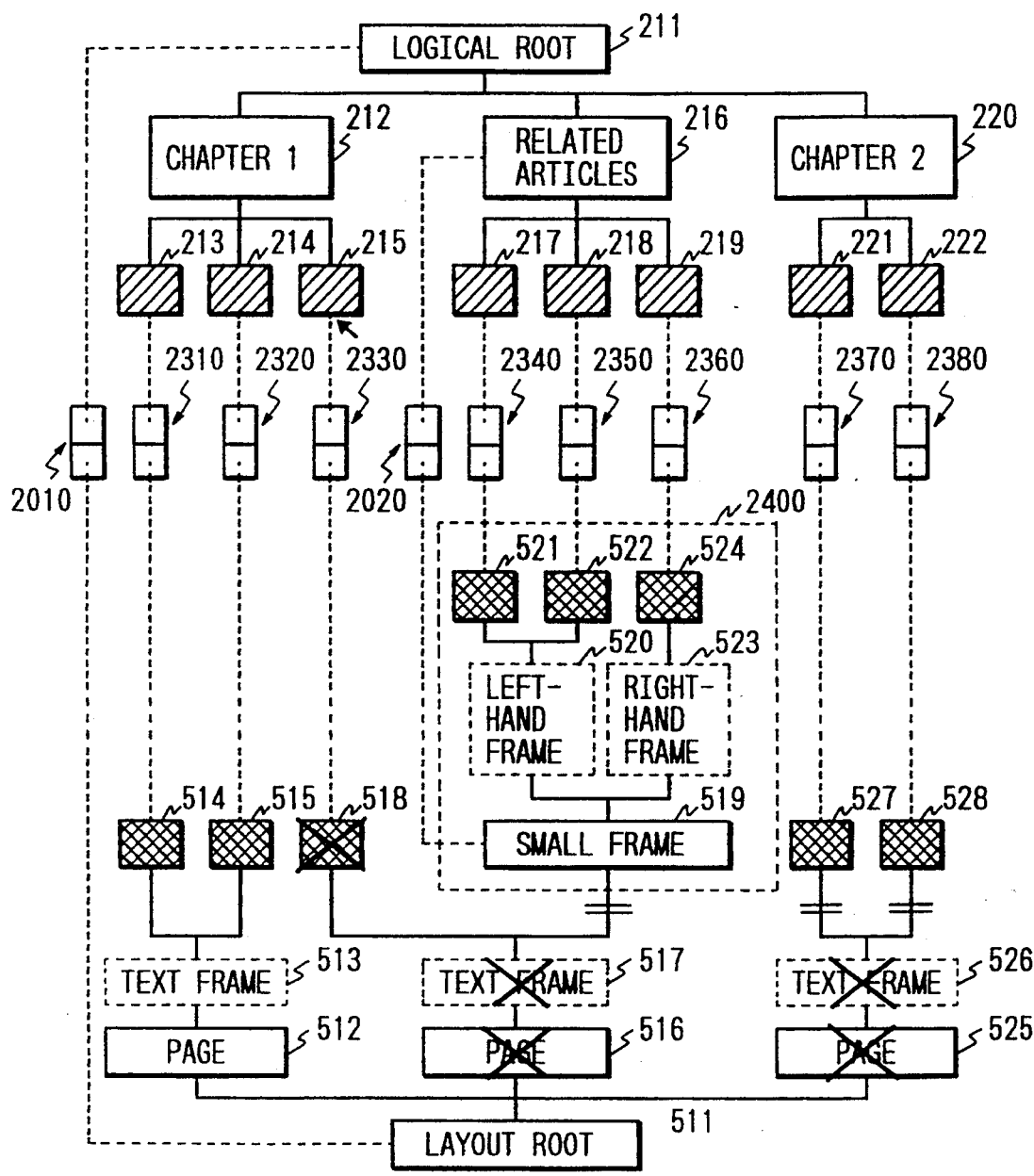
FIG. 24 is a chart illustrating a reallocating operation performed when the document logical structure of FIG. 23 has been altered.
Figure 25:
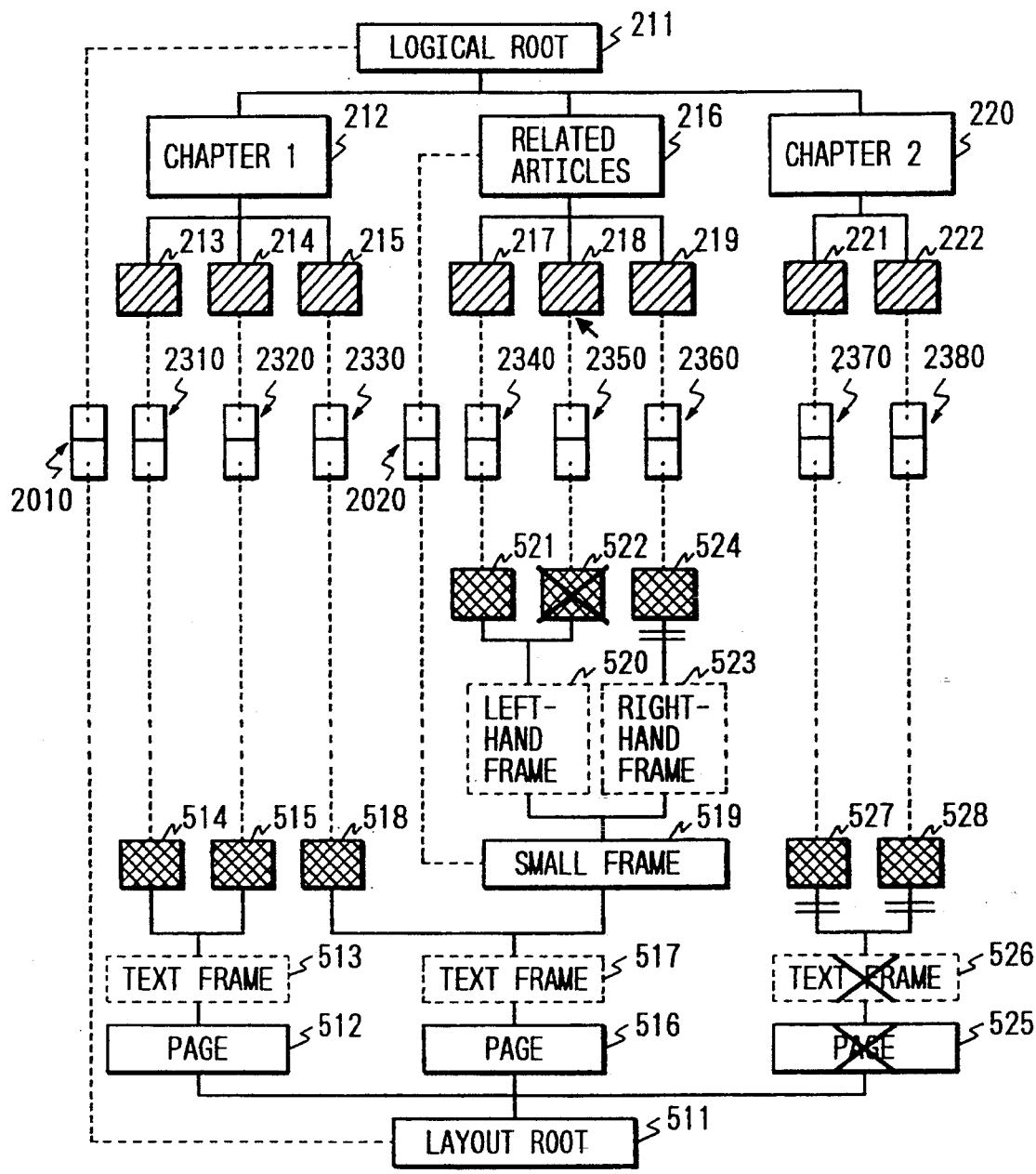
FIG. 25 is a chart illustrating a reallocating operation performed when the document logical structure of FIG. 23 has been altered.

Next, referring to FIGS. 23-25, a description is made of the deletion and separation of a layout object performed by the partial layout means 109 in the event of the logical node alteration.

FIG. 23 includes, in addition to the logic/layout correlation data 2010 and 2020 indicating the corresponding relationships between the logical objects designating the partial layout templates and the layout objects corresponding to those logical objects, logic/layout correlation data 2310–2380 indicating corresponding relationships between the basic logical objects and the blocks, which data explicitly indicate that the basic logical objects and the blocks are correlated by sharing the content portions. That is, the data 2010, 2020 and 2310–2380 correlate the logical node group (i.e., the logical objects designating the partial layout templates and the basic logical objects) and the layout objects corresponding thereto.

It is assumed that the logical structure of FIG. 23 is the same as FIG. 2 and the content portions connected to the respective basic logical objects in FIG. 23 are the same as in FIG. 2.

When the content portion "C" connected to the basic logical object 215 is altered from the state of FIG. 23, the corresponding relationship between the logical structure and the layout structure is changed to one shown in FIG. 24. As shown in FIG. 24, since part of the text has been altered, the partial layout structure 2400 corresponding to the logical structure including "related articles" and the objects below it is separated. The reason why the layout objects 516, 517, 525 and 526 ("text frame" and "page") are deleted is that all the blocks previously located below each of these layout objects are deleted (although they are separated actually, this state is the same as the state where the blocks are deleted, because when viewed from the layout objects of "text frame" and "page" the previously connected blocks are now nonexistent.) and the deletion of those layout objects causes no contradiction with the partial layout templates (see the partial layout templates 240 and 250 in FIG. 2).

On the other hand, when the content portion "b" connected to the basic logical object 218 is altered, the corresponding relationship between the logical structure and the layout structure is changed to one as shown in FIG. 25. In FIG. 25, the reason why the layout object 523 ("right-hand frame") is not deleted is that the deletion of only the layout object 523 causes a deviation from the limitation of the partial layout template 240 (see FIG. 2).

According to the third embodiment, a partial corresponding relationship between a logical structure and a layout structure can be specified clearly. Therefore, when part of the logical structure is altered, it suffices that only the influenced part of the layout structure is reallocated. This will improve the efficiency of the layout process. In contrast, in the conventional layout process, since a single layout processing program is applied to the entire logical structure, it is difficult to retain a corresponding relationship between a particular part of a logical structure and a particular part of a layout structure.

A fourth embodiment of the invention is described below with reference to FIGS. 26, 27(a)–27(b), 28(a)–28(b), 29(a)–29(b), 30(a)–30(b), 31(a)–31(b), 32, 33(a)–33(b) and 34.

A device for implementing the fourth embodiment has the same constitution as of the functional block diagram of FIG. 1 (first embodiment). However, the information retained by the logical structure retaining means 101 and the partial layout template retaining means 105 is different than in the first embodiment. A description thereof is made below.

Figure 26:
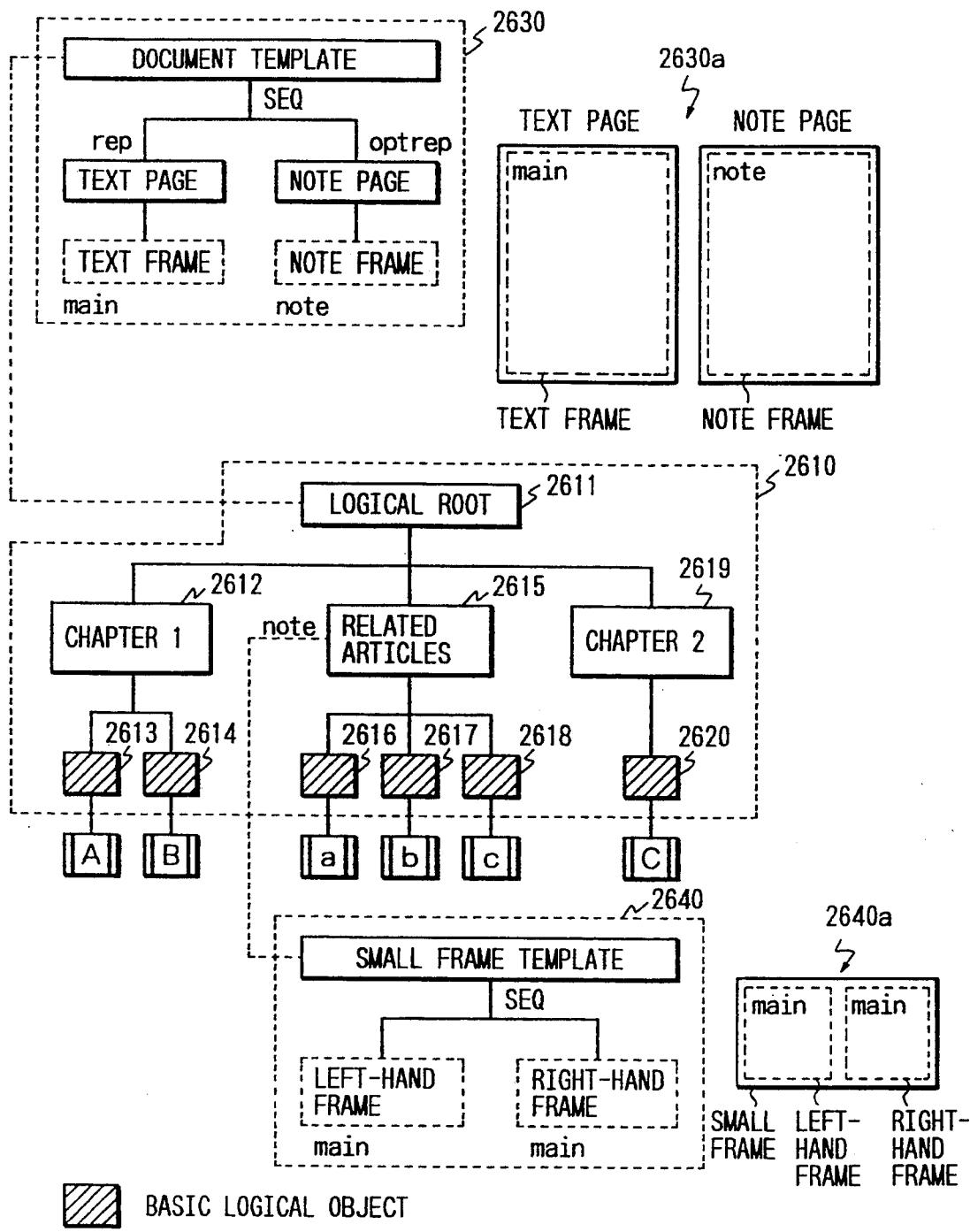
FIG. 26 is a chart illustrating a corresponding relationship between a document logical structure and partial layout templates in a document processing device according to a fourth embodiment of the invention.

The logical structure retaining means 101 retains a logical structure 2610 of a document as shown in FIG. 26. A logical node 2615 ("related articles") of the logical structure 2610 is given a category "note," which means that the entire "related articles" structure should be allocated to a rear page. In contrast, in the layout processing method according to the conventional categories, only the block can be poured into a particular lowest-rank frame by specifying a category. Therefore, even if it is intended to allocate the entire "related articles" structure to a rear page, categories need to be given to the respective basic logical objects.

The partial layout template retaining means 105 retains partial layout templates 2630 and 2640 as shown in FIG. 26. Categories "main" and "note" are given to "text frame" and "note frame" of the partial layout template 2630, respectively. A category "main" is given to "left-hand frame" and "right-hand frame" of the partial layout template 2640. In FIG. 26, symbols 2630a and 2640a denote layout images expressed by the partial layout templates 2630 and 2640, respectively.

Figure 27A:
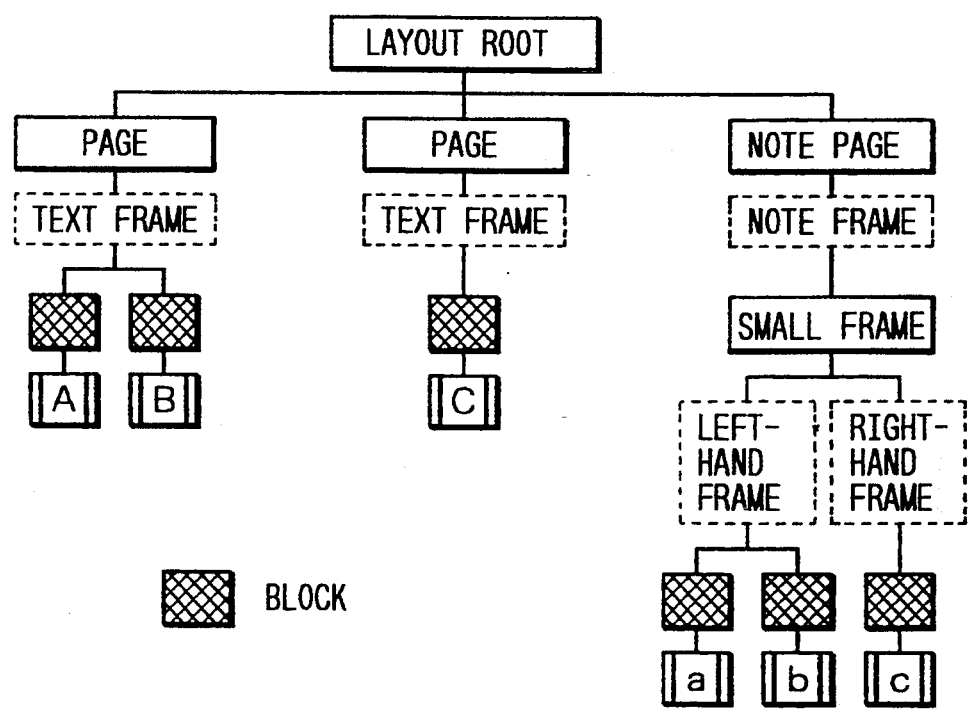
FIGS. 27(a) and 27(b) are charts illustrating a layout result obtained by applying the partial layout templates of FIG. 26 to the logical structure of FIG. 26.
Figure 27B:
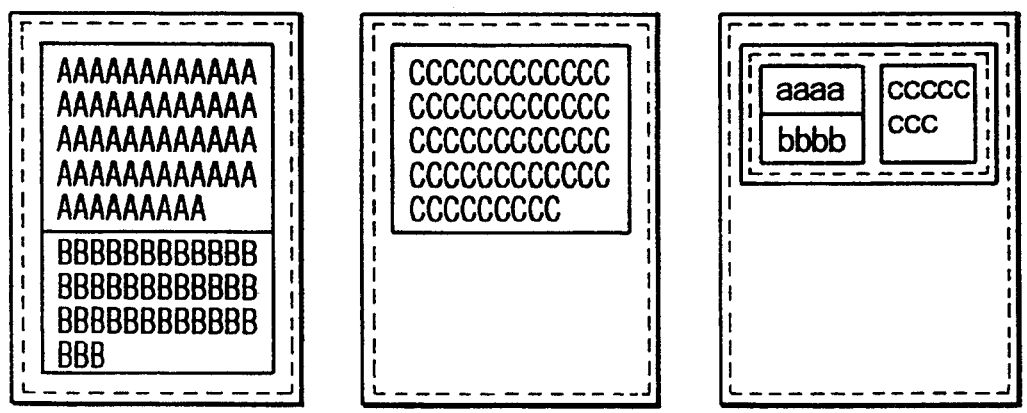

When a layout operation is performed on the logical structure 2610 by applying the partial layout templates 2630 and 2640 to it, a layout result as shown in FIG. 27(a) is obtained. FIG. 27(b) shows a layout image expressed by the layout structure of FIG. 27(a). It can be seen that the "related articles" structure is allocated to the final page.

In the example of FIGS. 27(a) and 27(b), two kinds of layout structure alterations, i.e., increasing of "text page" and "note page," are possible during the partial layout operation on the first-hierarchy logical node array (logical nodes 2613–2615 and 2620 in FIG. 26). That is, to obtain the layout result of FIGS. 27(a) and 27(b), new "text page" needs to be added until reaching page 2 and new "note page" needs to be added for page 3. Therefore, there is needed a function of properly selecting between the two kinds of alterations. This function is implemented by a backtrack mechanism.

Next, a partial layout operation by the partial layout means 109 in accordance with the indication of categories is described with reference to FIGS. 28(a)–28(b), 29(a)–29(b), 30(a)–30(b) and 31(a)–31(b), which show a layout operation using the backtrack mechanism.

Figure 28A:
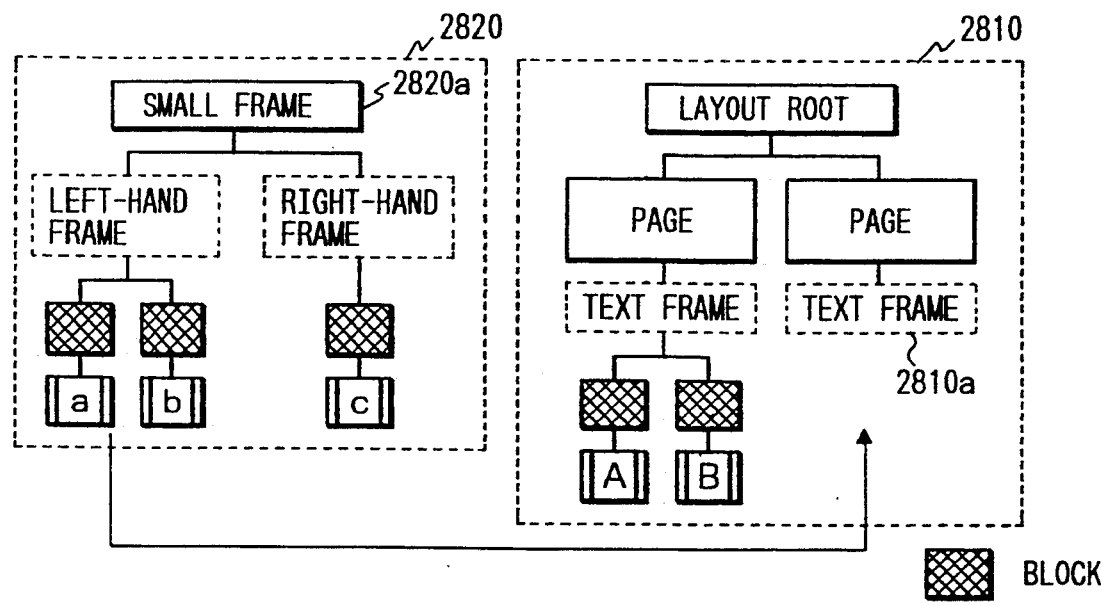
FIGS. 28(a) and 28(b) are charts illustrating a category-based partial layout operation of the fourth embodiment.

It is assumed that a layout result of FIG. 28(a) has been obtained from the logical structure 2610 such that a layout structure 2810 is obtained as a result of a partial layout operation satisfying the limitations of the partial layout template 2630 (see FIG. 26) and a layout structure 2820 has been obtained as a result of a partial layout operation satisfying the limitations of the partial layout template 2640 (see FIG. 26).

Figure 28B:
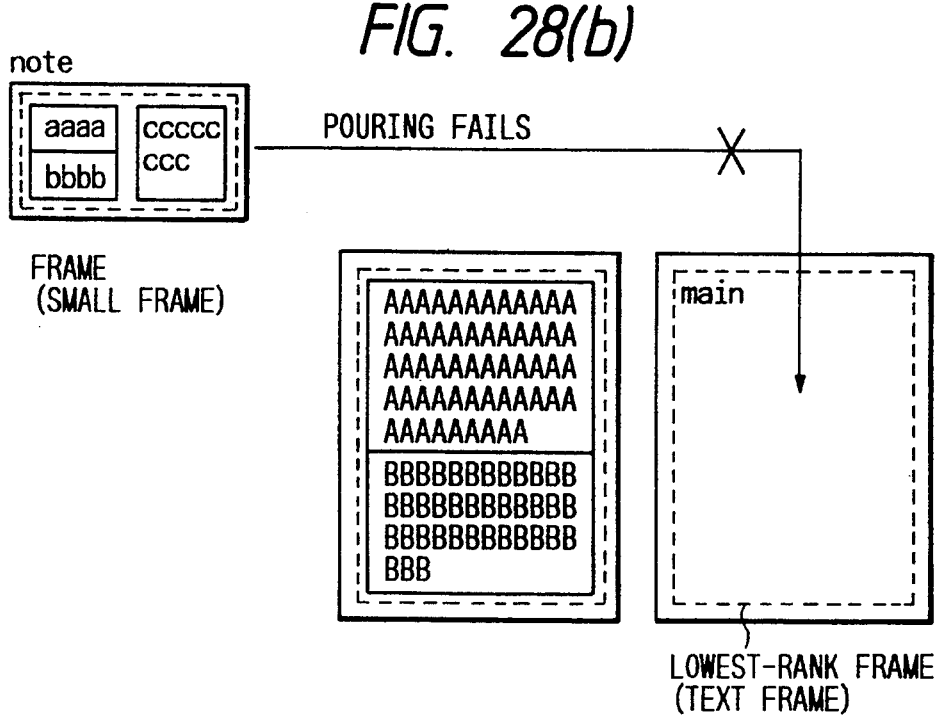

In this state, an attempt of the partial layout means 109 to pour the frame 2820 ("small frame") corresponding to the logical node 2615 into the lowest-rank frame 2810a ("text frame") of the layout structure 2810 (see FIG. 28(a)) will result in a failure, because as shown in FIG. 28(b) a category "main" is given to a lowest-rank frame 2810a ("text frame") and a category "note" is given to the logical node 2615 ("related articles").

Figure 29A:
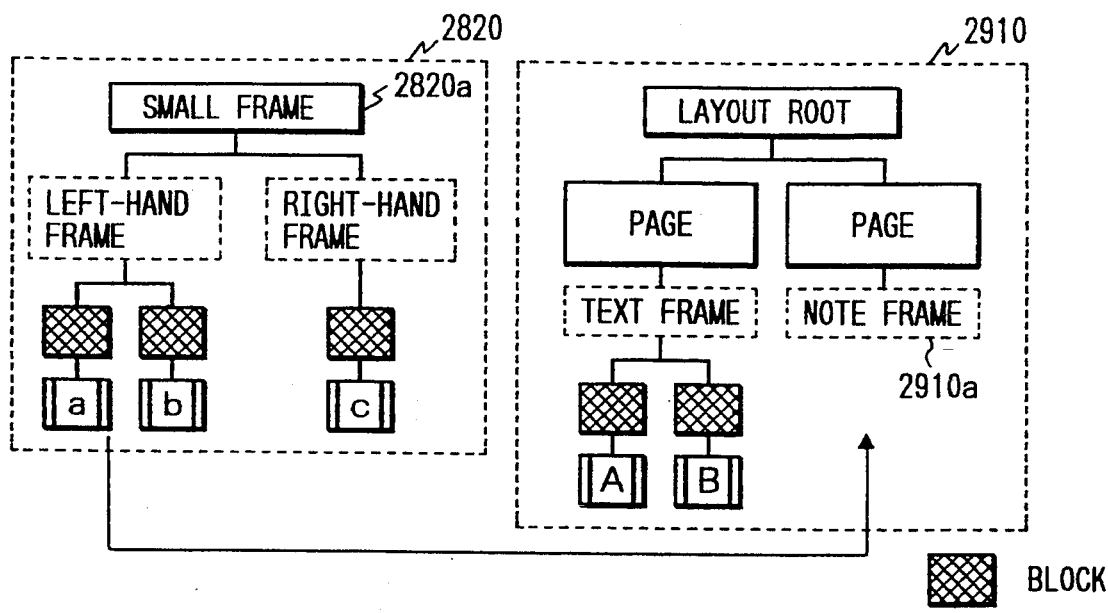
FIGS. 29(a) and 29(b) are charts illustrating the category-based partial layout operation of the fourth embodiment.
Figure 29B:
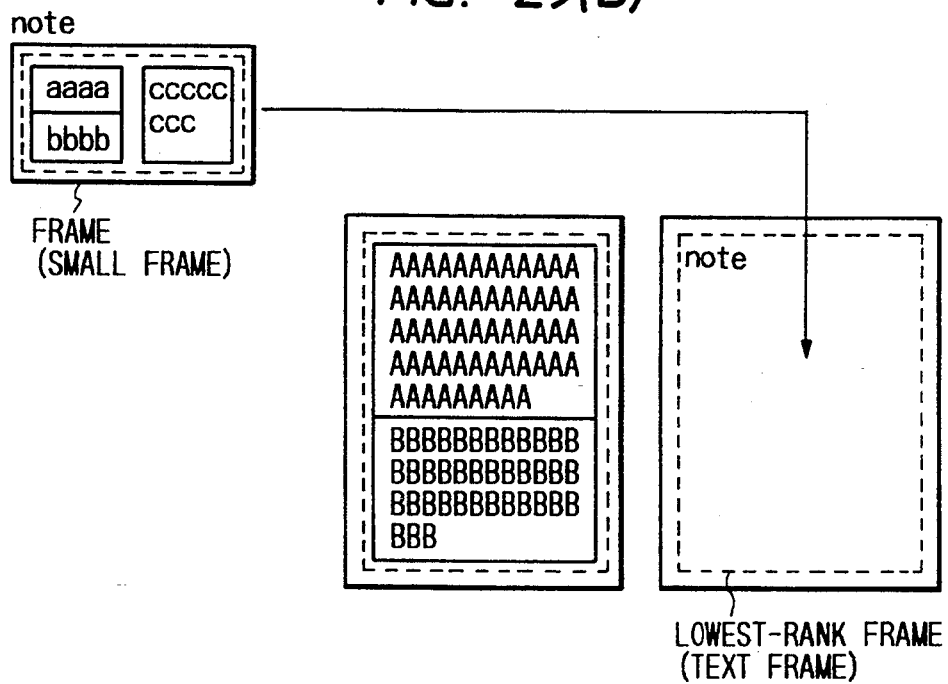

Then, the partial layout means 109 obtains a layout structure 2910 by regenerating a lowest-rank frame 2910a ("note frame") so as to satisfy the limitations of the partial layout template 2630 (see FIG. 26), as shown in FIG. 29(a). In this state, an attempt of the partial layout means 109 to pour the frame 2820 ("small frame") into the lowest-rank frame 2910a ("note frame") will succeed, because as shown in FIG. 29(b) a category "note" is given to the Lowest-rank frame 2910a ("note frame") and this category coincides with the category of the logical node 2615 ("related articles").

With the above operations, the layout of the content portions "A," "B," "a," "b" and "c" has been completed. A description is made below of a layout operation on the remaining content portion "C."

Figure 30A:
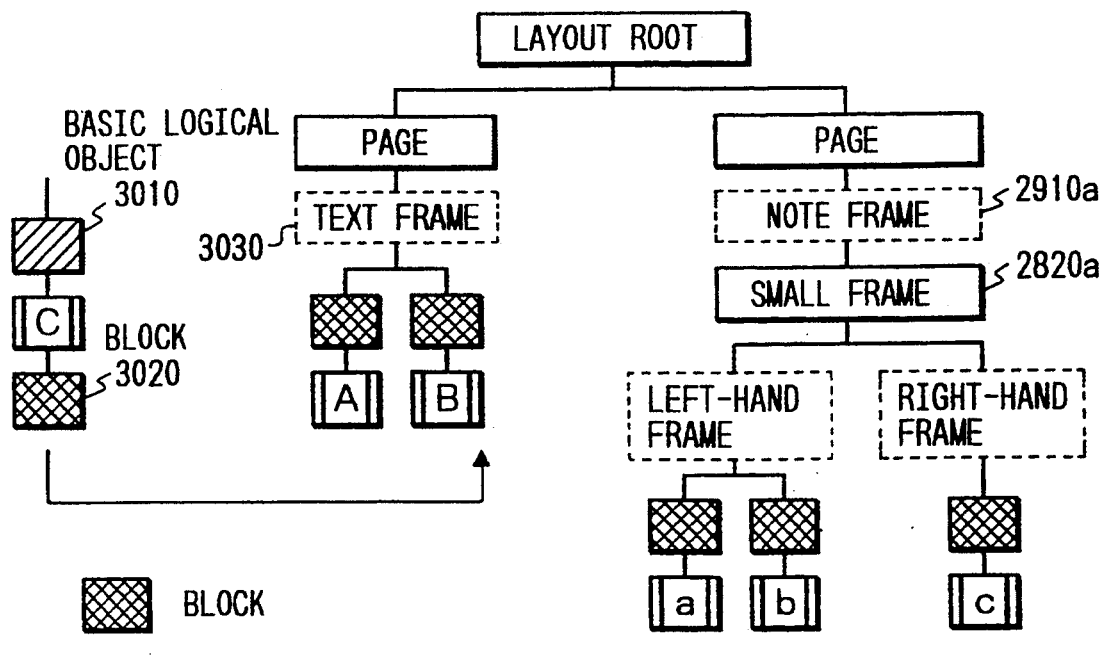
Figure 30B:
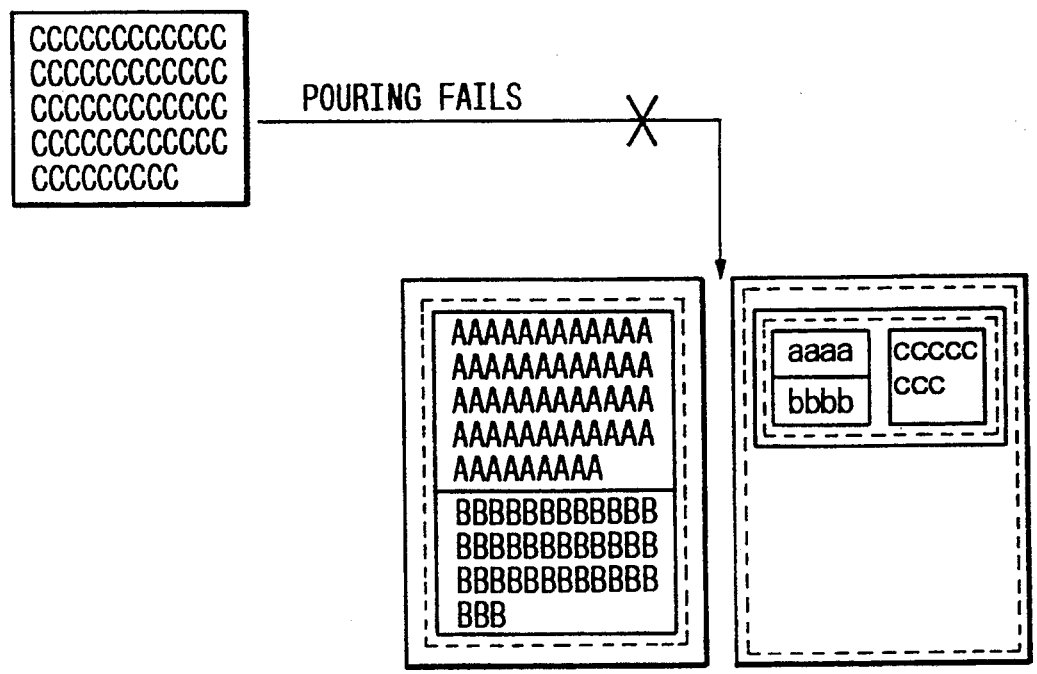

First, as shown in FIG. 30(a), a block 3020 corresponding to a basic logical object 3010 having the content portion "C" is generated and it is attempted to pour the block 3020 into a lowest-rank frame 3030. However, this attempt will fail, because as shown in FIG. 30(b) the remaining space of the lowest-rank frame 3030 is not sufficient to accommodate the block 3020.

Then, new "text page" is added so as to satisfy the limitations of the partial layout template 2620 to obtain a layout result shown in FIG. 31(a). An attempt to pour the block 3020 into a lowest-rank frame 3110 of "text frame" of this layout result will succeed, because as shown in FIG. 31(b) both of the lowest frame 3110 and the block 3020 have the category "main." With this operation, the layout result (final layout result) shown in FIG. 27(a) is obtained.

According to this embodiment, a layout including contents written in a first language and contents written in a second language can easily be obtained with the two kinds of contents correlated with each other. This is exemplified below for the case of producing a layout of a document such that a Japanese original part and an English translation thereof (or vice versa) are arranged side by side while they are correlated with each other.

In this case, a logical structure 3210, partial layout templates 3220 and 3230, and content portions 3240 may be prepared as shown in FIG. 32.

A category "J" for Japanese is given to basic logical objects of the logical structure 3210 having content portions "あ," "い," "う" and "え," and a category "E" for English is given to basic logical objects having content portions "A," "B," "C" and "D." Further, a category "J" for Japanese is given to a lowest-rank frame "frame for Japanese" of the partial layout template 3230, and a category "E" for English is given to a lowest-rank frame "frame for English."

A layout result as shown in FIG. 33(a) is obtained by performing a layout operation by applying the partial layout templates 3220 and 3230 and the content portions 3240 to the logical structure 3210. FIG. 33(b) shows a layout image expressed by this layout result.

If the logical node arrays are managed for each category as shown in FIG. 34, the improvement in efficiency of the reallocating operation as described in the third embodiment can be effected on a category-by-category basis. Thus, the efficiency of the layout process can further be improved.

While it is explained in the third embodiment that the invention can improve the efficiency of the reallocating operation, the backtrack mechanism can be considered a repetition of reallocating operations where a partial layout structure is discarded. Therefore, as described in the fourth embodiment, the efficiency of the backtrack mechanism can be improved by performing the backtrack operation on a partial layout structure basis. For example, in discarding page 3, it is not necessary to discard and reallocate a "small frame" structure obtained by a partial layout operation.

A fifth embodiment of the invention is described below with reference to FIGS. 35-37.

A device for implementing this embodiment is basically the same as in the functional block diagram of FIG. 1 (first embodiment).

Also in this embodiment, the partial layout means 109 is implemented such that software (a program) for a partial layout process is executed by a control means such as a processor or a CPU. That is, the partial layout means 109 is constituted of a partial layout processing program and a control means for executing it.

In the first to fourth embodiments described above, only one partial layout means 109 exists at a certain time point, and a program is prepared such that a partial layout operation is performed on a plurality of logical nodes by repeatedly effecting the partial layout means 109 or calling the self (recursive calling). In contrast, in the fifth embodiment, a plurality of partial layout means are provided in the partial layout means 109 to perform partial layout operations on respective logical nodes. That is, the device according to the fifth embodiment is applied to a computer permitting the existence of a plurality of control means for performing the same program in a parallel manner. A plurality of parallel-processing control means may be implemented by hardware (e.g., a plurality of CPUs) or virtually implemented by software.

Each partial layout means of the partial layout means 109 is generated in association with a logical node, and disappears when the corresponding logical node is deleted. That is, the number of generated partial layout means is equal to that of logical nodes.

The CSP (communicating Sequential Processes) is one of the theories enabling such parallel processing. The parallel computer (transputter) and the programming language (OCCUM) based on this theory have already been developed and put to practical use. In this theory, a means for executing a program in a parallel manner is called a "process." The "process" can designate another "process" processing in a parallel manner to transfer information to it and, conversely, can receive information from another "process" designated. According this theory, when receiving information, a "process" waits until it is sent from another "process" designated. To control this type of information exchange by a program, symbols "!" and "?" are used in the program when a "process" transfers information and receives information, respectively.

In the fifth embodiment, according to this theory, a "process" is used for the execution of a partial layout program. That is, a partial layout operation is performed such that a parallel processing "process" exchanges information with another "process." In this embodiment, a "formatter" is defined as a "process" for performing a partial layout operation ("formatting"). One formatter is activated for a corresponding logical node, and produces a layout of a logical node array located below the corresponding logical node. Therefore, the formatters form a hierarchical structure corresponding to the logical node hierarchy.

FIG. 35 shows a hierarchical structure of formatters that are generated in association with the logical nodes of the logical structure 210 of FIG. 2. In FIG. 35, a formatter 3501 corresponds to the logical node 211; formatter 3502 to logical node 213; formatter 3503 to logical node 214; formatter 3504 to logical node 215;

formatter 3505 to logical node 216; formatter 3506 to logical node 217; formatter 3507 to logical node 218; formatter 3508 to logical node 219; formatter 3509 to logical node 221; and formatter 3510 to logical node 222. The formatters 3501–3510 operate in a parallel manner.

Referring to a flowchart of FIG. 36, the whole layout operation by the partial layout means 109 of this embodiment is described below.

In response to a request for a layout operation, the partial layout means 109 activates formatters corresponding to all the logical nodes, and establishes a hierarchy thereof (step 3601). Upon reception of a layout start instruction, the partial layout means 109 gives a layout start instruction to the highest-rank formatter to make it perform a layout operation (step 3602). Layout operations by the respective formatters proceed while information necessary for a layout operation is transferred from a higher-rank formatter to a lower-rank formatter in a sequential manner starting from the highest-rank formatter (step 3603). The layout operation is briefly described below (a detailed description is provided later). The layout operation proceeds such that each formatter transfers an area available for the layout operation (hereinafter called "available area") to a lower-rank formatter and transfers a layout result and a status (layout processing status) to a higher-rank formatter. The partial layout means 109 employs the result of the highest-rank formatter as a result of the entire layout operation (step 3604).

There are three statuses that may be transferred to a higher-rank formatter.

FAIL (Failure of a Layout Operation)

This status indicates that a logical node array has not been allocated at all to an available area received from a higher-rank formatter. A formatter which has transferred the status "FAIL" to a higher-rank formatter stands by until receiving a new available area from the higher-rank formatter.

PARTIALLY (Layout Operation was Partially Successful)

This status indicates that part of a logical node array has been allocated to an available area received from a higher-rank formatter. A formatter which has transferred the status "PARTIALLY" to the higher-rank formatter stands by until receiving a new available area from the higher-rank formatter.

DONE (Layout Operation has Finished)

This status indicates that the entire logical node array has been allocated to an available area received from a higher-rank formatter. A formatter which has transferred the status "DONE" to the higher-rank formatter finishes its layout operation.

Next, referring to FIG. 37, the layout operation of each formatter in step 3603 is described below.

A formatter as a partial layout means stands by until receiving an available area ("area-for-self") from a higher-rank formatter (step 3701).

Upon reception of the available area ("area-for-self"), the formatter generates a first smallest partial layout structure that satisfies the limitations of a partial layout template in the available area, and names it "lay-subtree" (step 3702). The partial layout template designated by a logical node corresponding to the formatter under attention is "template."

Then, the formatter names a first lowest-rank frame of "lay-subtree" "lay-elmnt" (step 3703), and judges whether the entire logical node array has been allocated (step 3704).

If the judgment is negative, the formatter takes, from the logical node array, the first one of the logical nodes that have not been allocated, and names it "log-elmnt" (step 3705). The formatter names a formatter that has been activated in association with "log-elmnt" "sub-formatter" (step 3706), and transfers an available area to "sub-formatter" (step 3707).

The formatter waits for a response (a status and a partial result) from "sub-formatter" (step 3708). After performing an operation in accordance with a value ("FAIL," "DONE" or "PARTIALLY") of the status (i.e., the response), the formatter judges whether the status is "DONE" or not (step 3710).

If the status received from "sub-formatter" is "DONE," the formatter returns to step 3704 to execute it and the following steps. If the status is not "DONE," the formatter returns to step 3707 to execute it and the following steps.

If the judgment in step 3704 is affirmative, the formatter transfers to a higher-rank formatter "DONE" as the own status and "lay-subtree" as a layout result (step 3711).

In step 3709, if the status value transferred from "sub-formatter" is "FAIL," the formatter prepares a new available area using the partial layout template, and transfers to the higher-rank formatter a layout result and the own status (in this case, "FAIL" or "PARTIALLY") in accordance with the status of the partial layout structure "lay-subtree" under generation. On the other hand, if the status value transferred from "sub-formatter" is "DONE" or "PARTIALLY," the formatter connects a layout result received from "sub-formatter" to current "lay-subtree," that is, performs pouring.

An example (algorithm) of the partial layout operation performed by each formatter is shown below.

```
01  Procedure formatter
02  AVAILABLE-AREA[sup-formatter]? area-for-self;
03  lay-subtree=generate-first-min-subtree (template, area-
                                             for-self);
04  lay elmnt=get-first-lay-stream-elmnt (lay-subtree);
05  foreach log-elmnt in log-stream do
06     sub-formatter=formatter-for (log-elmnt);
07     loop
08        area-for-sub-formatter=compute-available-area
                                  (lay-elmnt, area-for-self);
09        AVAILABLE-AREA[sub-formatter]! area-for-sub-
                                           formatter;
10        LAYOUT-RESULT[sub-formatter]? (status,
                                         generated-subtree);
11        case status of
12        DONE:
13           pour (generated-subtree, lay-elmnt);
14           exit loop;
15        PARTIALLY:
16           pour (generated-subtree, lay-elmnt);
17        FAIL:
18           if lay-stream-has-more-elmnts (lay-subtree)
                 then
19              lay-elmnt=get-next-lay-stream-elmnt (lay-
                                                     subtree);
20           elseif can-add-branch (lay-subtree, temple, area-
                                    for-self) then
21              add-branch (lay-subtree, template, area-for-
                                                     self);
22              lay-elmnt=get-next-lay-stream-elmnt (lay-
                                                     subtree);
23           else
24              if something-was-poured (lay-subtree) then
```

```
                            -continued
25          LAYOUT-RESULT(sub-formatter]!
                    (PARTIALLY, lay-subtree);
26          AVAILABLE-AREA[sup-formatter]?
                    area-for-self;
27          lay-subtree=generate-next-min-subtree
                    (template, area-for-self);
28        else
29          LAYOUT-RESULT[sup-formatter]!
                    (FAIL, nil);
30          AVAILABLE-AREA[sup-formatter)? area-
                    for-self;
31          lay-subtree=re-generate-current-min-subtree
                    (template, area-for-self);
32        endif;
33        lay-elmnt=get-first-lay-stream-elmnt (lay-
                    subtree);
34      endif;
35    end loop;
36  end foreach;
37  LAYOUT RESULT(sup-formatter]! (DONE, lay-subtree);
38 end;
```

In this algorithm, "01" to "38" are step numbers of respective character strings, and "lay-stream" means an array of lowest-rank frames of a partial layout structure.

The partial layout operation performed by each formatter is described below with reference to the above algorithm. The step number appearing in the following description correspond to those in the algorithm.

Step 01

The name "formatter" of a program indicating its beginning.

Step 02

Wait until receiving an available area ("area-for-self") from a higher-rank formatter.

Step 03

Generate, in "area-for-self," a first smallest partial layout structure satisfying the limitations of a partial layout template ("template") designated by a logical node corresponding to the formatter, and name it "lay-subtree."

Step 04

Name the first lowest-rank frame of "lay-subtree" "lay-elmnt."

Step 05

Execute steps 07–36 for each logical node ("log-elmnt") included in a logical node array retained by the corresponding logical node.

Step 06

Name a formatter that has been activated in association with "log-elmnt" "sub-formatter."

Step 07

Repeatedly execute steps 08–35 until "exit" appears.

Step 08

Calculate, from "area-for-self" and "lay-elmnt," an available area to be transferred to "sub-formatter," and name a calculation result "area-for-sub-formatter."

Step 09

Transfer "area-for-sub-formatter" to "sub-formatter."

Step 10

Wait until receiving a status ("status") and a layout result ("generated-subtree") from "sub-formatter."

Step 11

Referring to the valise of "status" (i.e., "DONE," "PARTIALLY" or "FAIL"), perform an operation in accordance with the value.

Step 12

If the value of "status" is "DONE," execute steps 13 and 14.

Step 13

Pour "generated-subtree" into "lay-elmnt."

Step 14

Finish the repetitive operation starting from step 07, and go to step 36.

Step 15

If the value of "status" is "PARTIALLY," go to step 16.

Step 16

Pour "generated-subtree" into "lay-elmnt," and go to step 35.

Step 17

If the value of "status" is "FAIL," execute steps 18–34.

Step 18

Judge whether there remains other lowest-rank frame in "lay-subtree". If the judgment is affirmative, go to step 19. If the judgment is negative, go to step 20.

Step 19

Name the next lowest-rank frame in "lay-subtree" "lay-elmnt," and go to step 35.

Step 20

Judge whether a node can be added to "lay-subtree" such that a new lowest-rank frame can be prepared in "area-for-self" and the limitations of the partial layout template are satisfied. If the judgment is affirmative, go to step 21. If the judgment is negative, execute steps 23 and 24.

Step 21

Add a node such that a new lowest-rank frame can be prepared in "area-for-self" and the limitations of the partial layout template are satisfied.

Step 22

Name the next lowest-rank frame in "lay-subtree" "layelmnt," and go to step 34.

Steps 23 and 24

Judge whether a certain layout operation has been performed, i.e., whether something has been connected to some lowest-rank frame in "lay-subtree." If the judgment is affirmative, execute steps 25–27. If the judgment is negative, execute steps 28–31.

Step 25

Transfer to the higher-rank formatter "PARTIALLY" as a status and "lay-subtree" as a layout result.

Step 26

Wait until receiving a new available area ("area-for-self") from the higher-rank formatter.

Step 27

Generate a new smallest partial layout structure satisfying the limitations of the partial layout template in "area-for-self," and name it "lay-subtree." Then, go to step 33.

Steps 28 and 29

Transfer to the higher-rank formatter "FAIL" as a status and "nil" (indicating there is no layout result) as a layout result.

Step 30

Wait until receiving a new available area ("area-for-self") from the higher-rank formatter.

Step 31

Generate a new partial layout structure satisfying the limitations of the partial layout template in "area-for-self," and name it "lay-subtree". Then, go to step 33.

Step 32

This statement indicates the end of the conditional statements starting from, step 24. Go to the next step.

Step 33

Name the first lowest-rank frame in "lay-subtree" "lay-elmnt."

Step 34

This statement indicates the end of the conditional statements starting from step 17. Go to the next step.

Step 35

This statement indicates the end of the repetitive operation starting from step 07. Return to step 07.

Step 36

This statement indicates the end of the repetitive operation starting from step 05. Return to step 05.

Step 37

Transfer to the higher-rank formatter "DONE" as a status and "lay-subtree" as a layout result.

Step 38

This statement indicate the end of the program.

However, this algorithm needs to be somewhat modified for the highest-rank and lowest-rank formatters, because the highest-rank formatter cannot wait until receiving information from a higher-rank formatter and the lowest-rank formatter cannot wait until receiving information from a lower-rank formatter. Modifications are made as follows.

For the highest-rank formatter:
(1) Step 02 is changed to a step of waiting until receiving a layout start instruction. It is assumed that an infinite-size available area is always given.

(2) In each of steps 25, 29 and 37, the status and the layout result (transferred to a higher-rank formatter in the above algorithm) are employed as a layout result for the entire logical structure, and the execution of the process finishes. Therefore, steps 26–27 and 30–31 are not executed.

For the lowest-rank formatter:
(1) A "content layout operation" is performed instead of steps 08–10. A resultant status and layout result are employed as "status" and "generated-subtree," respectively.

The fifth embodiment described above may be modified in the following manner.

In the fifth embodiment, each formatter transfers a status and a layout result to a higher-rank formatter and a layout result received from a lower-rank formatter is finally transferred to the highest-rank formatter during the operation of the formatters. The layout operation can proceed even if the process is modified such that only the information on the available area that is consumed in accordance with the layout result is transferred to a higher-rank formatter instead of that the layout result is transferred to a higher-rank formatter. In this case, it is necessary that a partial layout structure generated by each formatter be stored therein and connected to the entire layout structure finally. This modification can minimize the quantity of information exchanged between the formatters, and thereby improve the efficiency of the entire process.

Although the fifth embodiment is described of the case of performing the entire layout operation, it can also be applied effectively to a reallocating operation that is performed after part of a logical structure is changed. This is because each formatter can judge whether re-execution is necessary based on available area information received from a higher-rank formatter and layout result information received from a lower-rank formatter, and the reallocation can be realized by allowing the formatters in need of re-execution to be re-executed. In this type of reallocating operation, when a logical structure is altered the formatter hierarchy is partially changed by generate and delete, when necessary, formatters corresponding to portions (logical nodes) changed. Then, a layout start instruction is given to the highest-rank formatter of the formatters corresponding to the changed portions of the hierarchy, and a result of the highest-rank formatter is employed as a layout result for the altered logical structure.

Since each formatter generates a partial layout structure in association with a logical node, it has information on the corresponding relationship between the logical node and the partial layout structure. Therefore, it can be said that each formatter performs the function of the logic/layout correlation retaining means 1800 of the third embodiment.

The reallocating operation is described below in detail.

Where a previous layout result can be placed in an available area received from a higher-rank formatter, it is not necessary to make a lower-rank formatter operate again and it suffices that the previously obtained partial layout result is returned to a higher-rank formatter. This is effective, for instance, when a paragraph is added, because usually a paragraph has a constant width and it is divided only in a relatively rare case where it bridges two pages.

Where a layout result received from a lower-rank formatter has the same size as a previously received layout result, the layout result does not influence the size of an available area for accommodating a subsequent logical node. Therefore, it is not necessary to make a formatter corresponding to the subsequent logical node operate. This is effective, for instance, when a certain paragraph is subjected to a modification which does not cause a change in the number of lines.

Since the partial layout operation can be performed very efficiently by employing the above techniques, the efficiency of the layout process is not lowered even if the layout operation is performed for every document edit operation. A WYSIWYG editor can be realized, which does not require a cumbersome operation of producing a layout after an edit process is completed.

Although in this embodiment each formatter waits until receiving a result from a higher-rank or lower-rank formatter, the process may be adapted to perform parallel processing by predicting information on an available area. For example, since usually a paragraph has a constant width, a formatter for allocating a paragraph can perform, in advance, allocation to an available area having a constant width and an infinite length. After this allocation, only when the parallel-allocated results cannot be placed in an available area given by a higher-rank formatter, a layout operation is performed again as in the case of the re-execution of a layout operation described above.

As described above, according to the invention, instead of preparing a layout template for the entire document (conventional case), partial layout templates are prepared for respective partial logical structures of a hierarchical logical structure of a document. A partial layout structure of each partial logical structure is produced by applying a corresponding partial layout template to it. As a result, the pouring operation, which is performed only on a block conventionally, can also be applied to a frame. Further, the use of the logical node array managing means improves the layout processing speed.

Since a template corresponding to a conventional template for the entire document is obtained dynamically and virtually as a combination of smaller partial layout templates during the execution of a layout process, the partial layout templates can be reused.

In the case of modifying a layout of an existing document, only the existing partial layout templates corresponding to layout portions to be modified need to be changed, but the other existing partial layout templates can be reused. Therefore, the templates can be formed easily.

Since a layout processing program has a simple role of performing a partial layout operation, it can be formed easily.

Since the partial layout structure is treated as a unit, operations such as an editing operation can be performed easily.

According to the second embodiment, the top-down-type or bottom-up-type partial layout can be selected in accordance with the logical structure, to facilitate the production of a desired document layout.

According to the third embodiment, since the corresponding relationships between the partial logical structures and the partial layout structures are specified explicitly, the efficiency of the reallocating operation can be improved. This is because, for instance, when a logical structure is altered, only the partial layout structures corresponding to partial logical structures including the modified portions need to be a subject of reallocation.

Further, according to the fifth embodiment, a layout of the entire logical structure is produced by performing partial layout operations in a parallel manner, the layout processing speed can be improved compared to the case of performing partial layout operations recursively.

What is claimed is:

1. A document processing device comprising:
   means for retaining a plurality of partial layout templates each expressing rules for producing a layout of a partial logical structure;
   means for extracting, from a logical structure of a document to be processed, a logical node array including first logical nodes corresponding to respective basic logical objects having respective content portions and second logical nodes representing respective partial logical structures and designating respective partial layout templates selected from the partial layout templates retained by the partial layout templates retaining means;
   means for managing the extracted logical node array; and
   partial layout means for performing a partial layout operation to generate a partial layout structure by applying, to one of the partial logical structures, one of the selected partial layout templates corresponding thereto, and sequentially performing the partial layout operation in accordance with the extracted logical node array to produce a layout of the entire document logical structure.

2. The document processing device of claim 1, further comprising content layout means for generating a block, wherein the partial layout means calls the content layout means with respect to the first logical nodes and recursively calls itself with respect to the second logical nodes.

3. The document processing device of claim 1, wherein the partial layout means comprises:
   top-down means for pouring the generated partial layout structure into a higher-rank layout object on a top-down basis based on a remaining space thereof;
   bottom-up means for pouring the generated partial layout structure into a higher-rank layout object on a bottom-up basis based on a combined area of the partial layout structure; and
   means for selecting the top-down means or the bottom-up means in accordance with layout selection information.

4. The document processing device of claim 3, wherein the layout selection information is retained by the partial layout templates retaining means.

5. The document processing device of claim 1, further comprising means for retaining data indicating corresponding relationships between the partial logical structures and the generated partial layout structures.

6. The document processing device of claim 5, wherein the corresponding relationships include relationships between the second logical nodes and corresponding layout objects, respectively.

7. The document processing device of claim 5, wherein the partial layout means performs a reallocating operation based on the corresponding relationships indicating data.

8. The document processing device of claim 1, wherein a first category may be given to the second logical nodes and a second category may be given to lowest-rank layout object classes of the selected partial layout templates, and the partial layout means allows a partial layout structure associated with the first category to be poured into a higher-rank layout object associated with the second category when the first and second categories coincide with each other.

9. The document processing device of claim 8, wherein the partial layout means performs a backtrack-type partial layout operation according to the first and second categories.

10. A document processing device comprising:
   means for retaining a plurality of partial layout templates each expressing rules for producing a layout of a partial logical structure; and
   a plurality of formatters provided for respective logical nodes of a logical structure of a document to be processed, and operating in a parallel manner to generate respective partial layout structures by applying, to respective partial logical structures, respective partial layout templates selected from the partial layout templates retained by the partial layout templates retaining means, the formatters starting to operate from a highest-rank formatter downwards.

11. The document processing device of claim 10, wherein each of the formatters transfers an available area to a lower-rank formatter and transfers a layout result and a layout processing status to a higher-rank formatter.

* * * * *